(12) United States Patent
Mamba et al.

(10) Patent No.: US 9,395,850 B2
(45) Date of Patent: Jul. 19, 2016

(54) COORDINATE INPUT DEVICE AND DISPLAY DEVICE WITH THE SAME

(75) Inventors: Norio Mamba, Kawasaki (JP); Koji Nagata, Hachioji (JP); Koji Hayakawa, Chosei (JP); Kouichi Anno, Chiba (JP); Toshiyuki Kumagai, Mobara (JP); Tsutomu Furuhashi, Yokohama (JP); Hisayoshi Kajiwara, Yokohama (JP)

(73) Assignees: JAPAN DISPLAY INC., Tokyo (JP); PANASONIC LIQUID CRYSTAL DISPLAY CO., LTD., Hyogo-Ken (JP)

( * ) Notice: Subject to any disclaimer, the term of this patent is extended or adjusted under 35 U.S.C. 154(b) by 1206 days.

(21) Appl. No.: 12/573,955

(22) Filed: Oct. 6, 2009

(65) Prior Publication Data

US 2010/0085322 A1    Apr. 8, 2010

(30) Foreign Application Priority Data

Oct. 6, 2008  (JP) ................................. 2008-259588
Apr. 15, 2009  (JP) ................................. 2009-098659

(51) Int. Cl.
*G06F 3/044*    (2006.01)

(52) U.S. Cl.
CPC ...................................... *G06F 3/044* (2013.01)

(58) Field of Classification Search
CPC ....................................................... G06F 3/044
USPC ......... 345/173–174; 324/678, 686; 178/18.06
See application file for complete search history.

(56) References Cited

U.S. PATENT DOCUMENTS

| | | | | |
|---|---|---|---|---|
| 4,039,940 | A * | 8/1977 | Butler et al. | 324/678 |
| 5,488,204 | A * | 1/1996 | Mead et al. | 178/18.06 |
| 5,659,254 | A * | 8/1997 | Matsumoto et al. | 324/678 |
| 5,973,417 | A * | 10/1999 | Goetz et al. | 307/129 |
| 6,466,036 | B1 * | 10/2002 | Philipp | 324/678 |
| 7,235,983 | B2 | 6/2007 | O'Dowd et al. | |
| 7,312,616 | B2 | 12/2007 | Snyder | |
| 2002/0172088 | A1 * | 11/2002 | Iorio et al. | 365/230.06 |
| 2005/0099188 | A1 * | 5/2005 | Baxter | 324/678 |
| 2007/0170931 | A1 * | 7/2007 | Snyder | 324/658 |
| 2008/0062148 | A1 * | 3/2008 | Hotelling et al. | 345/174 |
| 2008/0069413 | A1 * | 3/2008 | Riedijk et al. | 382/124 |

FOREIGN PATENT DOCUMENTS

JP    2002-287887    10/2002

* cited by examiner

*Primary Examiner* — Dorothy Harris
(74) *Attorney, Agent, or Firm* — Typha IP LLC

(57) ABSTRACT

A capacitance detection device of a capacitance system includes: a capacitance sensor electrode for detecting a capacitance; a power source for supplying charges to be charged in the capacitance sensor electrode; an electric charge storage capacitor in which an amount of charges to be charged therein changes according to the electric charges charged in the capacitance sensor electrode; and a switch for changing a reference potential of the electric charge storage capacitor. The reference potential of the electric charge storage capacitor is changed in a period of measuring the capacitance.

12 Claims, 44 Drawing Sheets

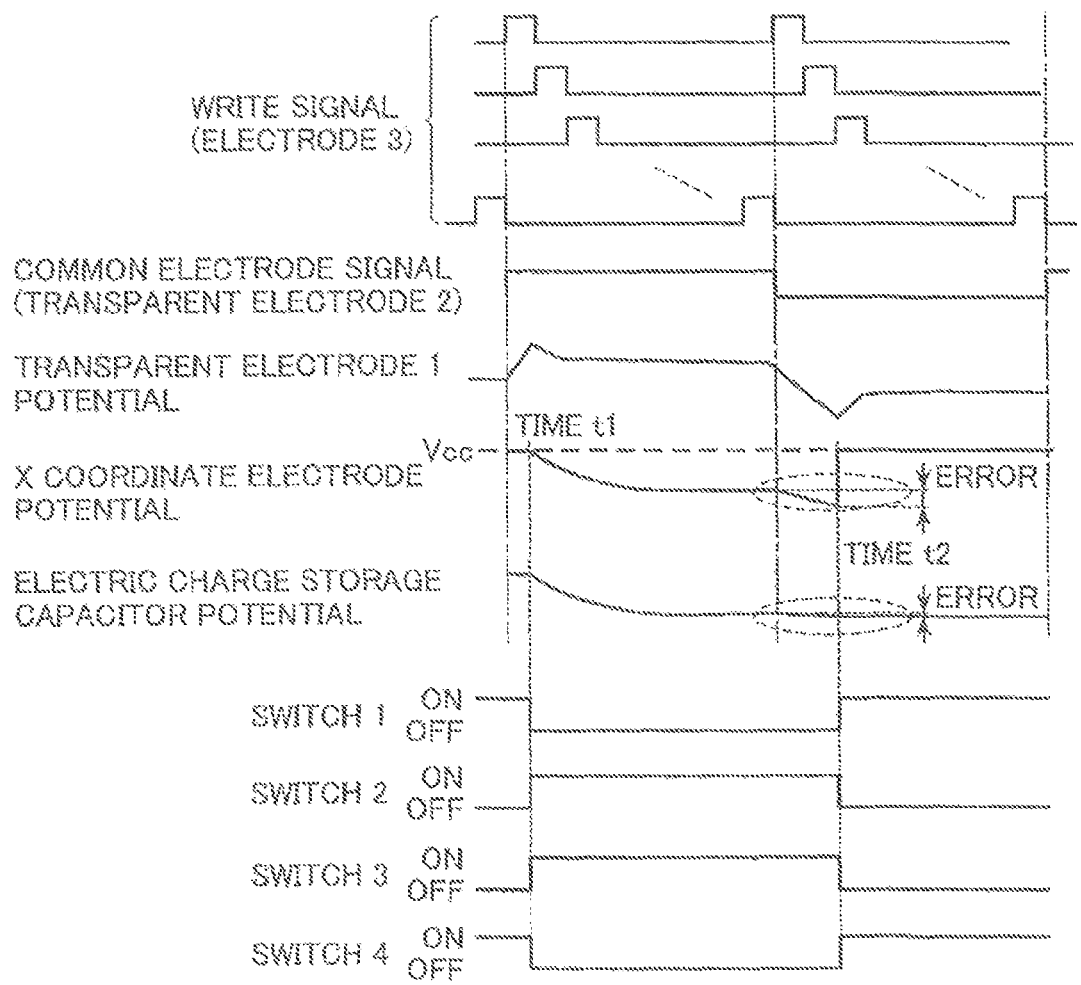

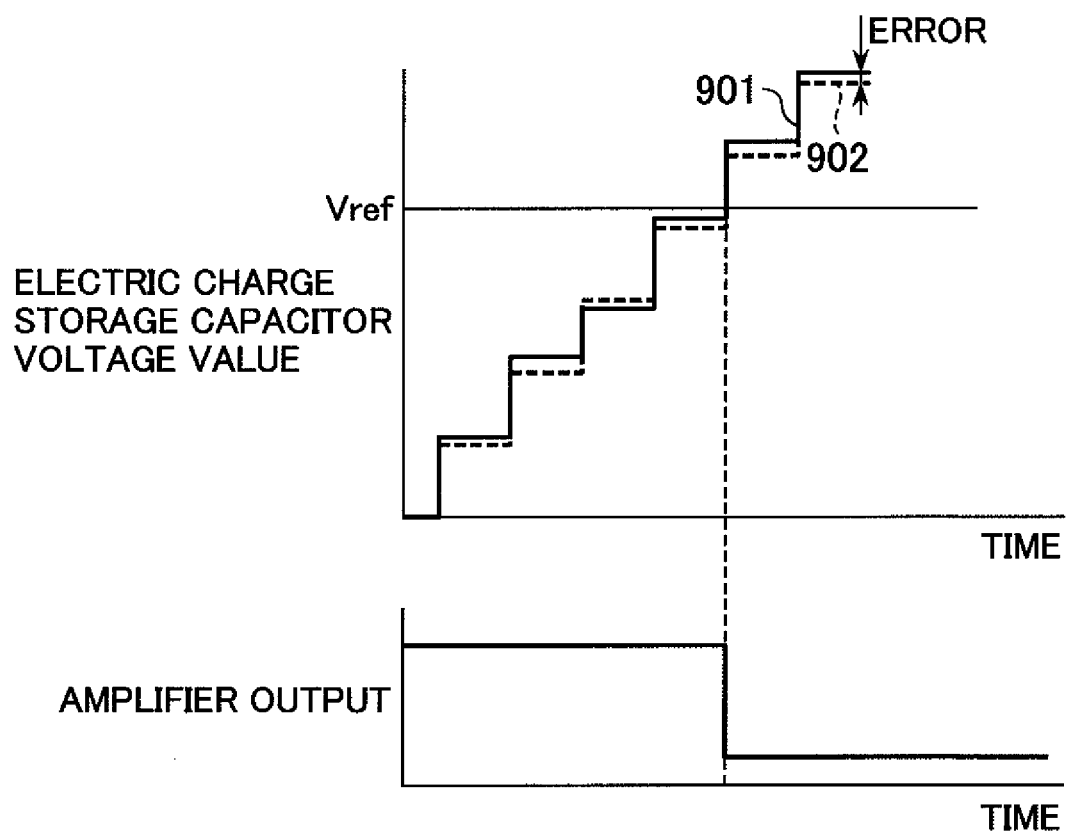

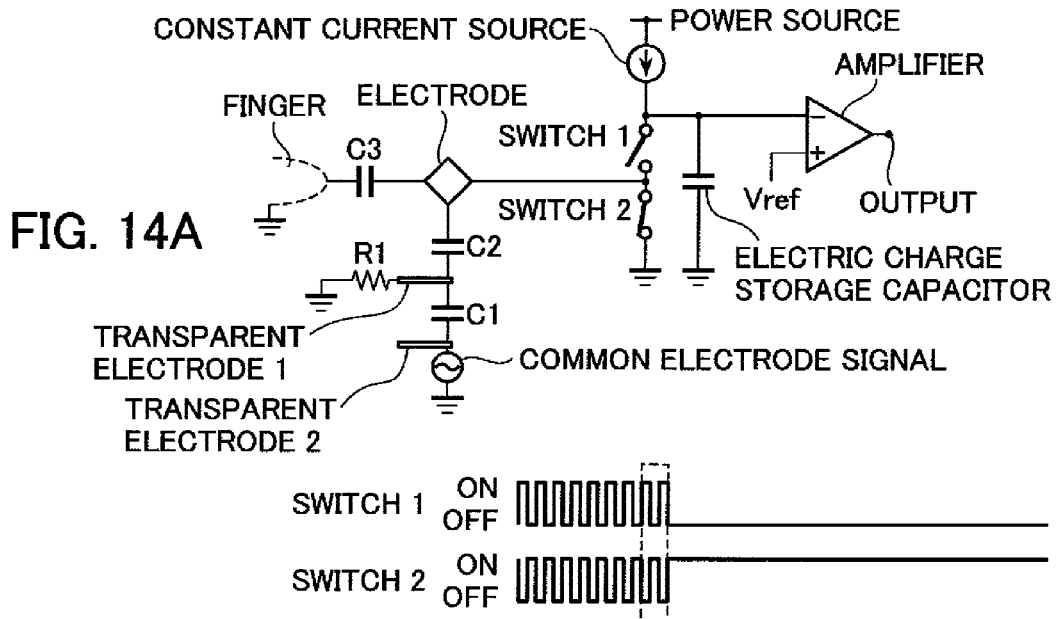
FIG. 14A
FIG. 14B
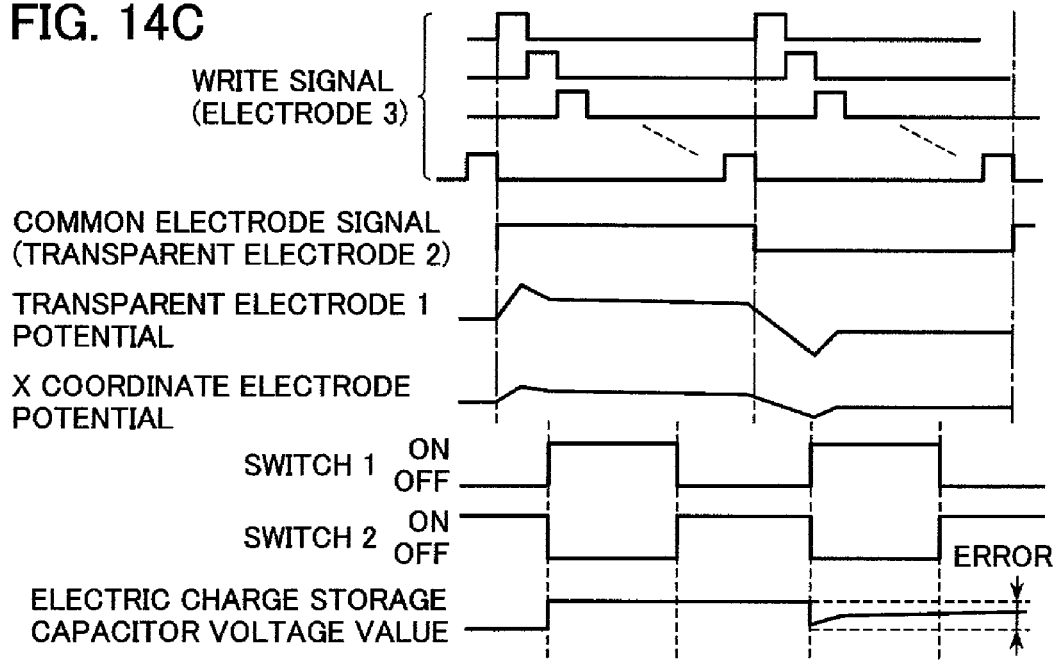
FIG. 14C

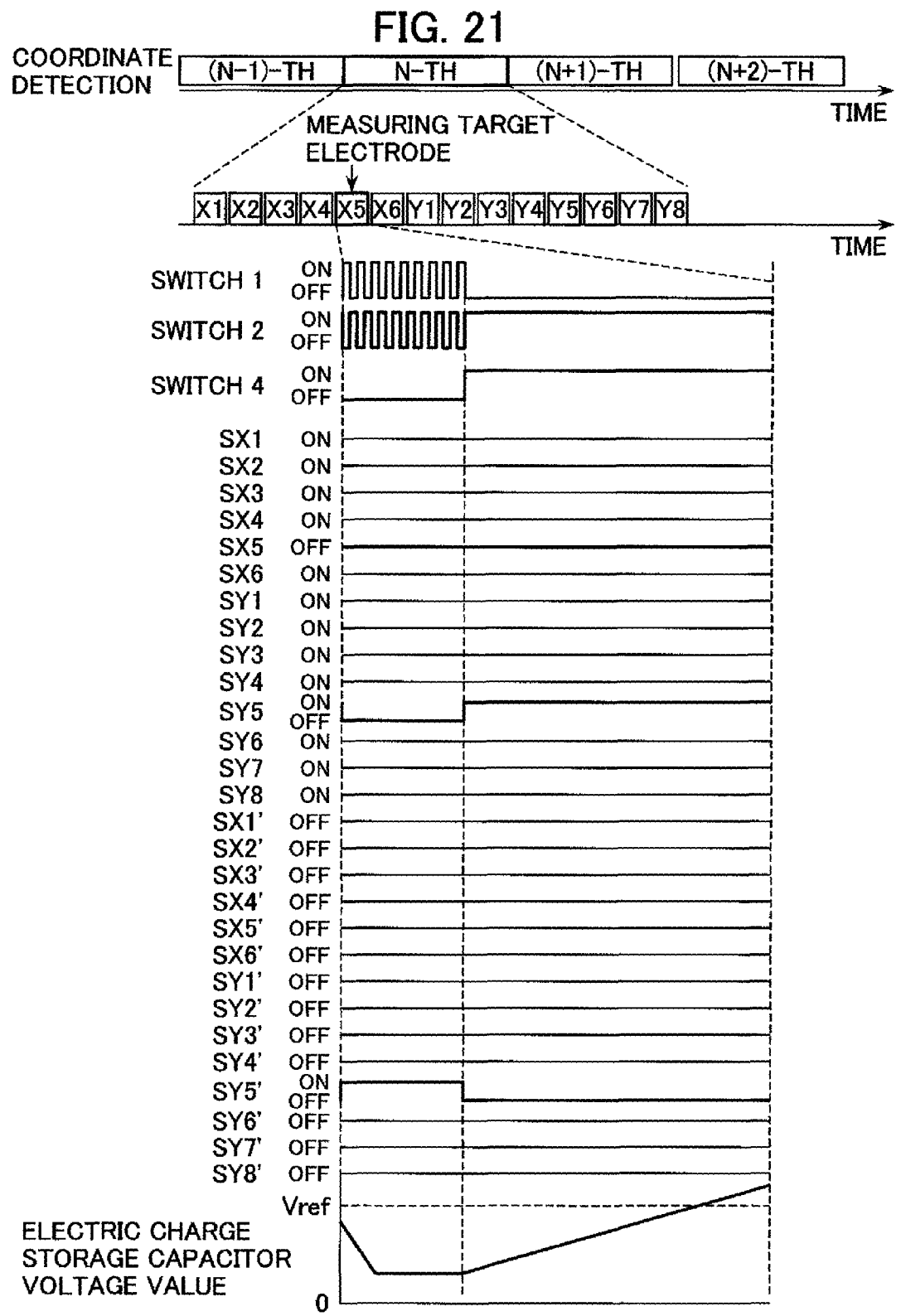

COORDINATE INPUT DEVICE AND DISPLAY DEVICE WITH THE SAME

CROSS-REFERENCE TO RELATED APPLICATIONS

The present application claims priority from Japanese applications JP2008-259588 filed on Oct. 6, 2008 and JP2009-098659 filed on Apr. 15, 2009, the contents of which are hereby incorporated by reference into this application.

BACKGROUND OF THE INVENTION

1. Field of the Invention

The present invention relates to a coordinate input device for inputting coordinates to a screen, and a display device including the same, and more particularly, to a technology suitable for achieving high coordinate detection accuracy in a coordinate input device of a capacitive coupling system.

2. Description of the Related Art

An image display device that has a sensor function in a display screen and a screen input function of inputting information by a touching operation using a finger or a stylus pen is used for a mobile electronic device such as a PDA or a portable terminal, various home electric appliances, or a stationary customer guidance terminal such as an automatic reception machine. As a sensing system used for the image display device which has such a screen input function, there are known a system for detecting changes in resistance value of a touched portion, a system for detecting changes in capacitance thereof, a system for detecting changes in light intensity of a portion shielded by touching, and the like. Among these systems, the system for detecting changes in capacitance has particularly grown in usage because of little influence on how a displayed image is seen and high durability.

U.S. Pat. No. 6,466,036 discloses a system for detecting changes in capacitance. This system is referred to as an electric charge transfer system. When a human finger or the like touches a sensor, a capacitance is generated between the finger and an electrode disposed in the sensor. Detection means includes a current source, an electric charge storage capacitor, and electric charge detection means. The detection means charges the capacitance, and transfers electric charges charged in the capacitance to the electric charge storage capacitor to charge the electric charges, and detects the amount of charged electric charges. When there is no touching on the sensor by a finger or the like, no capacitance is generated, and hence electric charges to be charged in the electric charge storage capacitor are reduced. Thus, the disclosed system is a system which determines presence of touching by a finger or the like based on the amount of electric charges charged in the electric charge storage capacitor.

U.S. Pat. No. 7,312,616 discloses a capacitance detection system based on a different system. This system is referred to as a successive approximate capacitance system. When a human finger or the like touches a sensor, a capacitance is generated between the finger and an electrode disposed in the sensor. Detection means includes a current source, an electric charge storage capacitor, and electric charge detection means. First, the detection means repeats charging and discharging of the capacitance at a fixed cycle, thereby taking out approximate constant currents from the current source and the electric charge storage capacitor. As a result, a charging potential of the electric charge storage capacitor charged to a fixed potential beforehand is lowered, causing a change in charging period of time required until the electric charge storage capacitor is charged to the fixed potential again. This temporal change depends on the amount of electric charges taken out by the charging and discharging. Further, the amount of electric charges taken out by the charging and discharging depends on a value of a capacitance generated between the electrode in the sensor and the finger or the like. Thus, measuring a change in charging period of time enables determination of presence of touching on the sensor by the finger or the like.

U.S. Pat. No. 7,235,983 discloses a capacitance detection circuit in a capacitive coupling system. In a detection system of the disclosed capacitance detection circuit, electric charges are charged in a sensor electrode capacitor for detecting a capacitance at a fixed voltage, and the amount of electric charges is detected by an integration circuit at a subsequent stage. In order to cancel offset of an operational amplifier used in the integration circuit, an integration voltage at the time of charging and an integration voltage at the time of discharging from the sensor electrode capacitor are alternately measured by switching control.

However, when the sensor employing the capacitance detection method disclosed in U.S. Pat. No. 6,466,036 or U.S. Pat. No. 7,312,616 is installed close to a display surface of a display device such as a liquid crystal display, influence of radiated noise generated by an operation of the display device may cause a problem such as a reduction in measuring accuracy. Thus, there is a need to establish a system which reduces influence of radiated noise or the like in the discussed usage form.

Referring to FIG. 43 and FIGS. 44A and 44B, the problem with the capacitance detection system disclosed in U.S. Pat. No. 7,235,983 is described. FIG. 43 simplifies a conventional capacitance detection circuit DCKT. The conventional detection circuit DCKT is constituted by an integration circuit which includes a switch SA for charging a capacitance detection sensor electrode (capacitance) Cs with a fixed voltage VDD, a switch SB for transferring electric charges charged in the sensor electrode capacitance Cs to the integration circuit, a switch SR for resetting an integration capacitor Ci and an integration value, and an operational amplifier. A terminal vi is an input terminal which interconnects the detection circuit DCKT and the sensor electrode capacitance Cs, and a terminal vo is an output voltage terminal of the detection circuit DCKT.

Each of FIGS. 44A and 44B is a waveform diagram when an integration voltage obtained by one charging or discharging operation for the sensor electrode capacitance Cs is set as an output signal of capacitance detection. FIG. 44A is a waveform diagram when only the sensor electrode capacitance Cs is connected to the input terminal vi in FIG. 43. FIG. 44B is a waveform diagram when touching occurs on the sensor electrode capacitance Cs to add a new input capacitance Cf. At a detection cycle Tdec_r, a period ta_r is a resetting period of the integration capacitor Ci, in which the switch SR is turned ON to reset an integration voltage charged in the integration capacitor Ci. Then, in a period tb_r, only the switch SA is turned ON to charge the sensor electrode capacitance Cs and the input capacitance Cf with the fixed voltage VDD. Lastly, in a period tc_r, the switch SA is turned OFF while the switch SB is turned ON to transfer electric charges charged in the sensor electrode capacitance Cs and the input capacitance Cf to the integration circuit. In the case of only the sensor electrode capacitance Cs as illustrated in FIG. 44A, an integration voltage becomes $-VDD \cdot Cs/Ci$. In the case of the input capacitance Cf as illustrated in FIG. 44B, an integration voltage becomes $-VDD \cdot (Cs+Cf)/Ci$. In the coordinate input device, these integration voltage values (output signals) are digitized by AD conversion, and then a difference between a digital signal when there is no input and a digital signal when there is an input is detected as an input signal to calculate touch coordinates.

In this case, though depending on a size of an input screen, the sensor electrode capacitance Cs is as large as several tens of pF, while the input capacitance Cf by a capacitance generated by a finger or the like is as small as several pF or smaller. Thus, even if an output voltage of the integration circuit is amplified by an amplifier before AD conversion, sufficient amplification is impossible due to offset of the integration value by the sensor electrode capacitance Cs, causing a problem that a dynamic range of the input signal after the AD conversion is narrow and input coordinates may not be accurately detected.

SUMMARY OF THE INVENTION

It is a first object of the present invention to provide a technology which enables detection without any accuracy deterioration even when a touch sensor of a capacitance system is installed close to a display device.

A capacitance detection device according to the present invention includes: a capacitance sensor electrode for detecting a capacitance; a power source for supplying electric charges to be charged in the capacitance sensor electrode; an electric charge storage capacitor in which an amount of electric charges to be charged therein changes according to the electric charges charged in the capacitance sensor electrode; and a switch for changing a reference potential of the electric charge storage capacitor. The reference potential of the electric charge storage capacitor is changed in a period of measuring the capacitance.

For example, a detection circuit includes the electric charge storage capacitor to charge electric charges supplied from a power source. A capacitance change caused by finger touching is detected based on the amount of electric charges moved from the electric charge storage capacitor to an electrode of the touch sensor. The electric charges moved to the electrode of the touch sensor are appropriately discharged via a switch. The reference potential of the electric charge storage capacitor is connected to a potential of a noise generation source via the switch, thereby canceling the noise entering from the electrode of the touch sensor to the electric charge storage capacitor.

It is a second object of the present invention to realize a capacitance detection circuit capable of detecting a very small input capacitance with a high signal to noise ratio in a coordinate input device which detects a capacitance.

Further, a coordinate input device according to the present invention uses a capacitance detection circuit including: a capacitance sensor electrode for detecting a capacitance; a first switching element for applying a fixed potential to the capacitance sensor electrode in order to detect the capacitance of the capacitance sensor electrode; a second switching element for transferring electric charges charged in the capacitance sensor electrode; and an integration circuit for detecting the electric charges transferred from the capacitance sensor electrode via the second switching element. The capacitance sensor electrode is connected to a voltage source for supplying the fixed potential via the first switching element, and is connected to an input terminal of the integration circuit via the second switching element. The input terminal of the integration circuit of the capacitance detection circuit is connected to a third switching element and one terminal of an adjustment capacitor for short-circuiting to a reference level of the integration circuit. Another terminal of the adjustment capacitor has an adjustment signal applied thereto.

As procedures for operating the capacitance detection circuit, in a first procedure, the first switching element, the second switching element, and the third switching element are turned OFF to reset an output signal of the integration circuit, in a second procedure, the first switching element is turned ON to apply the fixed potential to the capacitance sensor electrode, in a third procedure, the first switching element is turned OFF while the second switching element is turned ON to transfer the electric charges charged in the capacitance sensor electrode to the integration circuit, in a fourth procedure, the second switching element is turned OFF to change the adjustment signal by an amount equal to an adjustment voltage, in a fifth procedure, the third switching element is turned ON to reset the adjustment signal to a potential before the change, in a sixth procedure, the third switching element is turned OFF, and the first procedure to the sixth procedure constitute a capacitance detection cycle for the capacitance sensor electrode to operate the capacitance detection circuit.

In this case, the adjustment capacitor and the adjustment voltage are set so that in a state where there is no input operation for the capacitance sensor electrode, the output voltage of the integration circuit obtained through the first to third procedures and the amount of the change in output voltage of the integration circuit, which occurs due to detection of a current flowing into the adjustment capacitor for charging by the integration circuit through the fourth procedure may be almost equal to each other and as a result, an output signal of the capacitance detection circuit may be zero in the state where there is no input operation for the capacitance sensor electrode. Thus, only an input capacitance to be increased by touching is detected by the output signal.

According to the present invention, only the input capacitance to be increased by touching may be detected as the output signal. Thus, a dynamic range of the detectable input capacitance is widened, and detection accuracy is improved.

According to the present invention, a reduction in measuring accuracy of the sensor, which may be caused by employing the capacitance detection method, may be suppressed.

BRIEF DESCRIPTION OF THE DRAWINGS

In the accompanying drawings:

FIGS. 9A to 9D illustrate a touch sensor panel according to a first embodiment;

FIG. 10 illustrates a temporal change in charging potential of an electric charge storage capacitor of the touch sensor panel according to the first embodiment;

FIGS. 14A to 14C illustrate a generation process of a capacitance detection error;

FIG. 21 illustrates the touch sensor panel according to the sixth embodiment;

DETAILED DESCRIPTION OF THE INVENTION

Hereinafter, preferred embodiments of the present invention are described in detail with reference to the drawings.

First Embodiment

Figure 1A:
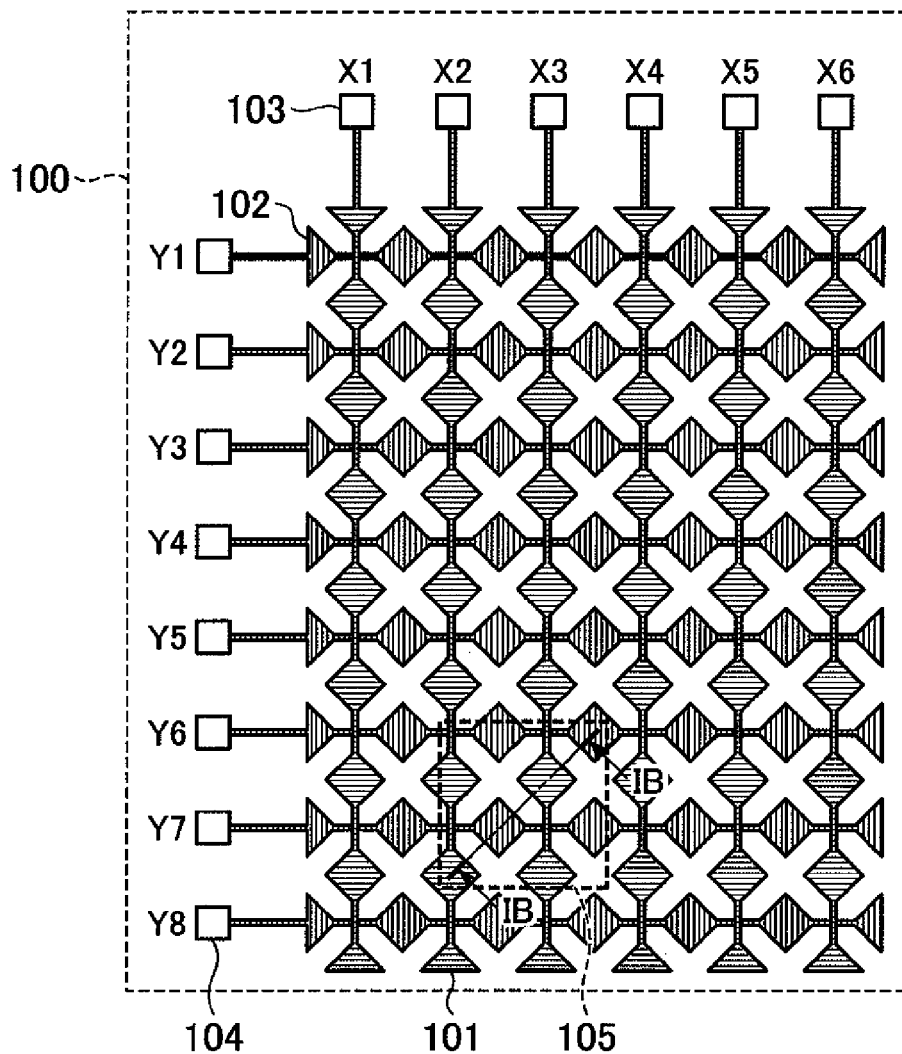
FIGS. 1A and 1B illustrate a structure of a touch sensor panel.
Figure 1B:
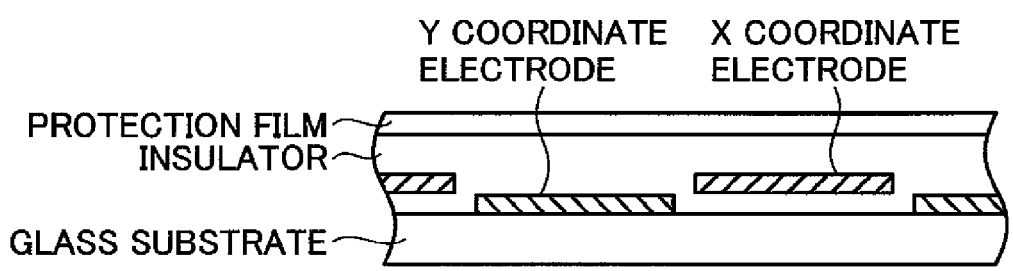

FIGS. 1A and 1B are schematic diagrams each illustrating a configuration example of a touch sensor panel according to a first embodiment of the present invention. FIG. 1A illustrates a planar configuration of a touch sensor panel 100. In order to detect touching by a finger or the like, a plurality of X coordinate electrodes 101 and a plurality of Y coordinate electrodes 102 are disposed. The X coordinate electrodes are connected in a column direction. The Y coordinate electrodes are connected in a row direction. Electrode terminals 103 and 104 are disposed for each group of such connected electrodes to enable electrical signal extraction.

FIG. 1B illustrates a sectional structure of the touch sensor panel 100. FIG. 1B is a cross sectional diagram along an IB-IB cutting line of an area 105 illustrated in FIG. 1A. There is an insulating layer on a substrate made of a material such as glass. In the insulating layer, each of the X coordinate electrodes and each of the Y coordinates electrode are formed in a state in which electrical insulation is maintained. A protection film is further formed on an uppermost portion.

Figure 2A:
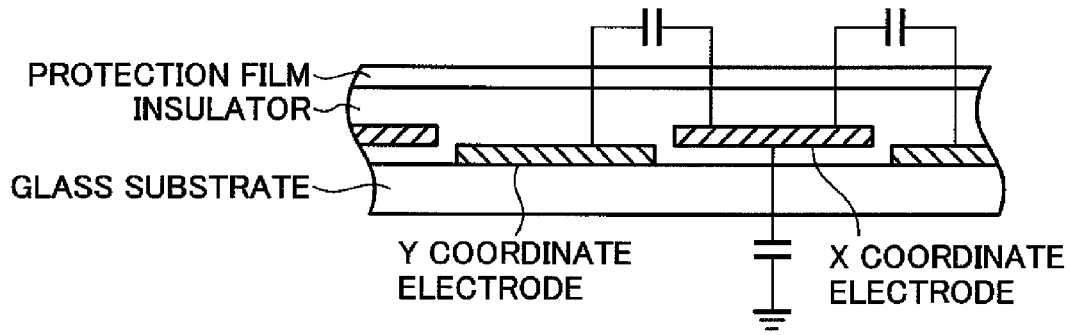
FIGS. 2A to 2C illustrate capacitances formed in the touch sensor panel.
Figure 2B:
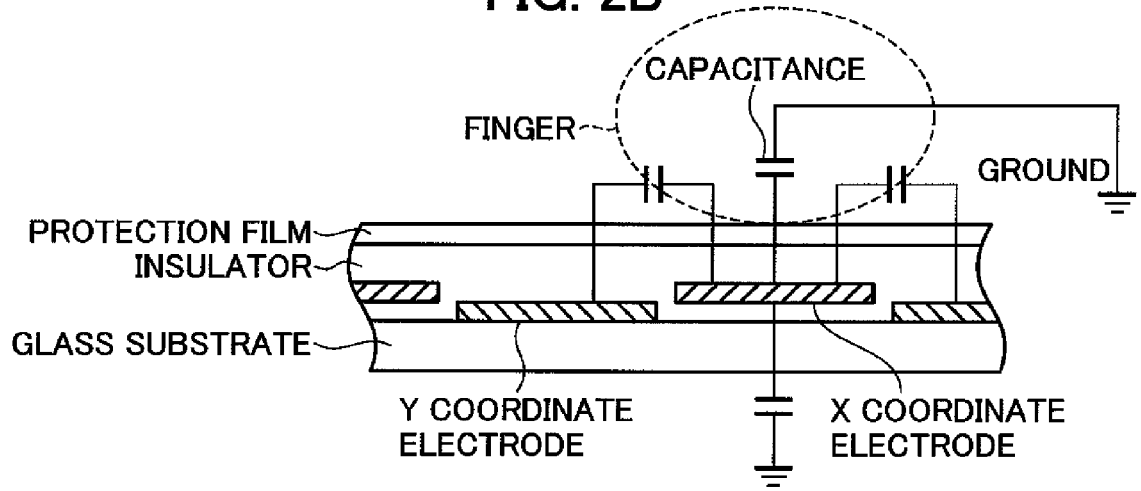
Figure 2C:
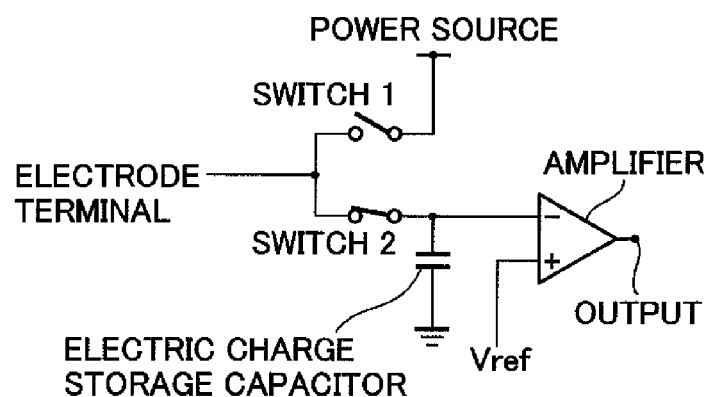

FIGS. 2A to 2C illustrate capacitances formed in the touch sensor panel. FIG. 2A illustrates a state of a capacitance formed while there is no touching by a finger or the like. Focusing on an X coordinate electrode 201 in the drawing, capacitances are formed between the electrode and an adjacent electrode and between the electrode and the ground. FIG. 2B illustrates a capacitance formed when a finger touches the touch sensor panel. In the drawing, a dotted-line ellipse indicates a finger. A human body may be grounded, and hence a new capacitance is formed between the finger and the electrode in addition to each capacitance which the touch sensor panel originally has. The touch sensor panel detects a difference between the capacitances. FIG. 2C illustrates an example of a detection circuit system for detecting changes in capacitance. A detection circuit is connected to the electrode terminals illustrated in FIG. 1A to measure a capacitance state of the touch sensor panel from a change in electrical signal. The illustrated circuit system is referred to as an electric charge transfer system. In this embodiment, a case where the present invention is applied to the electric charge transfer system is described.

Figure 3A:
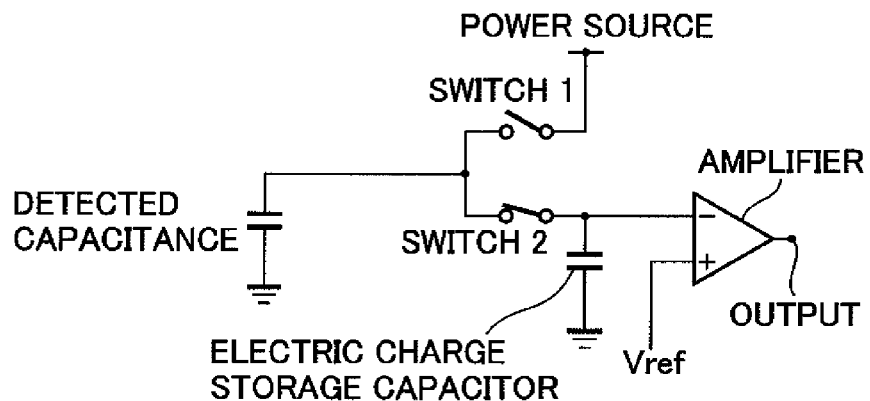
FIGS. 3A and 3B illustrate one system of capacitance detection.
Figure 3B:
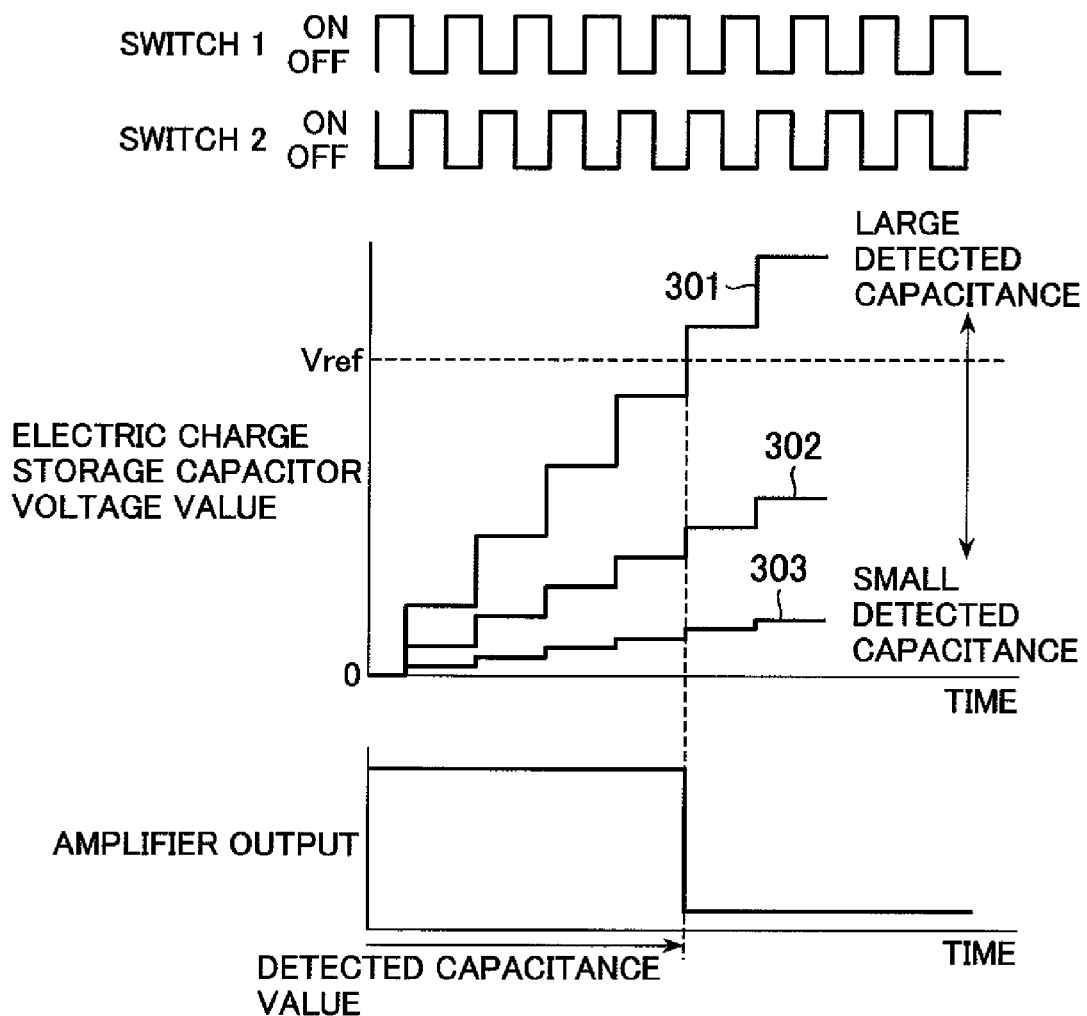

FIGS. 3A and 3B are conceptual diagrams of capacitance measurement performed by the electric charge transfer system. FIG. 3A illustrates a state where a capacitance is connected to the detection circuit of the electric charge transfer system. FIG. 3B illustrates an operation of an amplifier in the electric charge transfer system. Switches 1 and 2 in the circuit illustrated in FIG. 3A are alternately turned ON and OFF repeatedly. When the switch 1 is turned ON (switch 2 is OFF), a detected capacitance illustrated in FIG. 3A is charged. Then, when the switch 2 is turned ON (switch 1 is OFF), electric charges charged in a measured capacitance are transferred to an electric charge storage capacitor illustrated in FIG. 3A. By repeating this operation, as illustrated in FIG. 3B, a voltage value of the electric charge storage capacitor is increased in steps. The amplifier illustrated in FIG. 3A operates as a comparator circuit with a reference voltage (Vref). When a charging potential of the electric charge storage capacitor exceeds the reference voltage, an output is reversed, and the amplifier may detect that the charging potential of the electric charge storage capacitor has exceeded the reference potential. An increase rate of the charging potential of the electric charge storage capacitor accompanying ON and OFF control of the switches 1 and 2 is proportional to an amount of the measured capacitance. Thus, measuring a period of time from a start of ON and OFF control of the switches 1 and 2 until the charging potential of the electric charge storage capacitor exceeds the reference potential enables informing of a level of a value of the detected capacitance.

Figure 4A:
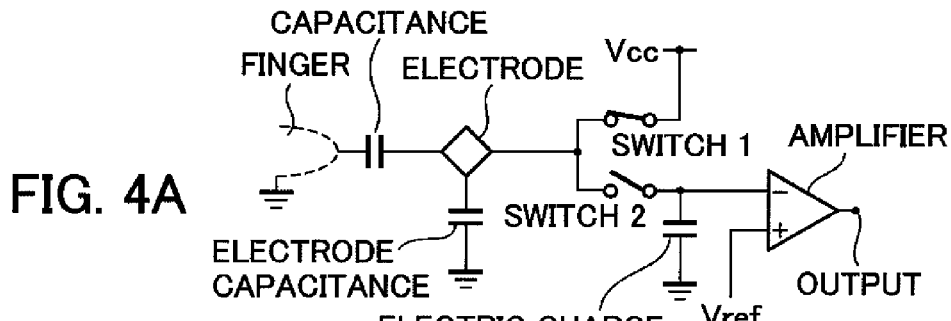
FIGS. 4A to 4F illustrate one system of the capacitance detection.
Figure 4B:
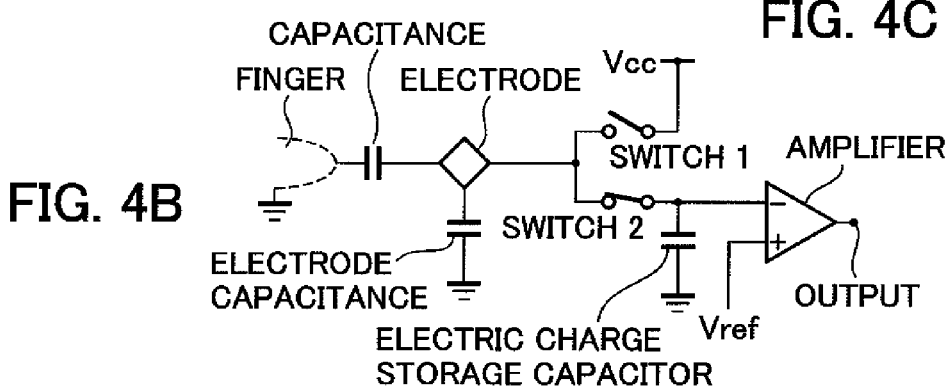
Figure 4C:
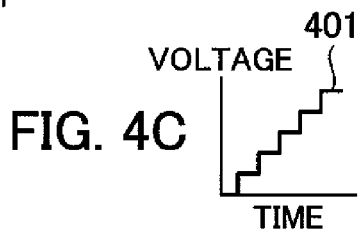
Figure 4D:
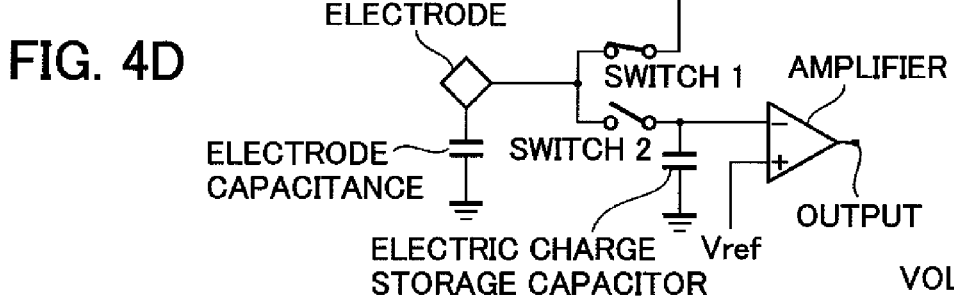
Figure 4F:
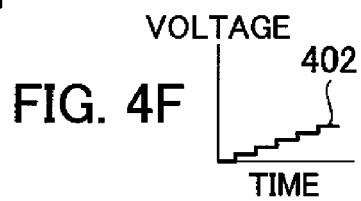
Figure 4E:
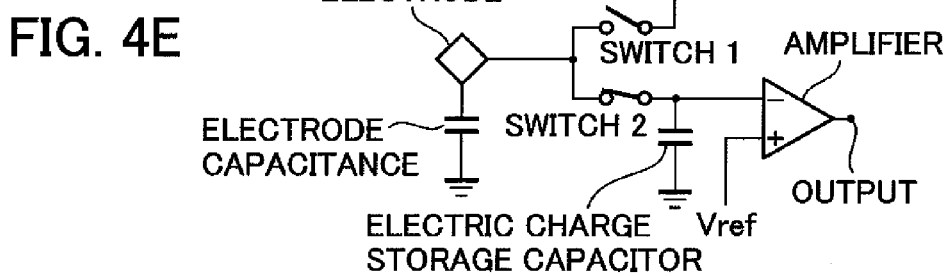

FIGS. 4A to 4F illustrate a system in which the capacitance detection system of the electric charge transfer system described above is applied to the touch sensor panel to detect touching on the touch sensor panel by a finger or the like. In this case, the capacitance that the touch sensor panel described above originally has is illustrated as an electrode capacitance. FIGS. 4A and 4B illustrate a touching state of the finger. A capacitance is formed between the electrode and the finger. In this condition, when an ON state of the switch 1 (switch 2 is OFF) illustrated in FIG. 4A and an ON state of the switch 2 (switch 1 is OFF) illustrated in FIG. 4B are repeated, the charging potential of the electric charge storage capacitor suddenly increases as illustrated in FIG. 4C. This sudden increase is due to increase in capacitance by the finger touching. On the other hand, FIGS. 4D and 4E illustrate a non-touching state of a finger. In this condition, when an ON state of the switch 1 (switch 2 is OFF) illustrated in FIG. 4D and an ON state of the switch 2 (switch 1 is OFF) illustrated in FIG. 4E are repeated, the charging potential of the electric charge storage capacitor slowly increases as illustrated in FIG. 4F. This slow increase is due to a reduction in capacitance caused by finger non-touching. Thus, detection of the state of the capacitance of the touch sensor panel enables detection of touching by a finger or the like.

Figure 5A:
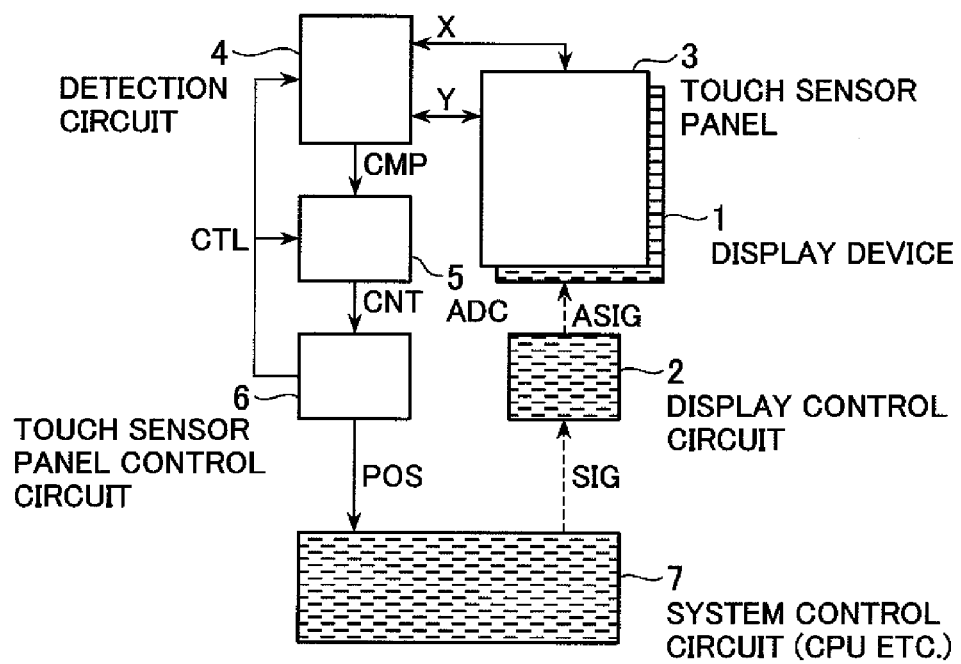
FIGS. 5A and 5B illustrate a relationship between the touch sensor panel and a display device.
Figure 5B:
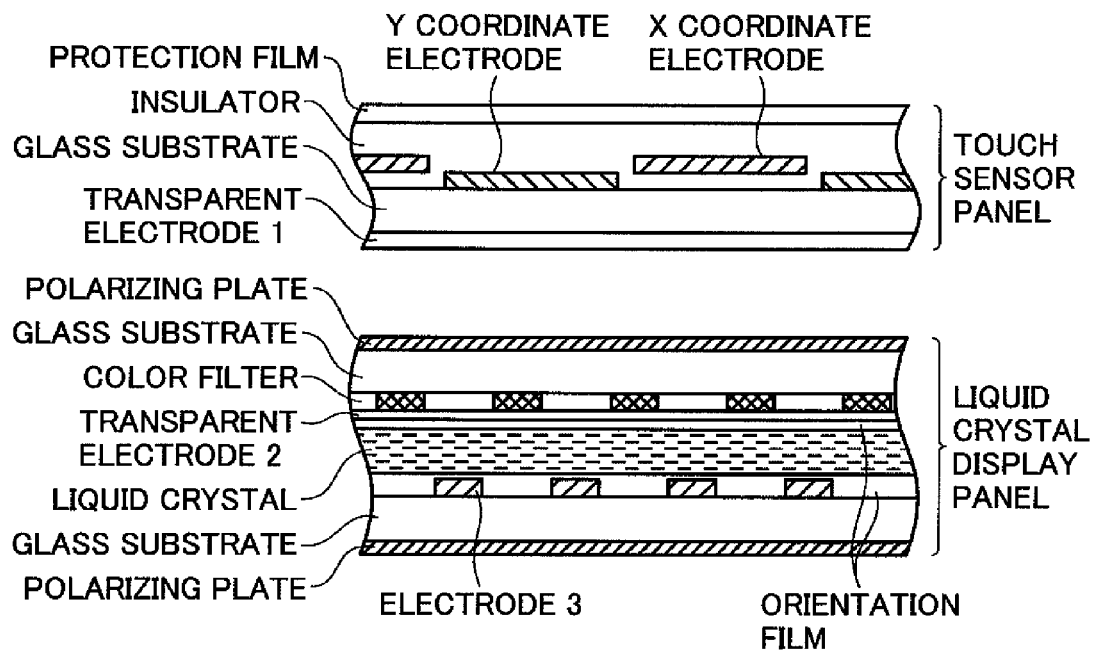

FIGS. 5A and 5B illustrate a configuration of a screen input type image display system which includes the touch sensor panel described above. In FIG. 5A, a touch sensor panel 3 is bonded to a surface of a display device 1. The display device 1 may be a liquid crystal display panel, an organic EL panel, or the like. However, the display device 1 is not limited to those panels. In this embodiment, the display device is described by taking an example of the liquid crystal display panel. A detection circuit 4 that includes the detection circuit of the electric charge transfer system detects touching on the touch sensor panel 3 by a finger or the like. A detection output CMP of the detection circuit 4 based on a detection result of a change in capacitance is sent to a touch sensor panel control circuit 6 via an analog/digital converter (ADC) 5 to determine touch coordinates (X coordinate and Y coordinate). The determined touch coordinate data POS is transferred to a main control circuit (constituted by a system control circuit, a microcomputer, a CPU or the like) 7 for controlling the entire screen input type image display device. The main control circuit 7 judges an occurrence of touching by a user and its coordinates from the touch coordinate data POS, and supplies a corresponding display signal SIG through a display control circuit 2 to the display device 1 to reflect the touching and the coordinates in displaying. The detection circuit 4 and the ADC 5 are controlled by the touch sensor panel control circuit 6. FIG. 5B illustrates a relationship between the touch sensor panel and the display device (taking an example of the liquid crystal display panel) in detail. An upper side is the touch sensor panel, and a sectional structure is as described above. In this embodiment, a transparent electrode 1 is formed in a lowest surface of the touch sensor panel. The transparent electrode 1 is disposed to block an electromagnetic wave. A lower side is the liquid crystal display panel. There is a wide variety of structures of liquid crystal display panels. However, the drawing illustrates a general structure. A liquid crystal layer is sealingly inserted between two upper and lower glass substrates. A transparent electrode 2 is provided below the upper glass substrate. This transparent electrode 2 is an electrode for providing a reference potential when a voltage is applied to the liquid crystal layer. An electrode 3 is formed on the lower glass substrate. The electrode 3 is an electrode for transmitting a control signal for providing an applied voltage value or voltage application timing to a switching element used when a voltage is applied to the liquid crystal layer. There are many other components provided. However, those components are unrelated to the essence of the present invention, and thus description thereof is omitted. In this embodiment, there has been described that the transparent electrode 1 is formed in the touch sensor panel. However, the transparent electrode 1 may similarly be formed on a side of the display device such as the liquid crystal display panel.

Figure 6A:
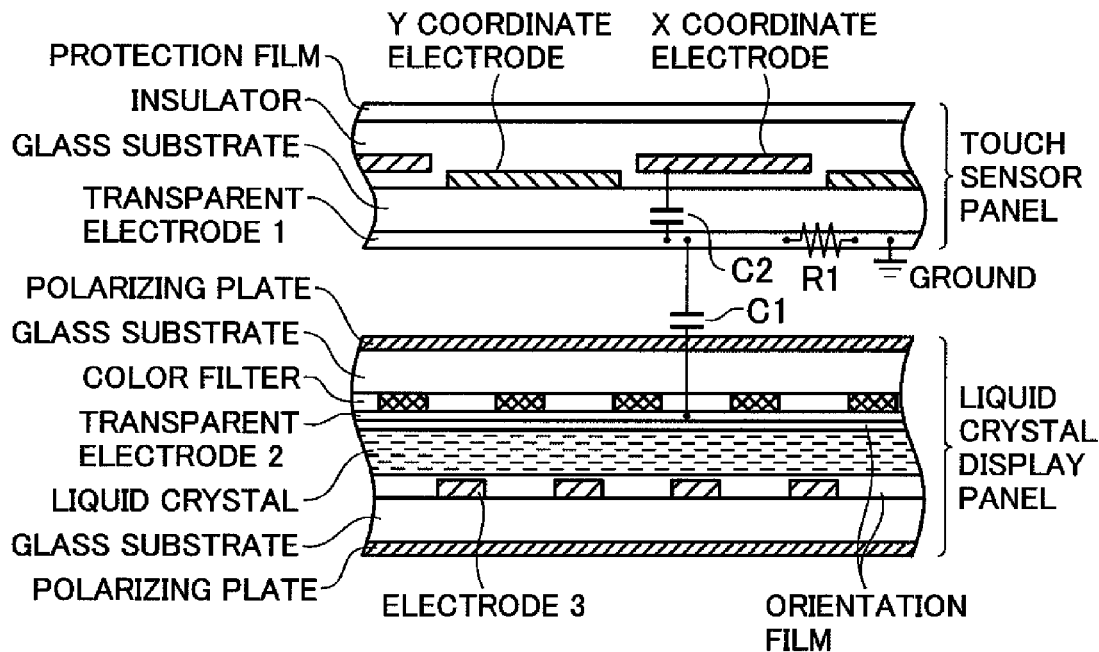
FIGS. 6A and 6B illustrate a relationship between the touch sensor panel and the display device.
Figure 6B:
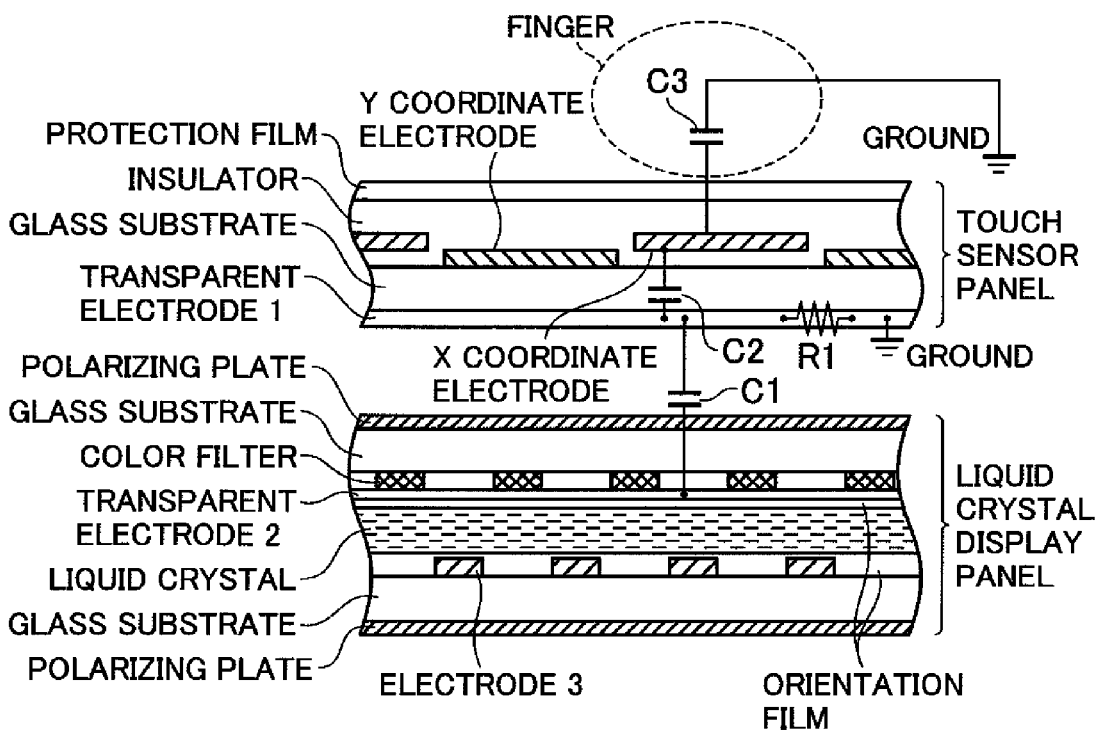

FIGS. 6A and 6B illustrate main capacitances formed when the touch sensor panel and the liquid crystal display panel are combined as described above. For simplicity, the above-mentioned capacitance (electrode capacitance) that the touch sensor panel originally has is omitted. As illustrated in FIG. 6A, among many formed capacitances, a capacitance C1 formed between the transparent electrode 2 in the liquid crystal display panel and the transparent electrode 1 disposed in the touch sensor panel and a capacitance C2 formed between each electrode and the transparent electrode 1 in the touch sensor panel are main capacitances. It is assumed that the transparent electrode 1 is grounded via its own resistance component. FIG. 6B illustrates a touching state by a finger or the like in addition to the state of FIG. 6A. As described above, the human body is grounded, and hence the finger or the like forms a capacitance C3 with each electrode in the touch sensor panel.

Figure 7A:
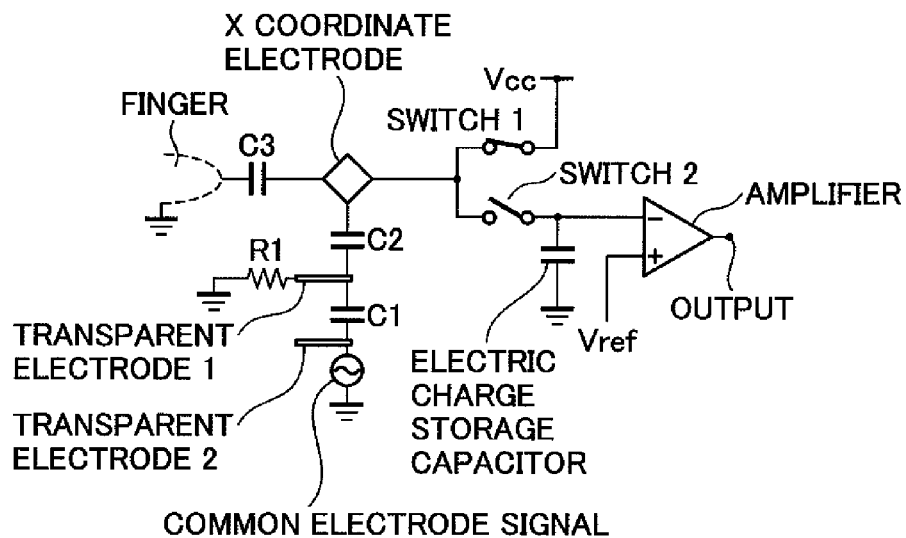
FIGS. 7A to 7D illustrate a generation process of a capacitance detection error.
Figure 7B:
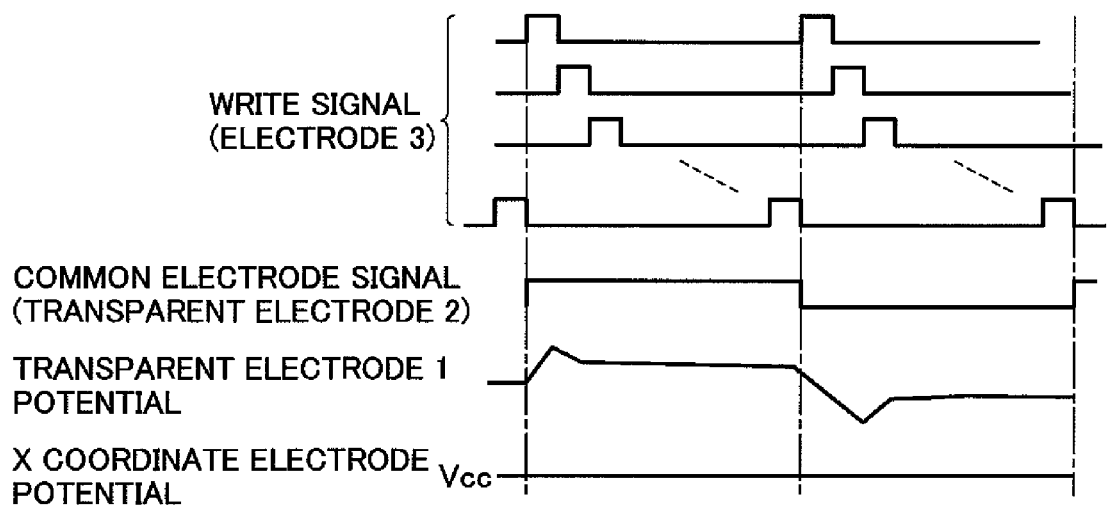
Figure 7C:
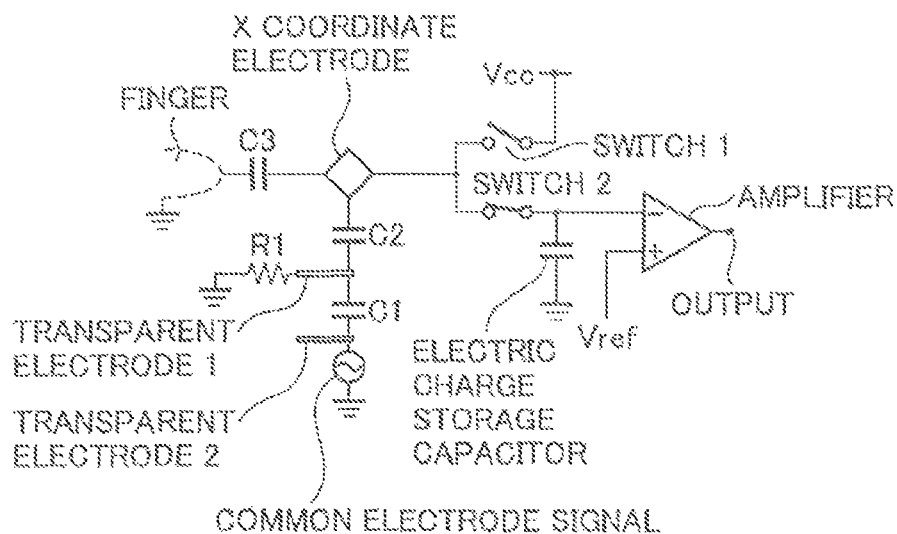
Figure 7D:
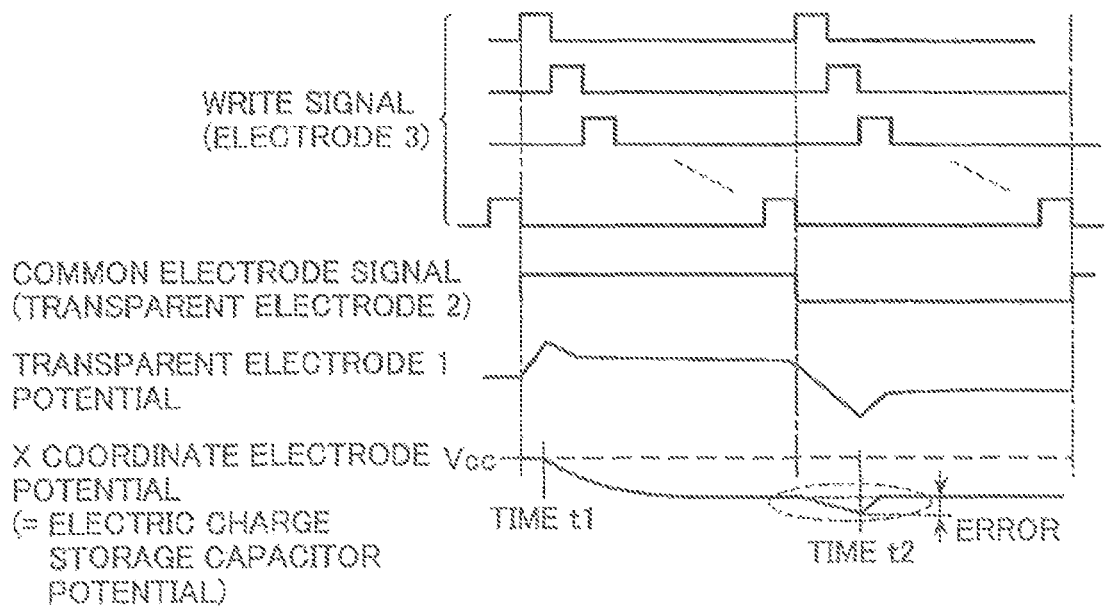

FIGS. 7A to 7D illustrate a state of performing finger touching detection by the electric charge transfer system in the configuration in which the touch sensor panel and the display device are combined. FIGS. 7A and 7C illustrate, focusing on one X coordinate electrode of the electrodes in the touch sensor panel, a capacitance detection system by an equivalent circuit in consideration of each capacitance described with reference to FIGS. 6A and 6B. FIG. 7A illustrates an ON state of the switch 1. FIG. 7C illustrates an ON state of the switch 2. A voltage of a common electrode signal that is a signal for controlling the transparent electrode 2 is coupled with the X coordinate electrode via the transparent electrode 2, the capacitance C1, the transparent electrode 1, and the capacitance C2. The capacitance C3 is formed between the X coordinate electrode and the finger. Further, the X coordinate electrode is connected to the detection circuit of the electric charge transfer system. FIG. 7B illustrates a relationship between a control signal of the liquid crystal display panel which is the display device of this embodiment and each electrode potential in the ON state of the switch 1 (switch 2 is OFF) illustrated in FIG. 7A. A write signal or the like for determining an applied voltage value to the liquid crystal layer is applied to the electrode 3. On the other hand, a voltage signal changed as a common electrode signal at a certain cycle is applied to the transparent electrode 2. As illustrated in FIG. 7A, one electrode is coupled with another via the capacitance, and hence the transparent electrode 1 is affected by the common electrode signal to change its potential. On the other hand, though coupled to the transparent electrode 1 via the capacitance, the X coordinate electrode is clamped at a potential Vcc to be stabilized because of the ON state of the switch 1. In other words, the capacitance C3 is charged to the potential Vcc. FIG. 7D illustrates a relationship between a control signal of the liquid crystal display panel which is the display device of this embodiment and each electrode potential in the ON state of the switch 2 (switch 1 is OFF) illustrated in FIG. 7C. The liquid crystal display panel operates as described above. On the other hand, it is assumed that the switch 2 is turned ON and the switch 1 is turned OFF asynchronously at time t1. Electric charges are transferred to the electric charge transfer capacitance, and hence the potential of the X coordinate electrode starts to drop from the time t1. In this state, the X coordinate electrode is released from the clamped state. Thus, the X coordinate electrode is affected by the potential change of the transparent electrode 1 via the capacitance C2 with the transparent electrode 1, and its potential changes while the drop due to the electric charge transfer and the potential fluctuation influence via the capacitance are superimposed. For example, when the switch 1 is turned ON and the switch 2 is turned OFF at time t2 when potential fluctuation occurs, the fluctuation is held as a charging potential of the electric charge storage capacitor. As a result, an error occurs in a charging potential state of the electric charge storage capacitor to be determined solely by electric charge transfer.

Figure 8:
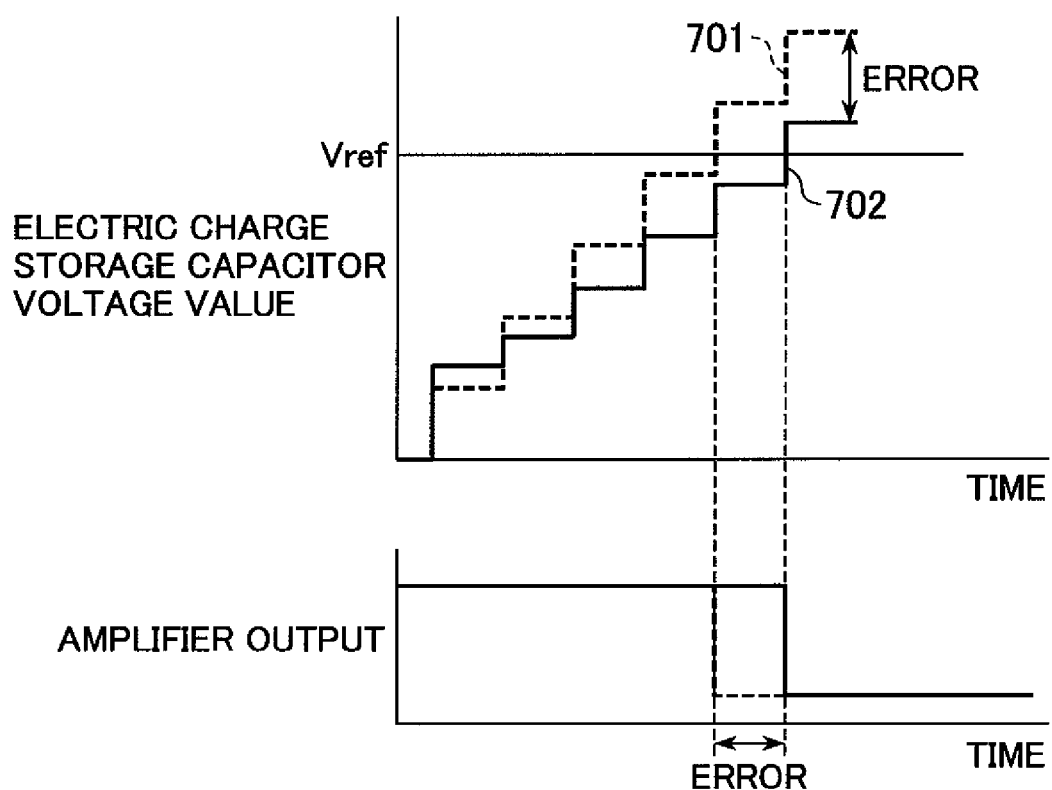
FIG. 8 illustrates a generation process of the capacitance detection error.

FIG. 8 illustrates influence of error mixing in the charging potential of the electric charge storage capacitor. As described above, in the electric charge transfer system, alternate turning-ON and OFF of the switches 1 and 2 leads to the stepped increase in charging potential of the electric charge storage capacitor. In this case, if there is the error mixing described above, an error occurs in voltage increase rate between steps, causing a change in period of time until the reference potential Vref is reached. This temporal change becomes a capacitance detection error.

Figure 9A:
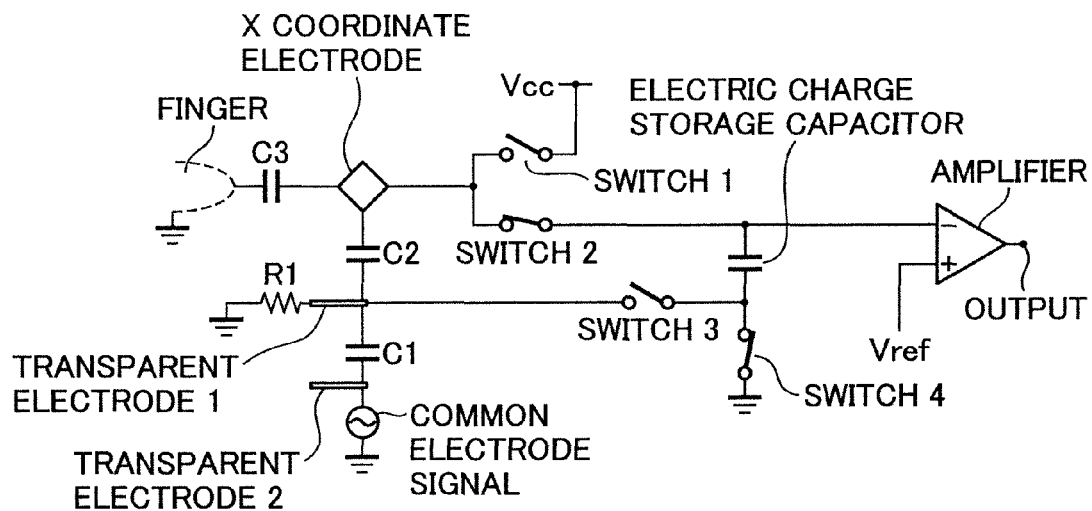
Figure 9B:
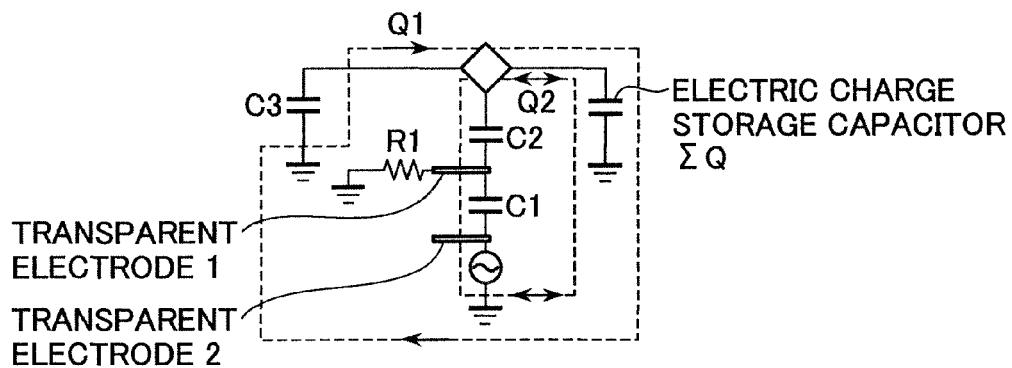
Figure 9C:
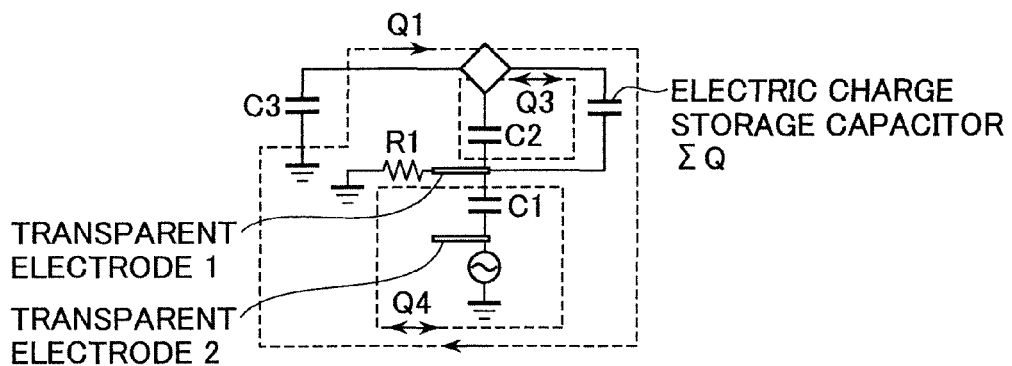

FIGS. 9A to 9D illustrate an exemplary configuration of the embodiment of the present invention for reducing the capacitance detection error described above. In this embodiment, in order to reduce the capacitance detection error described above, a function of switching the reference potential of the electric charge storage capacitor at an arbitrary timing is provided. FIG. 9A illustrates a configuration of each capacitance and the detection circuit system. A switch 3 and a switch 4 are disposed in the terminal on the reference potential side of the electric charge storage capacitor. The other end of the switch 3 is connected to the transparent electrode 1. The other end of the switch 4 is connected to the ground. FIG. 9B illustrates an electric charge moving state in a time zone in which the switch 2 is ON in a conventional configuration. The electric charge storage capacitor charges an electric charge Q1 from the capacitance C3 and an electric charge Q2 supplied from the common electrode signal or the like via the capacitances C1 and C2. The electric charge Q2 is a random noise component, and hence noise is generated in the charging potential of the electric charge storage capacitor. FIG. 9C illustrates an electric charge moving state in a time zone in which the switch 2 is ON in the configuration of the embodiment of the present invention. Specifically, the switch 3 illustrated in FIG. 9A is turned ON (switch 4 is turned OFF) to set a potential of the transparent electrode 1 as a reference potential of the electric charge storage capacitor. Thus, the electric charge storage capacitor charges the electric charge Q1 from the capacitance C3, and a very small electric charge Q3 charged in the coupling capacitance C2. Almost no electric charge Q4 that becomes a random noise component is charged because the reference potential of the electric charge storage capacitor is set as the potential of the transparent electrode 1 to cause an in-phase change. Accordingly, charging potential noise of the electric charge storage capacitor is reduced. FIG. 9D illustrates operation timing of the switches 1 to 4. As described above, when the switch 1 is turned OFF and the switch 2 is turned ON at the time t1, the potential of the X coordinate electrode drops due to the electric charge transfer. At this time, because of influence of potential fluctuation caused by the operation of the liquid crystal display panel via capacitive coupling, fluctuation is superimposed. When the switch 3 is turned ON at timing of the time t1, the reference potential of the electric charge storage capacitor becomes a potential of the transparent electrode 1. Thus, potential fluctuation superimposed on the change of the X coordinate electrode potential becomes a component roughly in-phase to the reference potential of the electric charge storage capacitor. As a result, influence on the electric charge storage capacitor potential is reduced. For example, even if the switch 1 is turned ON and the switch 2 is turned OFF at the time t2, no mixing of a potential fluctuation component occurs in the potential of the electric charge storage capacitor.

FIG. 10 illustrates effects of this embodiment. As described above, alternate turning-ON and OFF of the switches 1 and 2 of the electric charge transfer system leads to the stepped increase in charging potential of the electric charge storage capacitor. In this case, if there is the error mixing described above, an error occurs in voltage increase rate between the steps, causing a change in period of time until the reference potential Vref is reached. In this embodiment, however, the influence of such mixing is reduced. As a result, occurrence of a capacitance detection error is suppressed.

Second Embodiment

Figure 11A:
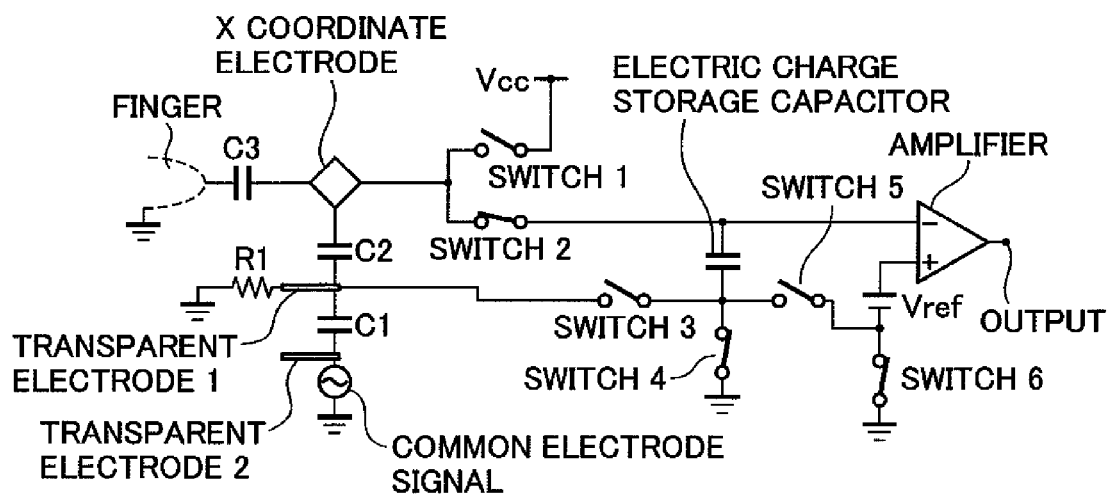
FIGS. 11A and 11B illustrate a touch sensor panel according to a second embodiment.
Figure 11B:
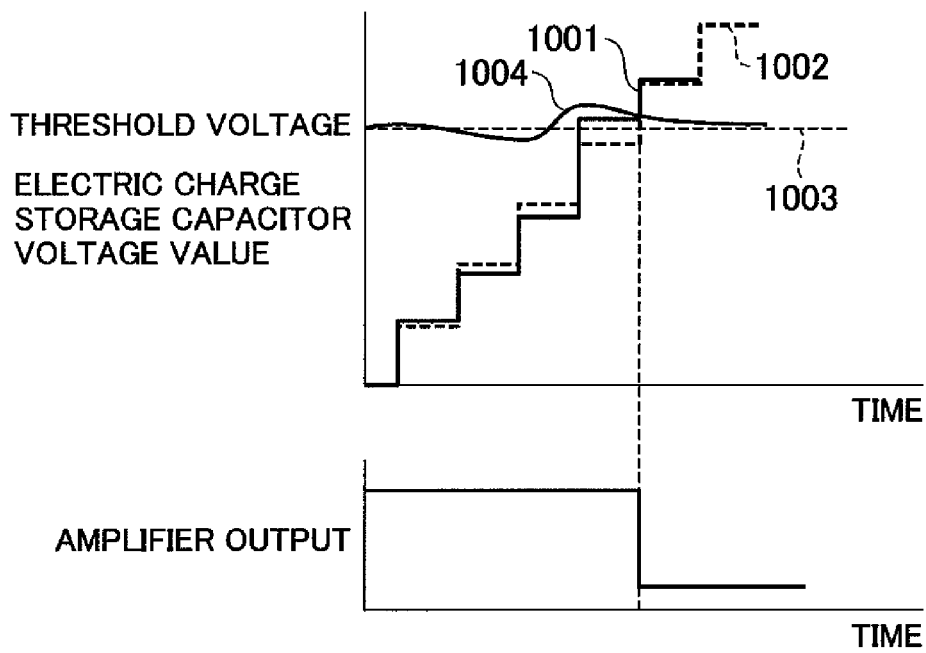

FIGS. 11A and 11B illustrate a second embodiment of the present invention. In this embodiment, as illustrated in FIG. 11A, a switch 5 and a switch 6 are added to the configuration of the first embodiment. One end of each of the switches 5 and 6 is connected to a reference potential of a voltage source for generating a reference potential Vref of an amplifier. The other end of the switch 5 is connected to a reference potential side of an electric charge storage capacitor, and the other end of the switch 6 is connected to a ground. Operations of switches 3 and 4 are similar to those of the first embodiment. The switch 5 and the switch 6 respectively operate in synchronization with the switch 3 and the switch 4. FIG. 11B illustrates effects of this embodiment. The switch 5 operates in synchronization with the switch 3 to set the reference potential of the voltage source for generating the reference potential Vref of the amplifier as a potential of a transparent electrode 1. Potential fluctuation of the transparent electrode 1 is accordingly superimposed on the reference potential Vref of the amplifier. Thus, even when an X coordinate electrode changes in potential due to the potential change of the transparent electrode 1, the reference potential Vref of the amplifier simultaneously changes. As a result, fluctuation in timing of exceeding the reference potential is suppressed, and a reduction in detection accuracy of a capacitance is suppressed.

Third Embodiment

Hereinafter, an embodiment in which the present invention is applied to a detection system for a capacitance based on a successive approximate capacitance system is described.

Figure 12A:
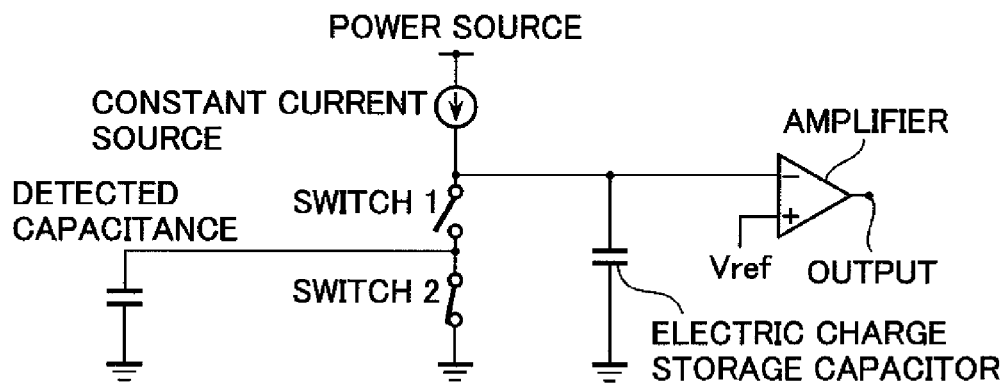
FIGS. 12A and 12B illustrate one system of capacitance detection.
Figure 12B:
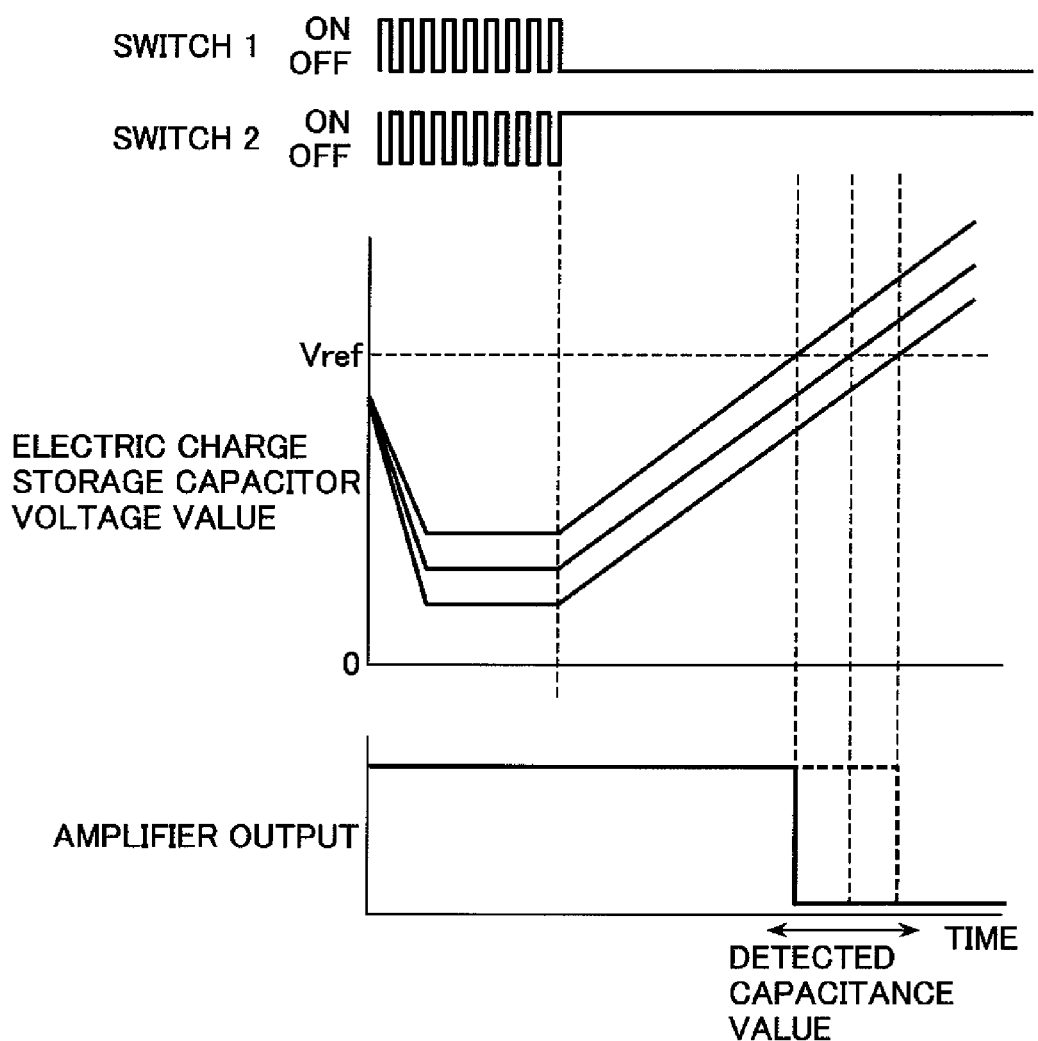

FIGS. 12A and 12B are conceptual diagrams illustrating capacitance measurement by the successive approximate capacitance system. FIG. 12A illustrates a state where a capacitance is connected to the detection circuit of the successive approximate capacitance system. FIG. 12B illustrates an operation of the successive approximate capacitance system. A switch 1 and a switch 2 in the circuit illustrated in FIG. 12A are alternately turned ON and OFF repeatedly for a given period of time. When the switch 1 is turned ON (switch 2 is OFF), a detected capacitance illustrated in FIG. 12A is charged. In this case, the charged electric charges are supplied from a constant current source and an electric charge storage capacitor. Then, when the switch 2 is turned ON (switch 1 is OFF), electric charges charged in a measured capacitance are discharged, and the charged electric charges of the detected capacitance become 0. When this process is repeated for a given period of time, in the electric charge storage capacitor, electric charge emission to the detected capacitance and charging from the constant current source are repeated, and hence a charging potential of the electric charge storage capacitor is stabilized at a low fixed potential as illustrated in FIG. 12B. A value at which the charging potential of the electric charge storage capacitor is stabilized depends on an amount of the detected capacitance. The value is lower as the detected capacitance is larger, and higher as the detected capacitance is smaller. Then, when the switch 1 is kept OFF and the switch 2 is kept ON, only charging to the electric charge storage capacitor from the constant current source is performed, resulting in an increase in potential thereof at a fixed increase rate. The charging potential of the electric charge storage capacitor is compared with a reference potential of an amplifier, and exceeding of the charging potential over the reference potential is detected. A period of time until the charging potential exceeds the reference potential depends on a potential at which the charging potential of the electric charge storage capacitor is stabilized during alternate turning-ON and OFF of the switches 1 and 2. The period of time is longer as the potential is lower, and shorter as the potential is higher. Thus, measuring a period of time until the charging potential exceeds the reference potential enables measurement of a level of a capacitance value of the detected capacitance.

Figure 13A:
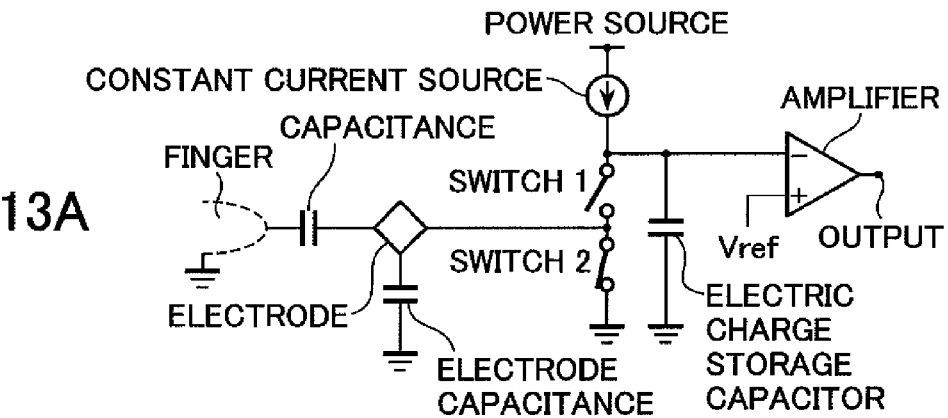
FIGS. 13A to 13D illustrate one system of the capacitance detection.
Figure 13B:
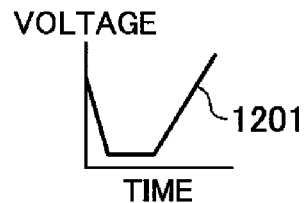
Figure 13C:
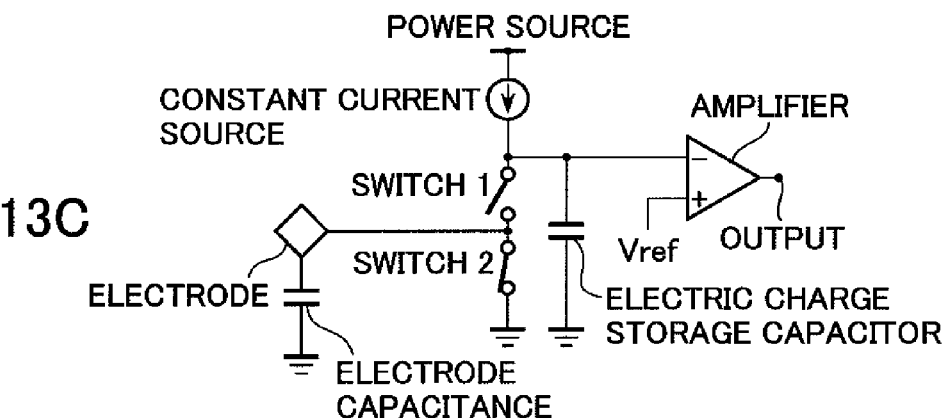
Figure 13D:
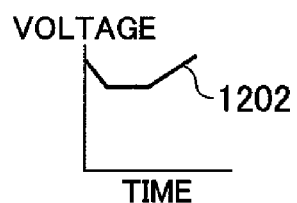

FIGS. 13A to 13D illustrate a system for detecting touching by a finger or the like, in which the capacitance measurement by the successive approximate capacitance system is applied to a touch sensor panel. FIG. 13A illustrates a case where the finger touches the touch sensor panel. Regarding an electrode in the touch sensor panel, in addition to an electrode capacitance that the electrode originally has, a capacitance is formed between the electrode and the finger. A charging potential of the electric charge storage capacitor obtained in this condition is as illustrated in FIG. 13B. On the other hand, when there is no finger touching as illustrated in FIG. 13C, only the original electrode capacitance is formed in the electrode of the touch sensor panel, and hence an obtained charging potential waveform of the electric charge storage capacitor is as illustrated in FIG. 13D. A potential reduction is limited during turning-ON and OFF of the switches 1 and 2, and subsequent recovery is fast. This difference enables detection of presence of finger touching on the sensor.

FIGS. 14A to 14C illustrate a process of finger touching detection performed by applying the successive approximate capacitance system to the configuration illustrated in FIGS. 6A and 6B in which the touch sensor panel and the display device (liquid crystal display device) are combined.

FIG. 14A illustrates, focusing on one X coordinate electrode of electrodes in the touch sensor panel, a capacitance detection system as an equivalent circuit in consideration of the capacitances described with reference to FIGS. 6A and 6B. A voltage of a common electrode signal that is a signal for controlling the transparent electrode 2 is coupled with the X coordinate electrode via the transparent electrode 2, the capacitance C1, the transparent electrode 1, and the capacitance C2. A capacitance C3 is formed between the X coordinate electrode and a finger. Further, the X coordinate electrode is connected to the detection circuit of the successive approximate capacitance system. FIG. 14B illustrates a change in charging potential of the electric charge storage capacitor obtained when a detection operation is performed in the configuration illustrated in FIG. 14A. In the first half of the detection operation, the switch 1 and the switch 2 are alternately turned ON and OFF to reduce a charging potential of the electric charge storage capacitor. Then, the switch 1 is turned OFF while the switch 2 is turned ON to charge the electric charge storage capacitor again. A period of time until this charging potential exceeds a reference potential Vref is measured. FIG. 14C illustrates a combination of an enlarged time zone 1301 indicated by a dotted line in FIG. 14B and an operation waveform of the display device. When a display operation causes a change in potential of each electrode in the display device, a potential change also occurs in the transparent electrode 1 capacitively-coupled with the electrode in the display device. Further, a potential change occurs in the electrode of the touch sensor panel capacitively-coupled with the transparent electrode 1. Potential fluctuation thus generated in the electrodes in the touch sensor panel is mixed with the charging potential of the electric charge storage capacitor accompanying the detection operation of the successive approximate capacitance system to cause an error in charge potential.

Figure 15A:
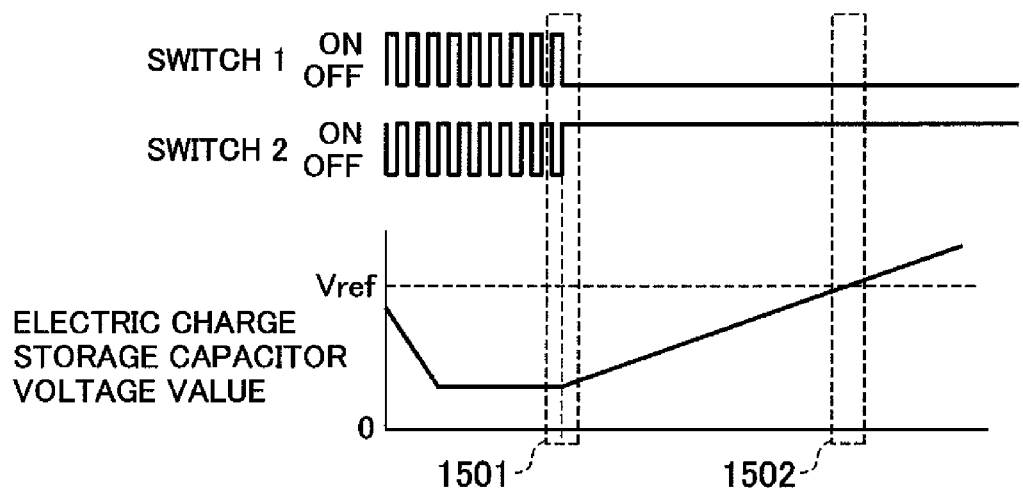
FIGS. 15A and 15B illustrate a generation process of the capacitance detection error.
Figure 15B:
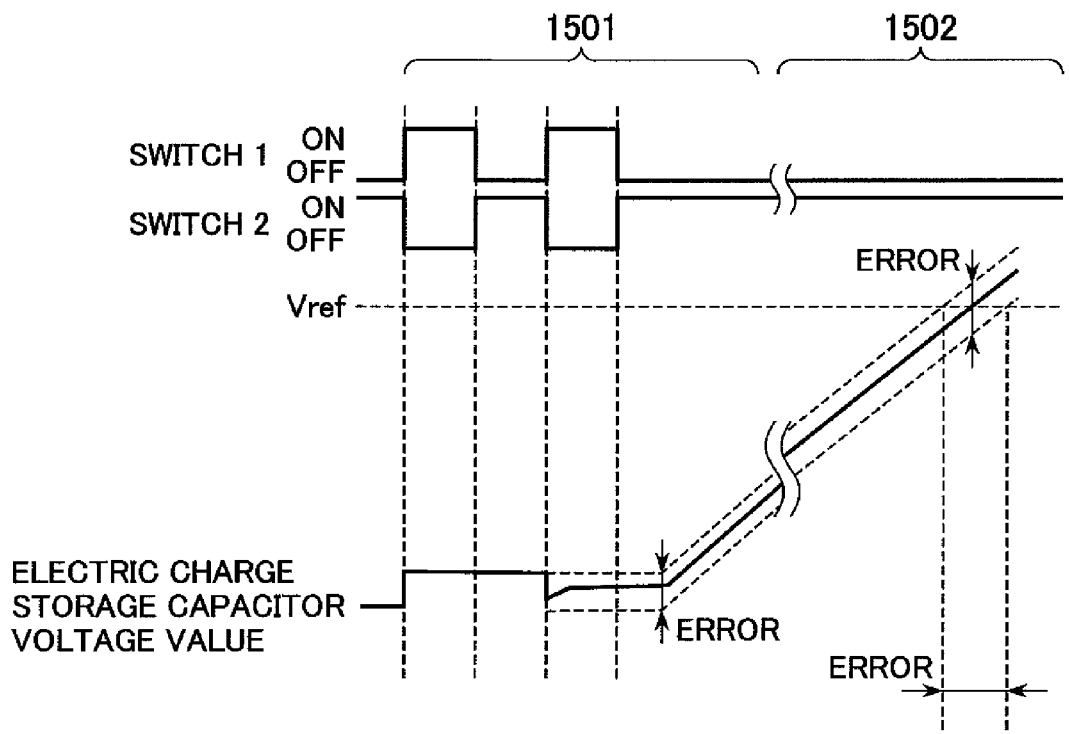

FIGS. 15A and 15B illustrate influence of the occurrence of an error in charging potential of the electric charge storage capacitor on detection accuracy in the successive approximate capacitance system. FIG. 15A illustrates an overall operation waveform of the successive approximate capacitance system. FIG. 15B illustrates enlarged time zones 1501 and 1502 indicated by dotted lines in FIG. 15A. As described above referring to FIG. 14C, the potential fluctuation caused by the operation of the display device is mixed with the charging potential of the electric charge storage capacitor to generate an error. At a point of time when the turning-ON and OFF operation of the switches 1 and 2 is completed to change the switch 1 to OFF and the switch 2 to ON, a charging potential of the electric charge storage capacitor takes a random value within an error range due to the mixing of the potential fluctuation. In this state, when charging of the electric charge storage capacitor progresses, a time when the reference potential Vref is exceeded varies as illustrated within the time zone 1502, and hence an error occurs in detection value of the capacitance.

Figure 16A:
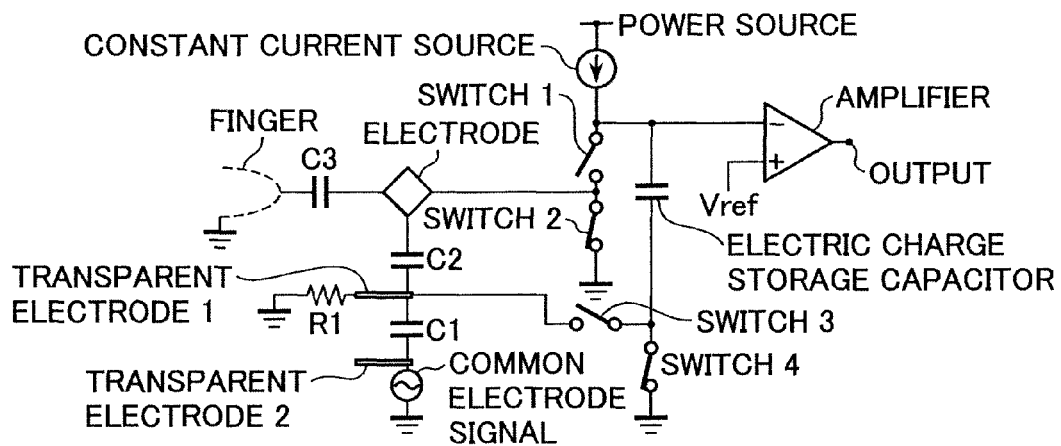
FIGS. 16A to 16D illustrate a touch sensor panel according to a third embodiment.
Figure 16B:
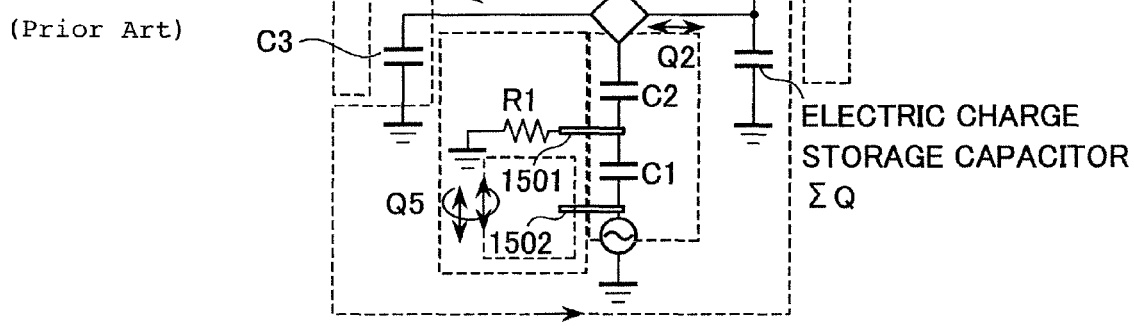
Figure 16C:
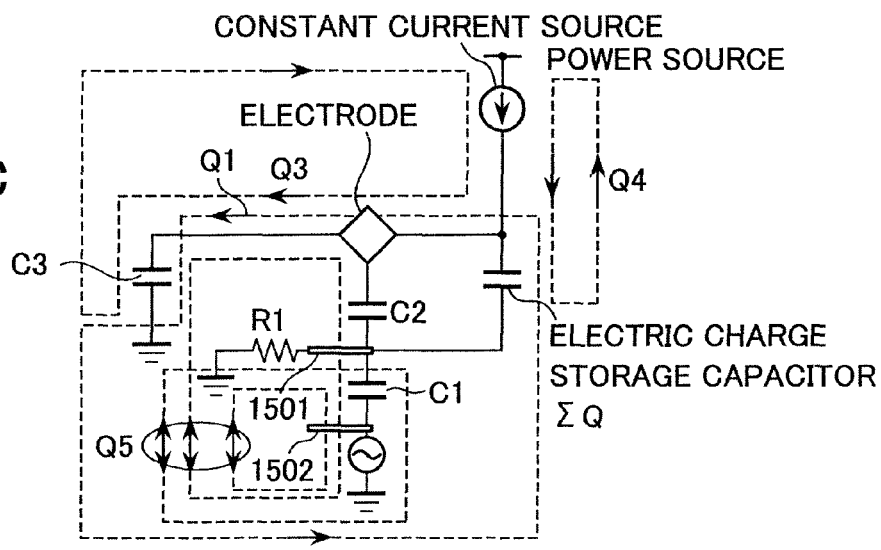
Figure 16D:
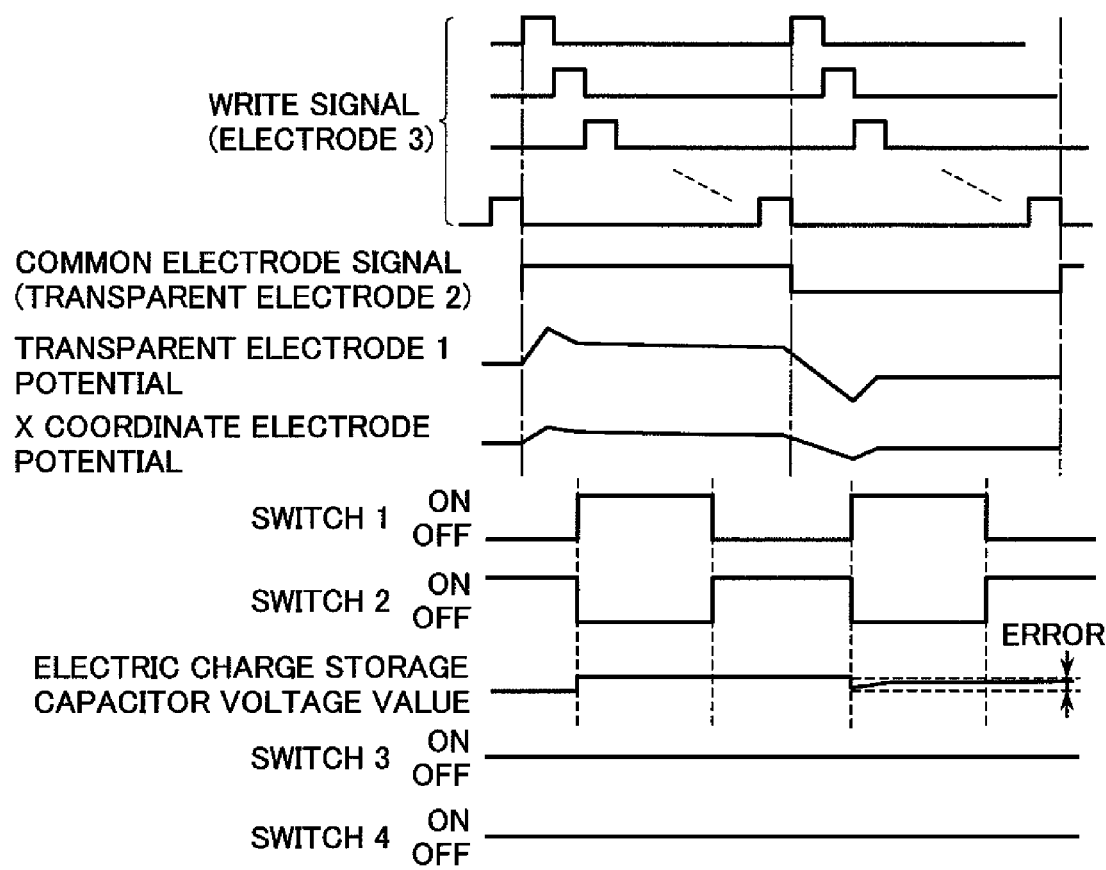

FIGS. 16A to 16D illustrate an exemplary configuration of the embodiment of the present invention for reducing the capacitance detection error. In this embodiment, in order to reduce the capacitance detection error, a function of switching the reference potential of the electric charge storage capacitor at an arbitrary timing is provided. FIG. 16A illustrates a configuration of each capacitance and the detection circuit system. A switch 3 and a switch 4 are disposed in the terminal of the reference potential side of the electric charge storage capacitor. The other end of the switch 3 is connected to the transparent electrode 1. The other end of the switch 4 is connected to the ground. FIG. 16B illustrates an electric charge moving state at a time zone in which the switch 1 is ON in a conventional configuration. The electric charge storage capacitor charges and discharges an electric charge Q4 supplied from the constant current source, an electric charge Q1 supplied to the capacitance C3, and an electric charge Q2 supplied from the common electrode signal or the like via the capacitances C1 and C2. The electric charge Q2 is a random noise component, and hence noise is generated in the charging potential of the electric charge storage capacitor. FIG. 16C illustrates an electric charge moving state at a time zone in which the switch 1 is ON in the configuration of the embodiment of the present invention. Specifically, the switch 3 illustrated in FIG. 16A is turned ON (switch 4 is turned OFF) to set a potential of the transparent electrode 1 as a reference potential of the electric charge storage capacitor. The electric charge storage capacitor charges and discharges the electric charge Q4 supplied from the constant current source and the electric charge Q1 supplied to the capacitance C3. Electric charges, which cause random noise components, and are supplied from the common electrode signal or the like via the capacitances C1 and C2, are not almost charged, because the reference potential of the electric charge storage capacitor is set as the potential of the transparent electrode 1 to cause an in-phase change. Accordingly, charging potential noise of the electric charge storage capacitor is reduced. As illustrated in FIG. 16D, potential fluctuation superimposed on the change of the X coordinate electrode potential becomes a component roughly in-phase to the reference potential of the electric charge storage capacitor. As a result, influence on the electric charge storage capacitor potential is reduced.

Figure 17A:
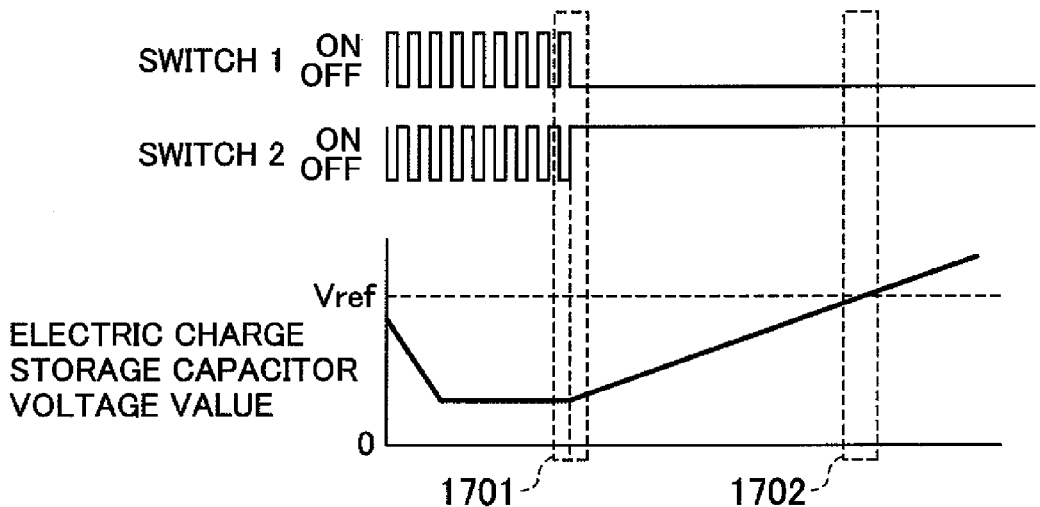
FIGS. 17A and 17B illustrate the touch sensor panel according to the third embodiment.
Figure 17B:
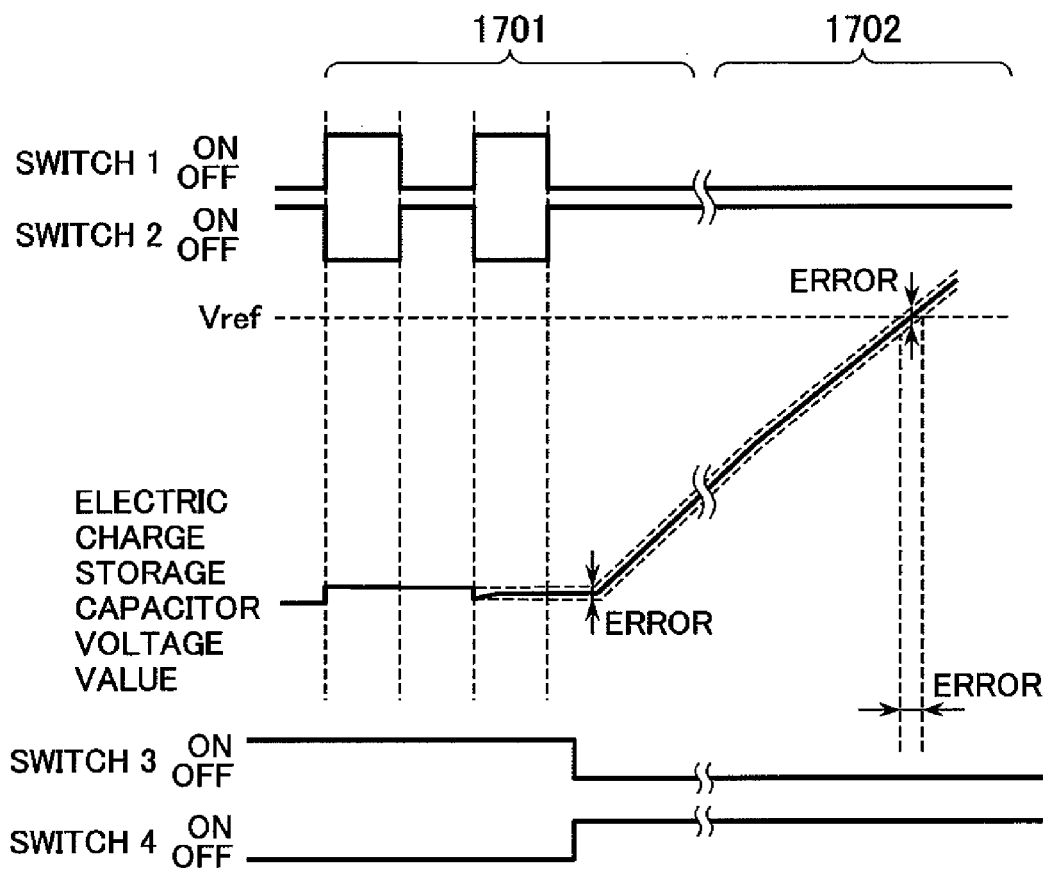

FIGS. 17A and 17B illustrate effects of this embodiment. FIG. 17A illustrates an overall operation waveform of the successive approximate capacitance system. FIG. 17B illustrates enlarged time zones 1701 and 1702 indicated by dotted lines in FIG. 17A. As described above referring to FIG. 16D, the reference potential of the electric charge storage capacitor is controlled, and hence there is almost no influence of the potential fluctuation caused by the operation of the display device on the charging potential of the electric charge storage capacitor. At a point of time when the turning-ON and OFF operation of the switches 1 and 2 is completed to change the switch 1 to OFF and the switch 2 to ON, a charging potential of the electric charge storage capacitor takes a random value within a very small error range because of suppression of mixing of the potential fluctuation. In this state, when charging of the electric charge storage capacitor progresses, variance of the time when the reference potential Vref is exceeded is suppressed as illustrated in the time zone 1702, and hence no error is generated in detection value of a capacitance.

Fourth Embodiment

Figure 18A:
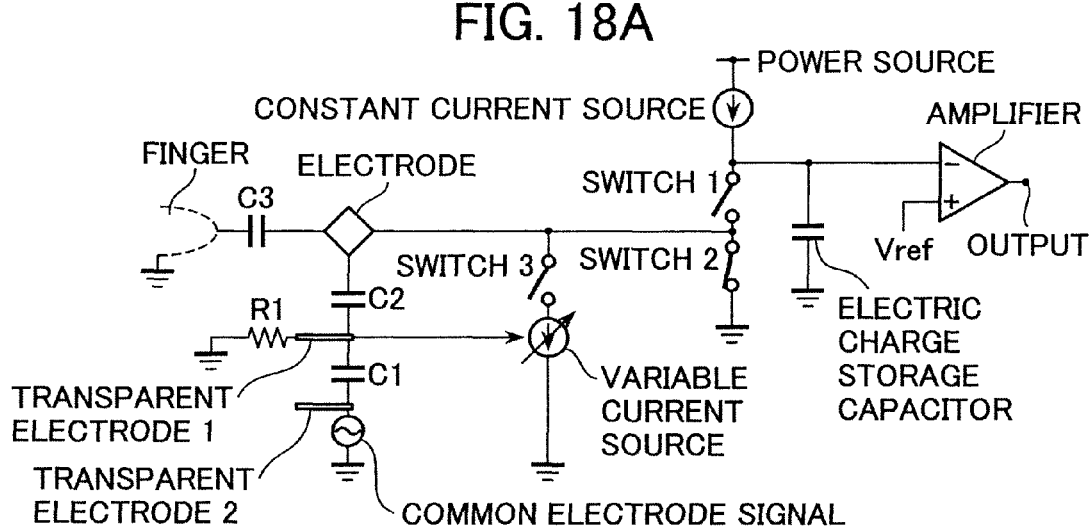
FIGS. 18A to 18C illustrate a touch sensor panel according to a fourth embodiment.
Figure 18B:
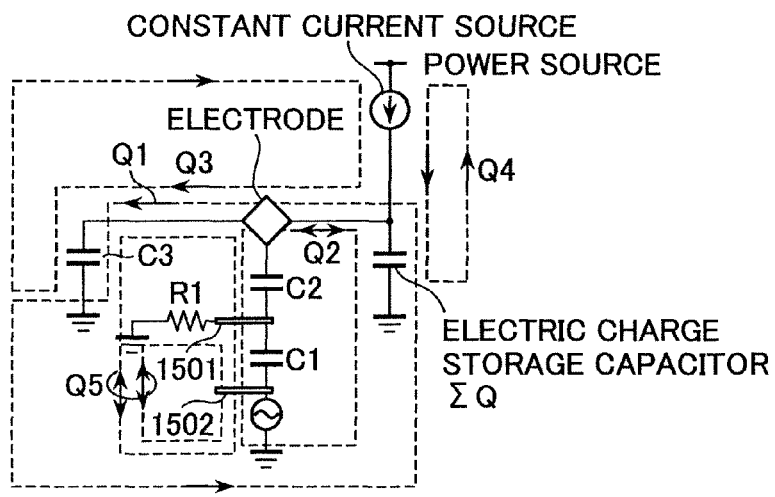
Figure 18C:
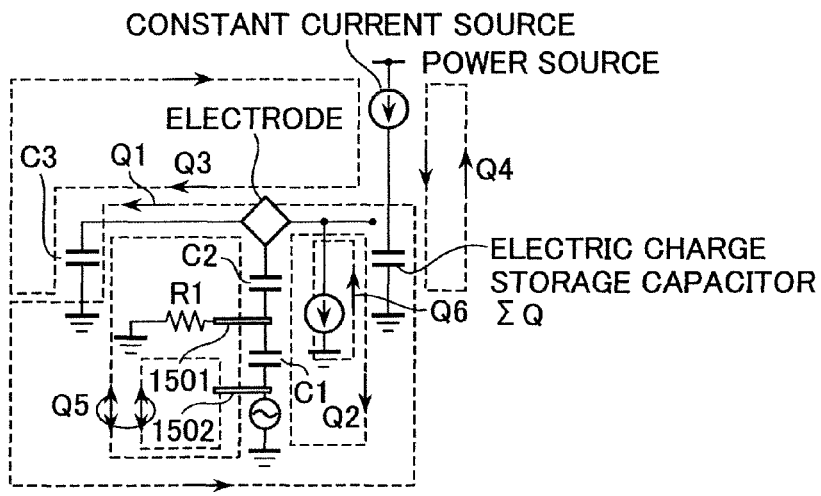

FIGS. 18A and 18B illustrate a fourth embodiment of the present invention. This embodiment is described by taking an example of a successive approximate capacitance system as a system for detecting a capacitance. In this embodiment, electric charges charged in an electric charge storage capacitor fluctuate due to mixing of noise in an electrode of a touch sensor panel via capacitive coupling. In order to prevent generation of an error in capacitance detection due to the electric charge fluctuation, a function for correcting electric charges charged in the electric charge storage capacitor, which fluctuate due to mixing of the noise in the electrode of the touch sensor panel via the capacitive coupling, by a variable current source is provided. Further, it is assumed that the variable current source is controlled by a signal referred to from a portion reflecting voltage fluctuation which causes the electric charge fluctuation. In this embodiment, the variable current source is controlled by referring to a potential change of the transparent electrode 1. FIG. 18B illustrates an electric charge moving state of a time zone in which a switch 1 is ON in a conventional configuration. In the electric charge storage capacitor, an electric charge Q4 supplied from a constant current source, an electric charge Q1 supplied to an electric charge capacitance C3, and an electric charge Q2 supplied from a common electrode signal or the like via capacitances C1 and C2 are charged or discharged. The electric charge Q2 is a random noise component, and hence noise is generated in a charging potential of the electric charge storage capacitor. FIG. 18C illustrates an electric charge moving state of a time zone in which the switch 1 is ON, in a case where a configuration of the embodiment of the present invention is applied. In this case, a switch 3 in the configuration of FIG. 18A is turned ON, and the variable current source is connected to the electric charge storage capacitor. In the electric charge storage capacitor, an electric charge Q4 supplied from a constant current source, an electric charge Q1 supplied to an electric charge capacitance C3, an electric charge Q2 supplied from a common electrode signal or the like via capacitances C1 and C2, and an electric charge Q6 from the variable current source are charged or discharged. The electric charge Q2 is a random noise component. On the other hand, the variable current source refers to a potential of the transparent electrode 1 generating the electric charge Q2 which becomes a random noise component to control its current value. Thus, a canceling relationship is established between the electric charge Q2 and the electric charge Q6, and noise generated in the charging potential of the electric charge storage capacitor may be corrected.

Fifth Embodiment

A fifth embodiment of the present invention is designed to further reduce an error voltage by processing a potential of a transparent electrode into a waveform suited to noise cancellation via a filter circuit and then supplying the potential to a reference terminal of an electric charge storage capacitor.

Figure 19A:
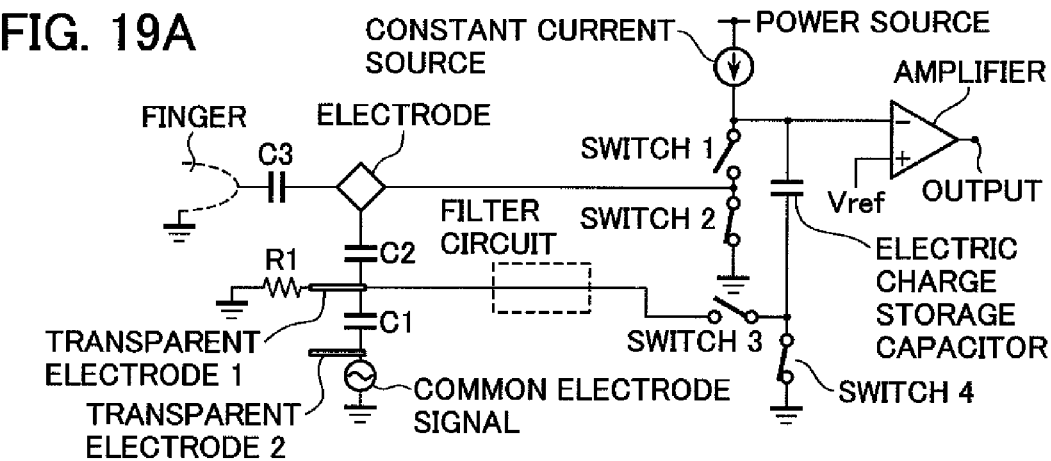
FIGS. 19A to 19C illustrate a touch sensor panel according to a fifth embodiment.
Figure 19B:
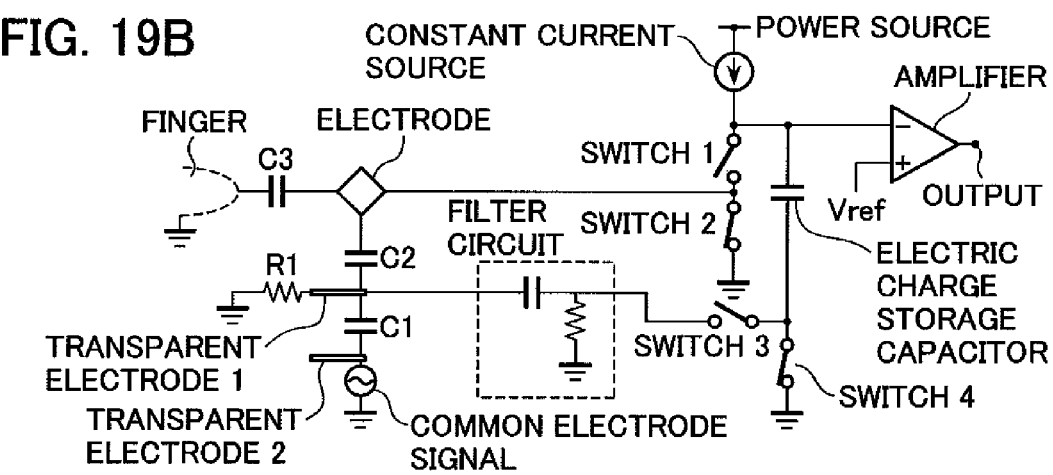
Figure 19C:
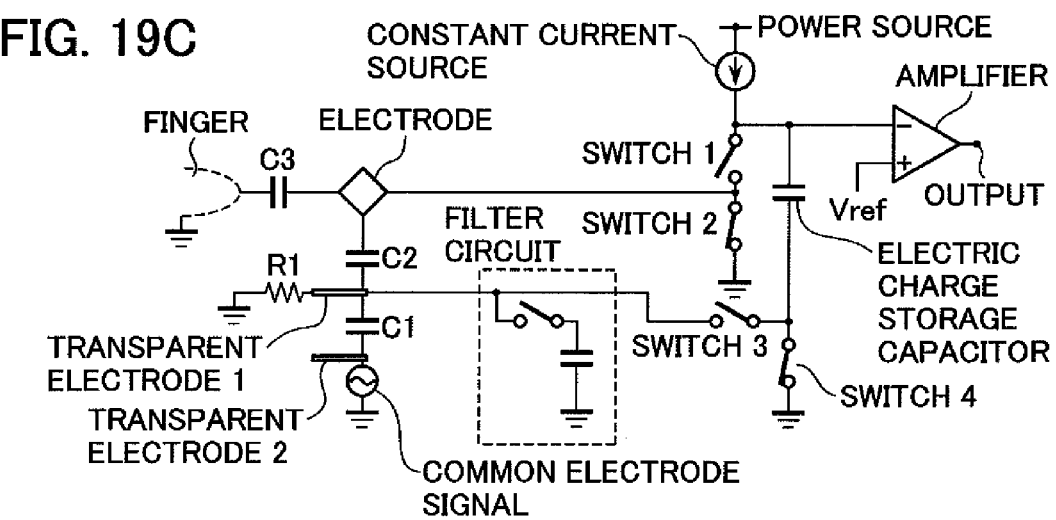

FIG. 19A illustrates a configuration of a detection circuit according to this embodiment. This detection circuit includes, in addition to the components of the circuit illustrated in FIG. 16A, a filter circuit between a transparent electrode 1 and the reference terminal of the electric charge storage capacitor. In the circuit of FIG. 16A, a noise waveform on the electrode of the touch sensor may be a result of differentiating a noise waveform of the transparent electrode 1. Accordingly, as illustrated in FIG. 19A, differentiating the noise waveform of the transparent electrode 1 by using the filter circuit and then supplying the waveform to the electric charge storage capacitor enable accurate noise cancellation, resulting in a further reduction in an error voltage. FIG. 19B illustrates a configuration which uses a differentiation circuit including a resistance element and a capacitive element as a specific example of the filter circuit. FIG. 19C illustrates a configuration which uses a low-pass filter circuit including a capacitative element. In this case, a high-frequency noise component of the transparent electrode 1 is eliminated by the low-pass filter circuit. As a result, mixing of noise in the electrode of the touch sensor or the detection circuit may be prevented.

Sixth Embodiment

A sixth embodiment of the present invention connects a reference potential of an electric charge storage capacitor to an inactive electrode of a touch sensor, thereby enabling accurate noise cancellation even when potential acquisition from a transparent electrode is difficult.

Figure 20A:
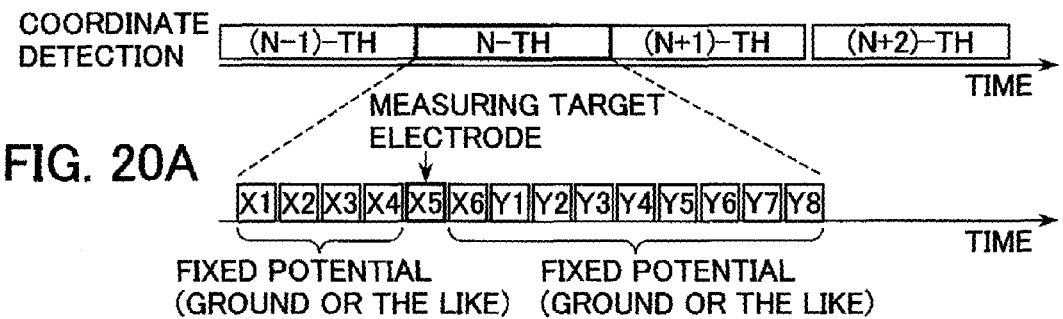
FIGS. 20A to 20C illustrate a touch sensor panel according to a sixth embodiment.
Figure 20B:
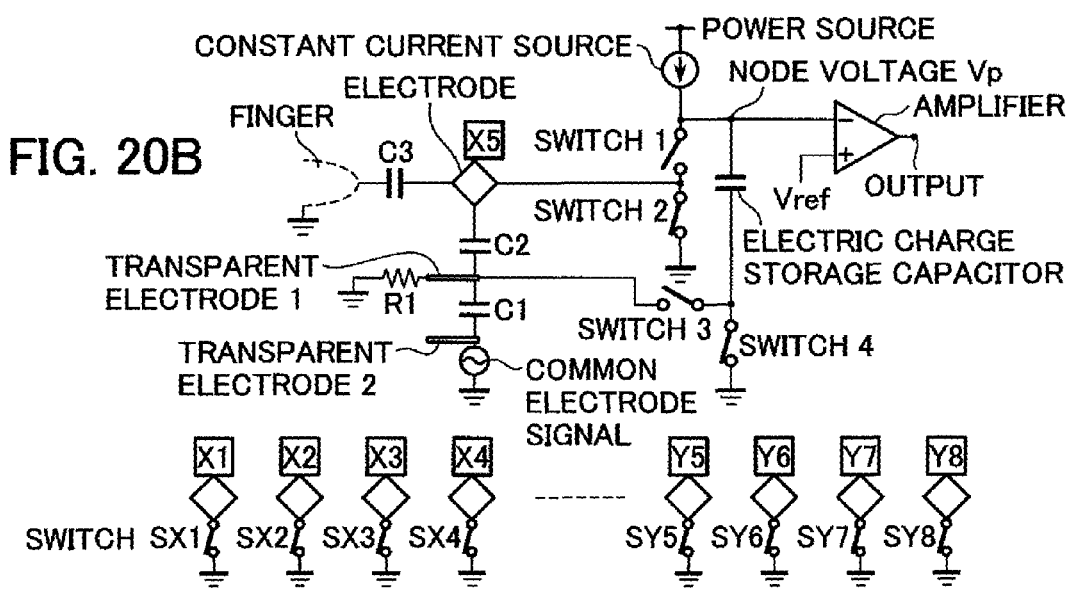

FIG. 20B illustrates the configuration of the detection circuit according to the third embodiment of the present invention. As described in detail above in the third embodiment, in this circuit, noise mixing in the electric charge storage capacitor is prevented by connecting the reference potential of the electric charge storage capacitor to the reference potential via the switch 3, thereby reducing the error voltage of the node voltage Vp. A lower portion of FIG. 20B illustrates electrodes in an X direction and a Y direction of the touch sensor.

Figure 20C:
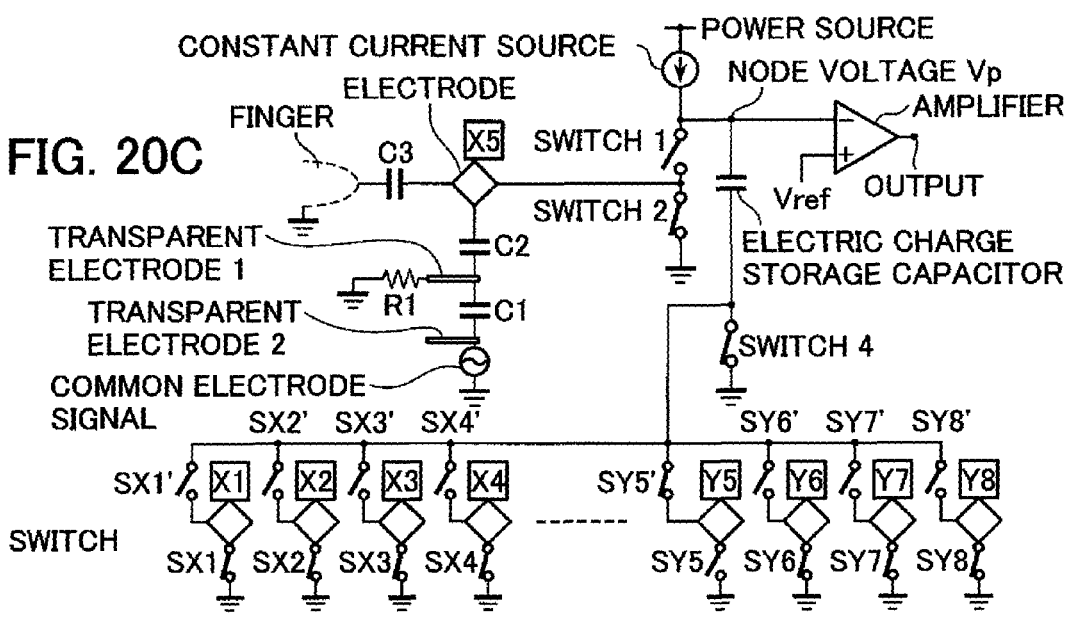

FIG. 20C illustrates a configuration of a detection circuit according to the sixth embodiment of the present invention. This circuit is configured such that among many electrodes disposed in the touch sensor, a potential of an inactive electrode not subjected to measurement is connected to the reference potential of the electric charge storage capacitor via a switch. In a display device provided with a touch sensor, an operation of the display device is accompanied by generation of noises almost similar in waveform in all electrodes in X and Y directions. Thus, in order to cancel the noises, a potential of any electrode of the touch sensor may be used as the reference potential of the electric charge storage capacitor. For example, when capacitance detection is carried out for an electrode X5 in the X direction, electrodes other than the electrode X5 become inactive, and hence a potential of the electrode X5 may be used as the reference potential of the electric charge storage capacitor. In this case, a switch SY5' of an electrode Y5 is turned ON while a switch SY5 is turned OFF, and a switch 4 is turned OFF to connect a potential of the electrode Y5 to the reference voltage of the electric charge storage capacitor. FIG. 20C illustrates a switch state in this case.

FIG. 20A illustrates a coordinate detection sequence. To carry out coordinate detection, measurement is performed a plurality of times and, in each measuring period, all the electrodes in the X and Y directions are sequentially measured. For example, in the case of measuring the electrode X5, the other electrodes are connected to a ground terminal to fix potentials.

FIG. 21 illustrates timing according to this embodiment. FIG. 21 illustrates a case of measuring the electrode X5, and the same applies to the other electrodes. When the electrode X5 is measured, the other electrodes are set inactive. Thus, for example, a potential of the electrode Y5 may be used as a reference potential of the electric charge storage capacitor. In this case, in a capacitance detection period, in other words, in a period of repeating opening/closing of the switches 1 and 2, the switch SY5' is turned ON while the switch SY5 is turned OFF. During this period, the repeated opening/closing of the switches 1 and 2 leads to a reduction in electric charges of the electric charge storage capacitor, and hence a node voltage Vp is gradually reduced. In this case, noise of the inactive electrode Y5 is similar in waveform to noise of the measured electrode X5. As a result, as in the case of the third embodiment of the present invention, noise mixing in the electric charge storage capacitor may be prevented to reduce an error voltage of the node voltage Vp.

Seventh Embodiment

A seventh embodiment of the present invention enables noise cancellation by disposing a dummy electrode in a touch sensor and connecting a reference potential of an electric charge storage capacitor to the dummy electrode.

Figure 22A:
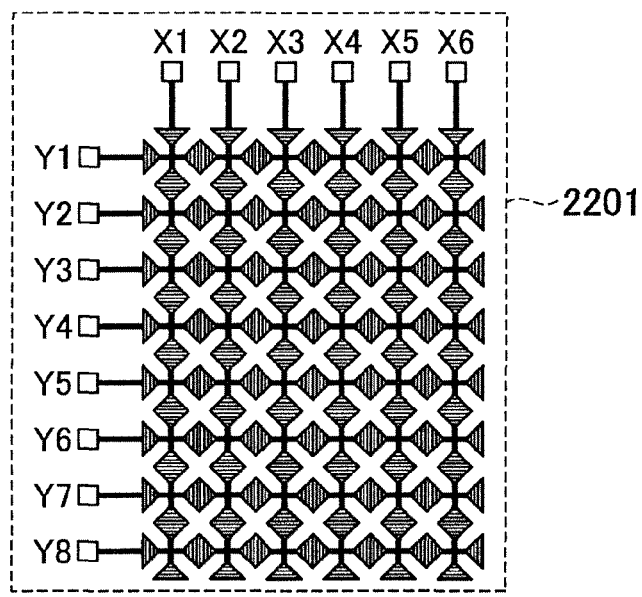
FIGS. 22A to 22C illustrate a touch sensor panel according to a seventh embodiment.
Figure 22B:
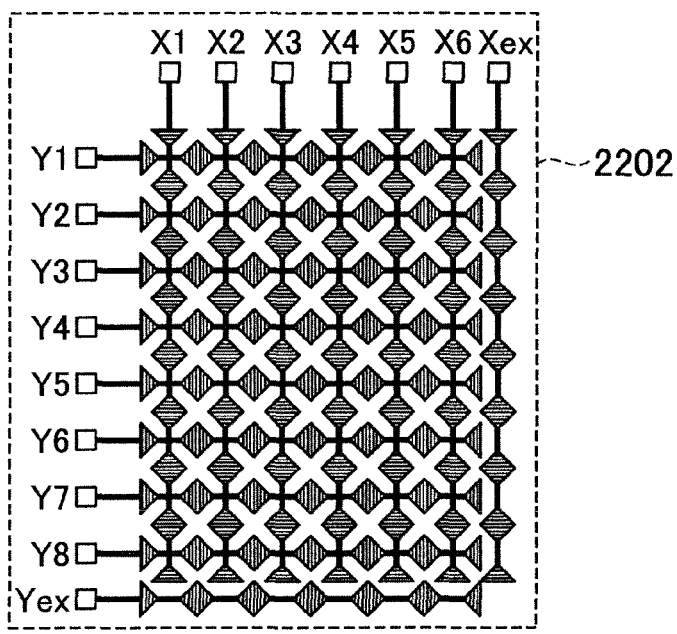
Figure 22C:
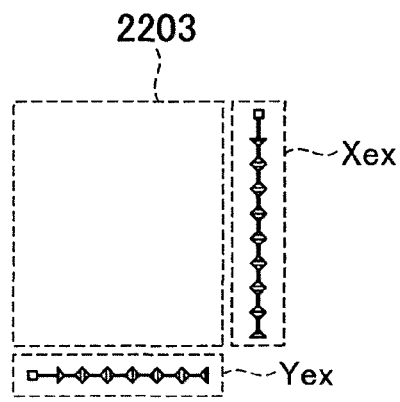

FIG. 22A illustrates an electrode arrangement of a conventional touch sensor. In the conventional touch sensor, a plurality of electrodes are disposed in each of an X direction and a Y direction, and coordinate detection is performed by sequentially measuring capacitances of the electrodes with the use of a detection circuit. FIG. 22B illustrates an electrode arrangement of the touch sensor according to the seventh embodiment of the present invention. Unlike the conventional touch sensor, dummy electrodes Xex and Yex are disposed in X and Y directions, respectively. The dummy electrodes Xex and Yex are disposed on the same substrate as that of the other electrodes. FIG. 22C illustrates a configuration where a dummy electrode is disposed on a substrate different from that of other electrodes.

Figure 23A:
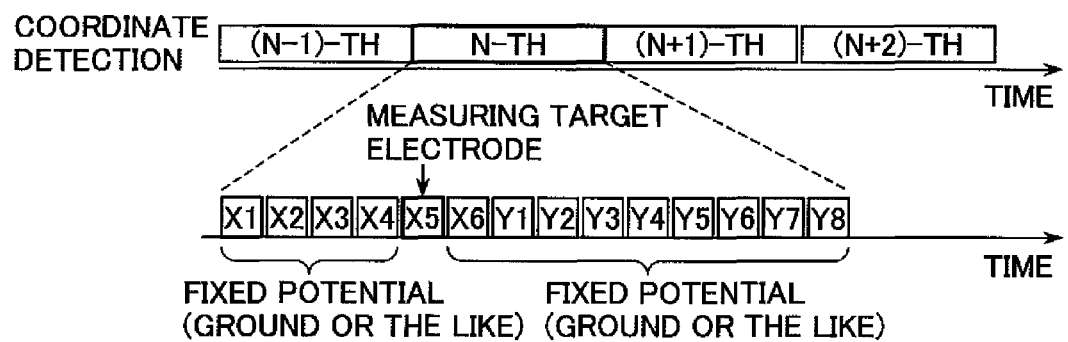
FIGS. 23A and 23B illustrate the touch sensor panel according to the seventh embodiment.
Figure 23B:
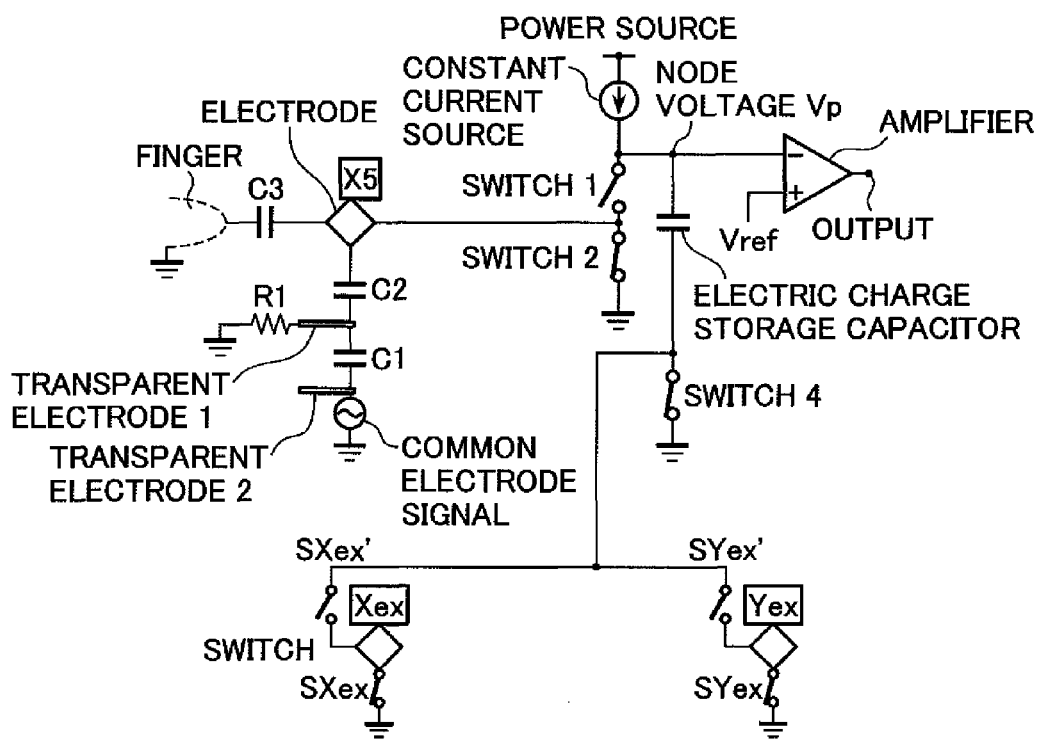

FIG. 23B illustrates a configuration of the detection circuit of this embodiment. This detection circuit is configured such that a reference potential of an electric charge storage capacitor is obtained from the dummy electrodes Xex and Yex.

FIG. 23A illustrates a capacitance detection sequence of this embodiment. To carry out coordinate detection, measurement is performed a plurality of times and, in each measuring period, all the electrodes disposed in the X and Y directions are sequentially measured. For example, in the case of measuring the electrode X5, the other electrodes are connected to a ground terminal to fix potentials.

Figure 24:
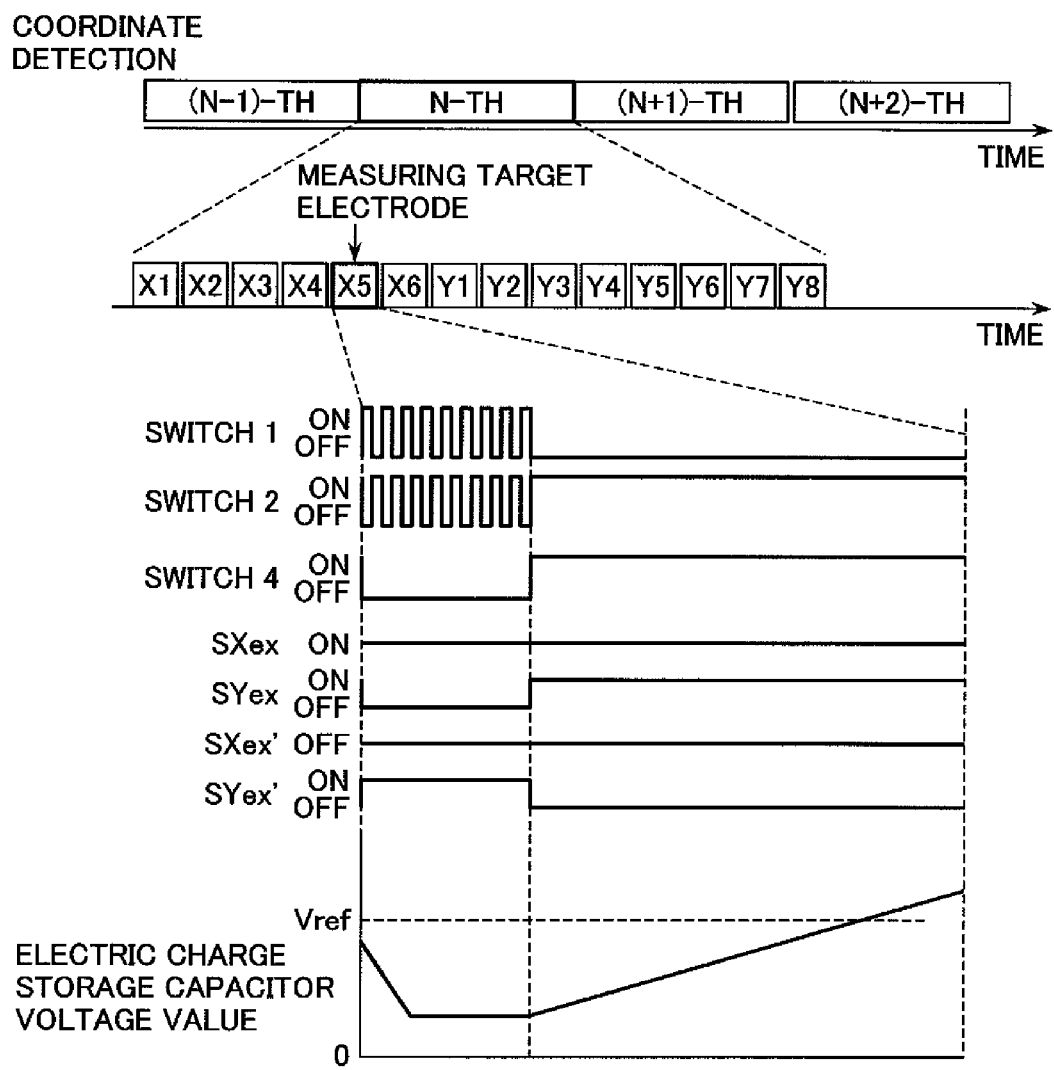
FIG. 24 illustrates the touch sensor panel according to the seventh embodiment.

FIG. 24 illustrates timing according to this embodiment. FIG. 24 illustrates a case of measuring the electrode X5, and the same applies to the other electrodes. In this circuit, in a capacitance detection period, in other words, in a period of repeating opening/closing of switches 1 and 2, switches SYex' and SXex are turned ON while switches SXex' and SYex are turned OFF and a switch 4 is turned OFF to connect a potential of the dummy electrode Yex to a reference potential of the electric charge storage capacitor, thereby performing noise cancellation. During this period, the repeated opening/closing of the switches 1 and 2 leads to a reduction in electric charges of the electric charge storage capacitor, and hence a node voltage Vp is gradually reduced. In this case, noise of the dummy electrode Yex is similar in waveform to noise of the measured electrode X5. As a result, as in the third embodiment of the present invention, noise mixing in the electric charge storage capacitor may be prevented to reduce an error voltage of the node voltage Vp.

Eighth Embodiment

An eighth embodiment of the present invention is designed to further reduce an error voltage by connecting one terminal of an electric charge storage capacitor to a transparent electrode 1 via a switch 3 and one terminal of a switch 2 to the transparent electrode 1 to prevent noise mixing via a capacitance C2.

Figure 25A:
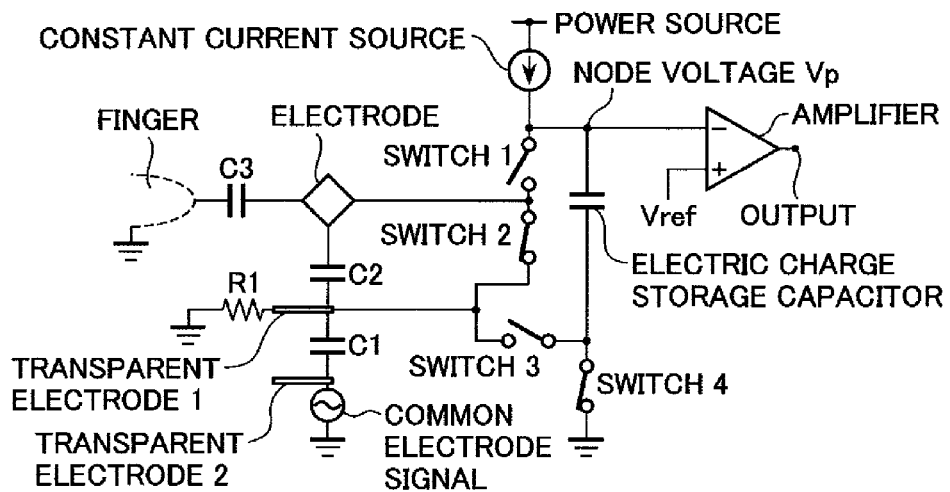
FIGS. 25A and 25B illustrate a touch sensor panel according to an eighth embodiment.

FIG. 25A illustrates a detection circuit of this embodiment. This detection circuit is configured such that one terminal of the switch 2 of the detection circuit illustrated in FIG. 16A is connected to the transparent electrode 1. In this circuit, the switch 2 is turned ON to short-circuit both ends of the capacitance C2. Hence, even when noise is generated in an electrode of a touch sensor by an operation of a liquid crystal display device, electric charges of the electrode capacitance C2 may be completely maintained at zero during the ON period of the switch 2. Thus, at timing when the switch 2 is turned OFF and the switch 1 is turned ON, an amount of electric charges flowing from the electric charge storage capacitor into the capacitance C2 is constant irrespective of presence of noise, and a drop in node voltage Vp generated at timing of changing of the switch 1 from OFF to ON becomes constant irrespective of presence of noise. As a result, an error voltage of the node voltage Vp may be further reduced.

Figure 25B:
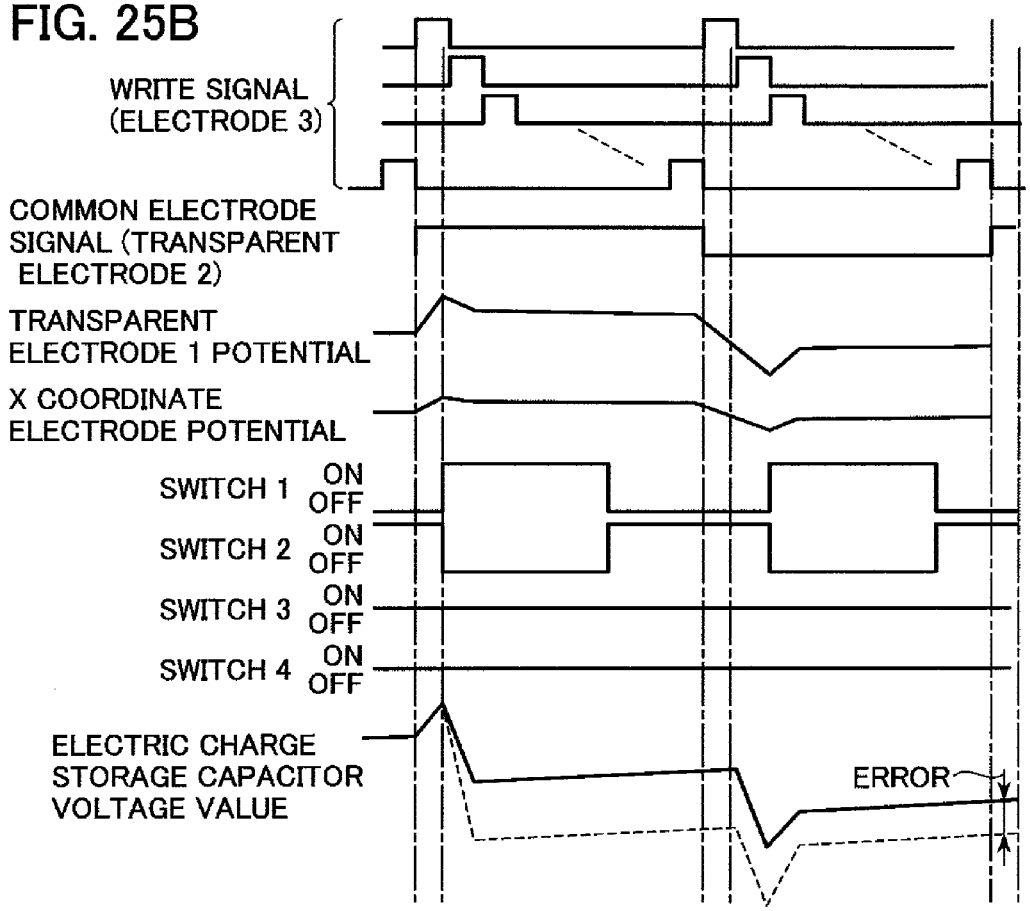

FIG. 25B illustrates timing of the detection circuit of this embodiment. In the circuit of FIG. 25A, electric charges of the electric charge storage capacitor move to the electrode capacitance C2 when the switch 1 is changed from OFF to ON, and hence a drop occurs in node voltage Vp. FIG. 25B illustrates a waveform of the node voltage Vp. FIG. 25B illustrates, as a worst case, a case where spike-shaped noise is generated in the electrode of the touch sensor by an operation of the liquid crystal display device at timing of changing of the switch 1 from OFF to ON. In this case, as illustrated in FIG. 25B, the waveform of the node voltage Vp becomes a waveform in which a voltage drops and spike-shaped noise is superimposed at the timing of changing of the switch 1 from OFF to ON. A solid line indicates a waveform of the node voltage Vp when one terminal of the switch 2 is connected to the transparent electrode 1. A dotted line indicates a waveform when one terminal of the switch 2 is connected to a ground terminal.

When one terminal of the switch 2 is connected to the ground terminal, through the following mechanism, noise on the electrode of the touch sensor is mixed in the detection circuit via the capacitance C2 to generate an error voltage in the node voltage Vp. In other words, during the ON period of the switch 2, one terminal of the electrode capacitance C2 is fixed to the ground potential, and hence when the noise generated by the operation of the liquid crystal display device causes an instantaneous increase in potential of the transparent electrode 1, electric charges of the capacitance C2 flow into the ground terminal via the switch 2. Thus, electric charges flowing from the electric charge storage capacitor into the capacitance C2 the instant the switch 2 is turned OFF while the switch 1 is turned ON are larger than those when there is no noise. As a result, a drop in node voltage Vp, which occurs when the switch 1 is changed from OFF to ON, is larger than that when there is no noise. During the ON period of the switch 2, when noise causes an instantaneous drop in potential of the transparent electrode 1, electric charges flow from the ground terminal into the capacitance C2. In this case, electric charges flowing from the electric charge storage capacitor into the capacitance C2 the instant the switch 2 is turned OFF while the switch 1 is turned ON are smaller than those when there is no noise. As a result, a drop in node voltage Vp, which occurs when the switch 1 is changed from OFF to ON, is smaller than that when there is no noise. Through this mechanism, noise on the electrode of the touch sensor is mixed in the detection circuit via the capacitance C2 to generate an error voltage in a waveform of the node voltage Vp.

On the other hand, in this embodiment, one terminal of the switch 2 is connected to the transparent electrode 1, and hence even when noise is generated in the electrode of the touch sensor by the operation of the liquid crystal display device, during the ON period of the switch 2, electric charges of the capacitance C2 may completely be maintained at zero. Thus, a drop in node voltage Vp, which occurs when the switch 1 is changed from OFF to ON, is constant irrespective of presence of noise, and an error voltage of the node voltage Vp may be reduced.

Figure 26A:
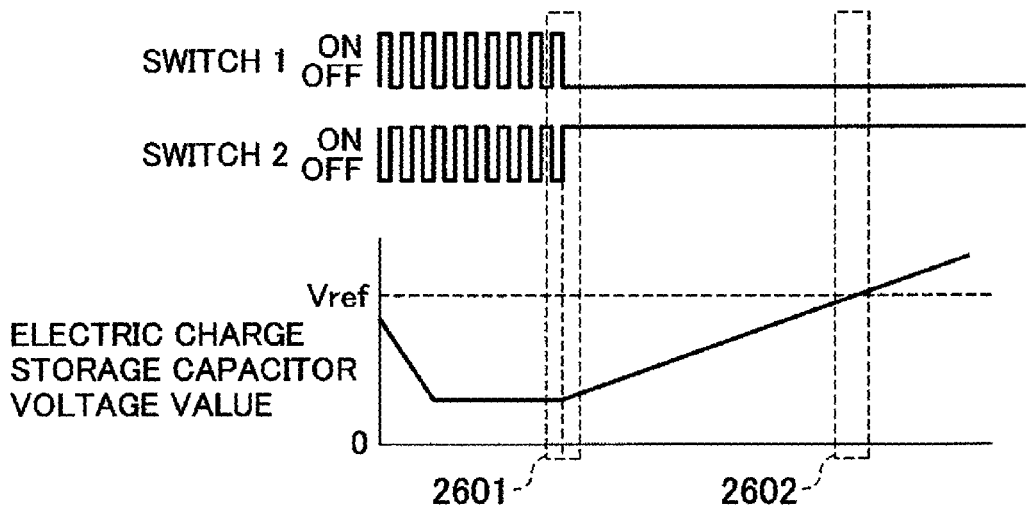
FIGS. 26A and 26B illustrate the touch sensor panel according to the eighth embodiment.
Figure 26B:
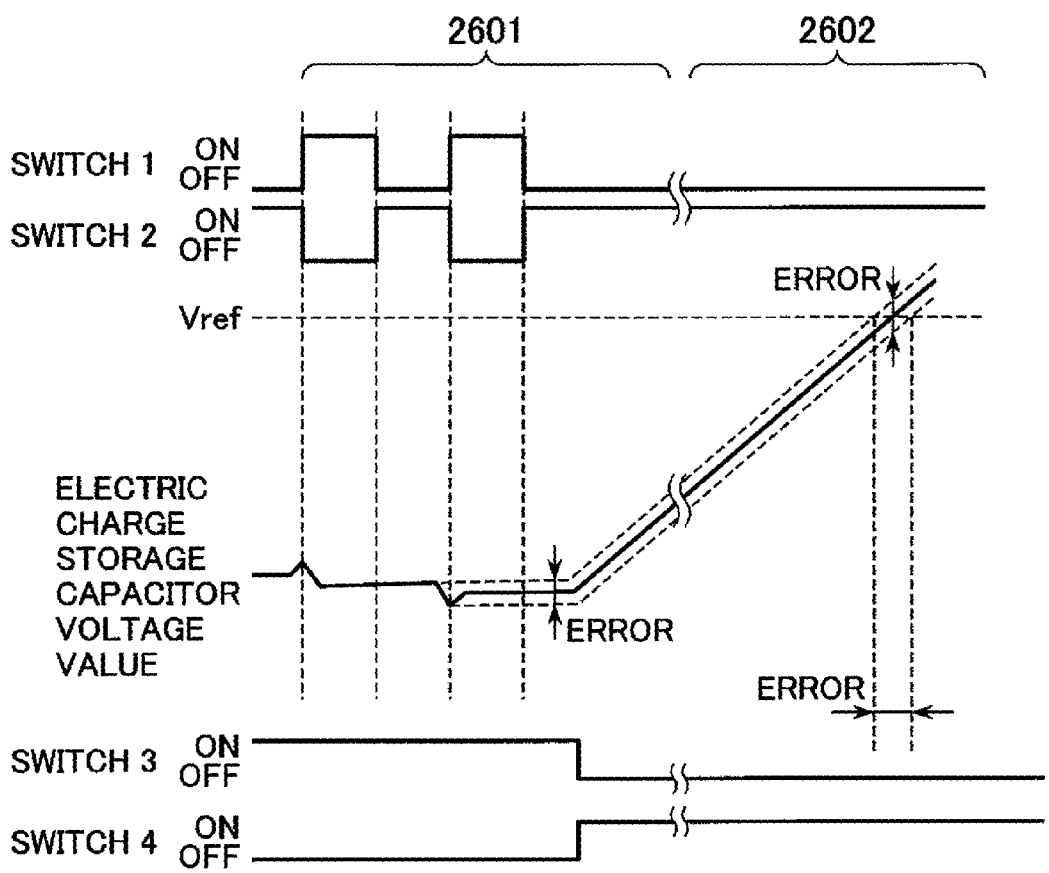

FIG. 26A illustrates a waveform of one cycle of the detection circuit of this embodiment. During the capacitance detection period in which opening and closing of the switches 1 and 2 are repeated, electric charges of the electric charge storage capacitor are gradually reduced, and the node voltage Vp gradually drops. However, the node voltage Vp is stabilized at an almost constant value at a point of time when an electric charge supply amount from the constant current source to the electric charge storage capacitor and an electric charge moving speed from the electric charge storage capacitor to the capacitance C2 are balanced. Then, when the switch 1 is fixed to OFF while the switch 2 is fixed to ON, electric charge supply from the constant current source to the electric charge storage capacitor causes a rise in node voltage Vp at a fixed speed. In this case, a capacitance C3 of a finger is detected based on time until the node voltage Vp reaches a reference voltage Vref. FIG. 26B illustrates enlarged portions 2601 and 2602 indicated by dotted lines in FIG. 26A. When one terminal of the switch 2 is connected to the ground terminal, noise is mixed in the detection circuit via the capacitance C2 to generate an error voltage in the node voltage Vp. In this embodiment, however, one terminal of the capacitance C2 is connected to the transparent electrode 1, and hence noise mixing via the capacitance C2 may be prevented, and the error voltage of the node voltage Vp may be reduced.

Each embodiment has been described by taking the example of the X coordinate electrode. Needless to say, however, the same applies to the Y coordinate electrode. The second embodiment has been described by taking the example of the electric charge transfer system. Needless to say, however, the same applies to the case of the successive approximate capacitance system. The fourth to eighth embodiments have been described by taking the example of the successive approximate capacitance system. Needless to say, however, the same applies to the case of the electric charge transfer system.

Ninth Embodiment

Figure 27:
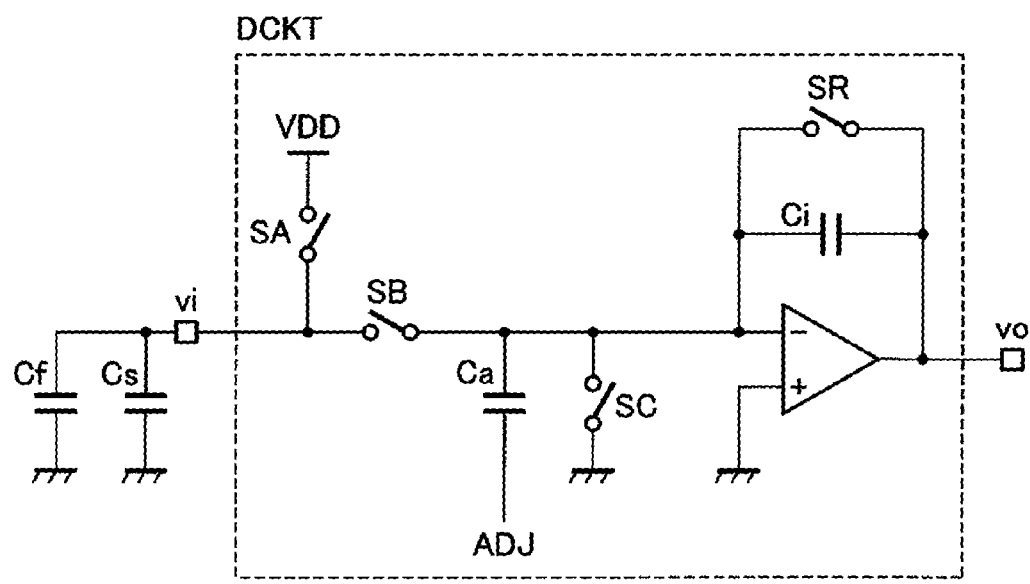
FIG. 27 is a circuit diagram illustrating a capacitance detection circuit according to a ninth embodiment.

Referring to FIGS. 27, 28A, 28B, 29A and 29B, a capacitance detection circuit used in a coordinate input device according to a ninth embodiment of the present invention is described. FIG. 27 is a circuit diagram illustrating the capacitance detection circuit of the ninth embodiment of the present invention. The capacitance detection circuit DCKT is a circuit for detecting a sensor electrode capacitance Cs connected to an input terminal vi, and an input capacitance Cf increased by touching on a sensor electrode.

The capacitance detection circuit DCKT includes a switch SA for charging the sensor electrode capacitance Cs with a fixed voltage VDD, a switch SB for transferring charged electric charges, an integration circuit provided with a reset switch SR, and an adjustment capacitor Ca for adjusting an integration voltage value (referred to as an electrode offset voltage, hereinafter) of the sensor electrode capacitance Cs to eliminate it from an output signal vo. The integration circuit includes an integration capacitor Ci and an operational amplifier. An adjustment signal ADJ is applied to one terminal of the adjustment capacitor Ca.

Figure 28A:
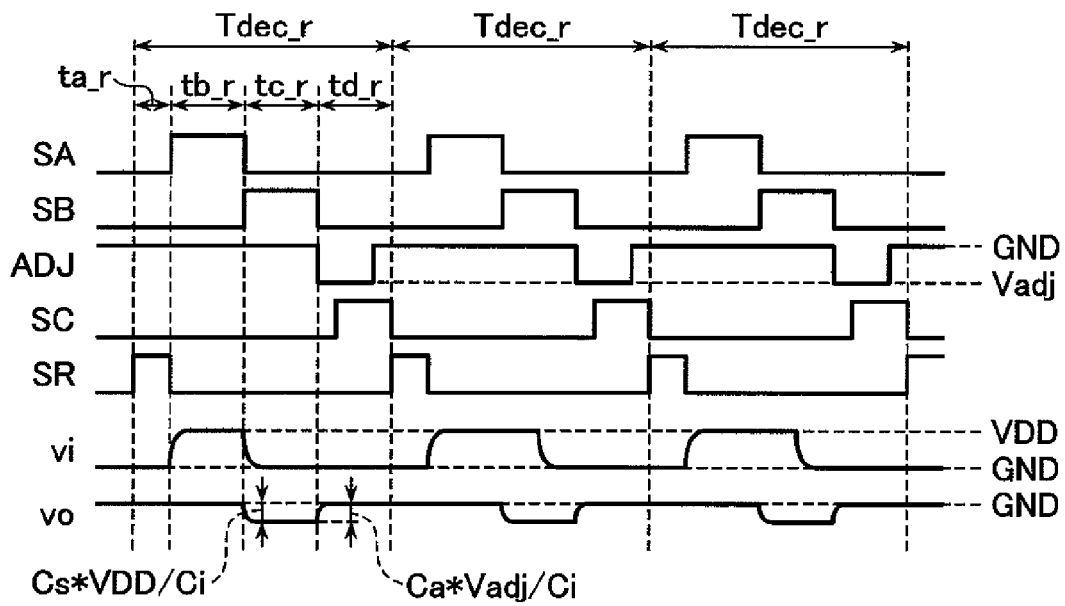
FIGS. 28A and 28B are voltage waveform diagrams when a charging/discharging operation is performed once in the capacitance detection circuit of the ninth embodiment.
Figure 28B:
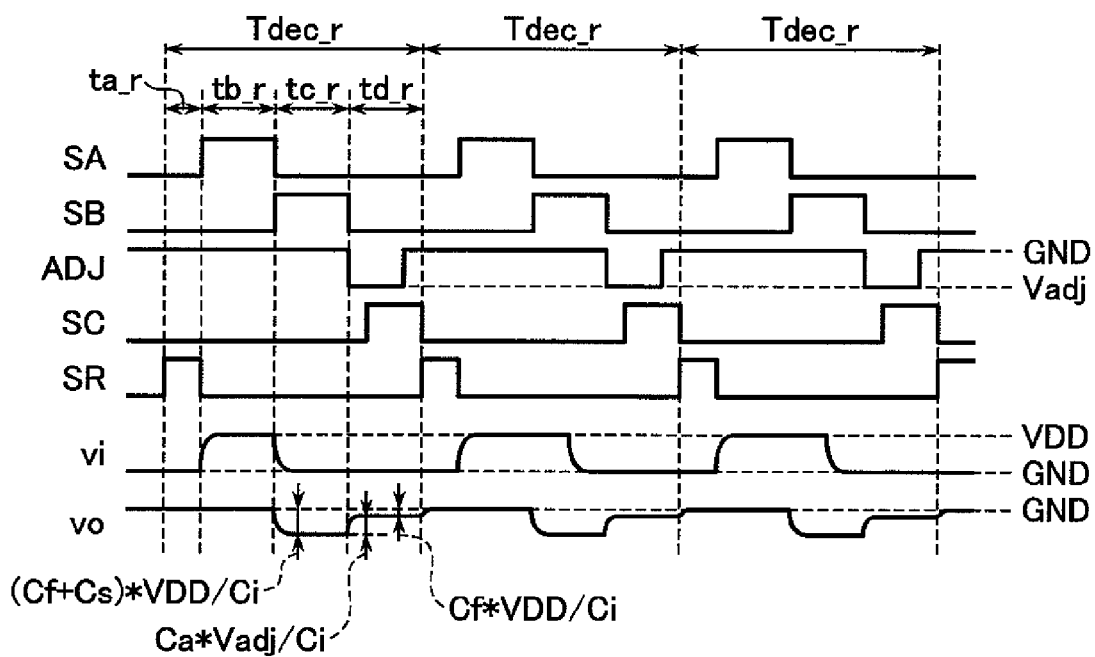

FIGS. 28A and 28B are voltage waveform diagrams illustrating an operation of the capacitance detection circuit DCKT of the ninth embodiment of the present invention. FIG. 28A illustrates a case where an input is only a sensor electrode capacitance Cs, and FIG. 28B illustrates a case where an input capacitance Cf is generated by touching. FIGS. 28A and 28B are timing charts of a case where the input capacitance is detected by performing charging and discharging for a capacitance connected to the input terminal vi once. In this case, the input capacitance may be detected at high speed, and hence a number of digital filters in a subsequent stage may be increased, or reaction time (coordinate detection time) of the input device may be reduced. In Tdec_r which is one charging/discharging cycle, in a period ta_r, the reset switch SR is turned ON to reset an integration voltage of the integration capacitor Ci. Next, in a period tb_r, the switch SA is tuned ON to charge the capacitance connected to the input terminal vi by applying a fixed voltage VDD. In a period tc_r, the switch SB is turned ON while the switch SA is OFF to transfer electric charges charged in the capacitance connected to the input terminal vi to the integration circuit. Thus, in the period tc_r, in the case of only a sensor electrode capacitance Cs, as illustrated in FIG. 28A, an integration voltage becomes −VDD·Cs/Ci. In the case of FIG. 28B where the input capacitance Cf is increased by touching, an integration voltage becomes −VDD·(Cs+Cf)/Ci. In a period td_r, an electrode offset voltage by the sensor electrode capacitance Cs is adjusted. First, an adjustment signal ADJ is changed from GND to −Vadj to charge electric charges in the adjustment capacitor Ca. In this case, electric charges Ca*Vadj are charged in the adjustment capacitor Ca, and hence an output of the integration circuit is increased by Vadj·Ca/Ci. In this case, if the adjustment voltages Vadj and Ca are set so that the electrode offset voltage VDD·Cs/Ci of the sensor electrode capacitance Cs in FIG. 28A and the adjustment amount Vadj·Ca/Ci by charging the adjustment capacitor Ca may be equal to each other, the electrode offset voltage by the sensor electrode capacitance Cs may be eliminated from the output voltage vo. Then, within the period td_r, the switch SC is turned ON. Even when the switch SC is turned ON to be conductive with the ground (GND), a negative terminal of the operational amplifier is a virtual ground, and hence no current flows, causing no change in integration voltage. It is assumed that ON resistance of the switch SC is sufficiently low. In this condition, an adjustment signal ADJ for discharging electric charges of the adjustment capacitor Ca is returned to the GND. A current discharged from the adjustment capacitor Ca in this case does not flow into the integration circuit because of the sufficiently low ON resistance of the switch SC. Instead, the current is discharged to the GND via the switch SC.

Through the aforementioned operation, as illustrated in FIG. 28A, when the capacitance connected to the input terminal vi is the sensor electrode capacitance Cs, the electrode offset voltage is adjusted to set an output signal vo to 0 V. On the other hand, when touching increases the input capacitance Cf, as illustrated in FIG. 28B, the output signal vo becomes an integration voltage −VDD·Cf/Ci which is proportional to the input capacitance Cf. This way, the electrode offset voltage may be eliminated from the output voltage. Thus, even when the output voltage signal is amplified before AD conversion, a range of the AD conversion may be fully used, and a dynamic range of a detectable input capacitance may be widened.

Figure 29A:
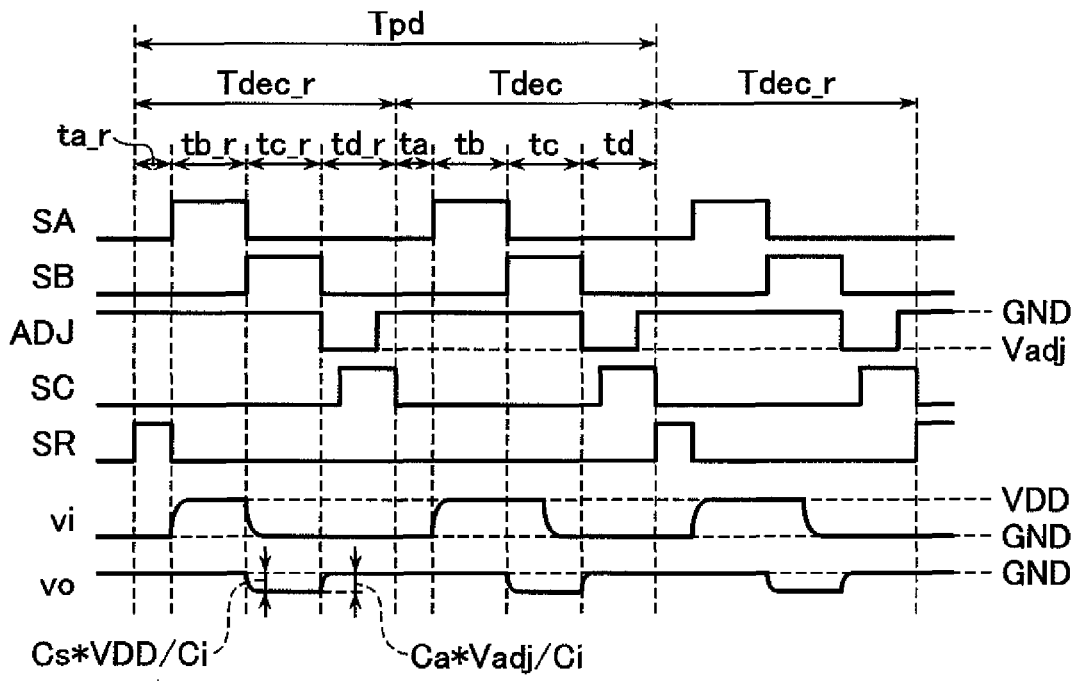
FIGS. 29A and 29B are voltage waveform diagrams when the charging/discharging operation is performed twice in the capacitance detection circuit of the ninth embodiment.
Figure 29B:
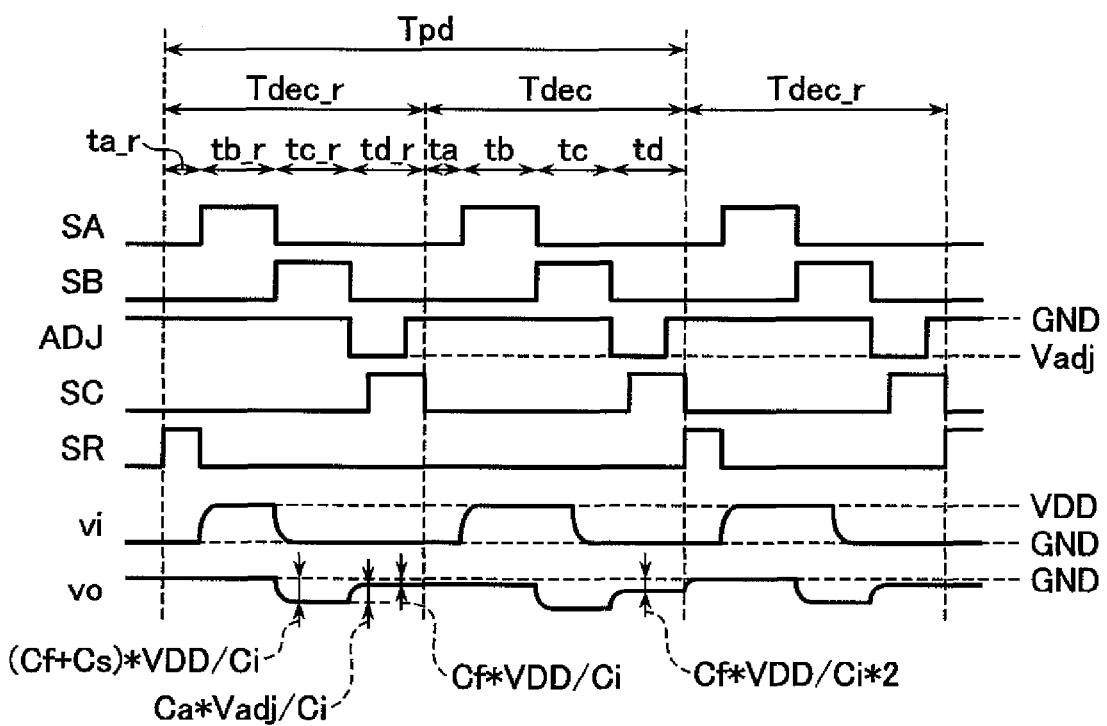

FIGS. 29A and 29B are voltage waveform diagrams illustrating another capacitance detection method which uses the capacitance detection circuit DCKT of the ninth embodiment of the present invention. FIGS. 29A and 29B are timing charts when charging/discharging is performed twice for the capacitor connected to the input terminal vi. A period Tpd is a detection cycle of an input capacitance. A first charging/discharging period is a charging/discharging period Tdec_r in which a resetting operation of an integration capacitor Ci is carried out, and a following discharging period is a charging/discharging period Tdec in which no resetting operation of the integration capacitor Ci is carried out. A difference between the charging/discharging periods Tdec_r and Tdec is that the resetting operation of the integration capacitor Ci is carried out in the period ta_r while no resetting operation of the integration capacitor Ci is carried out in the period ta. Other periods tb_r and tb, periods tc_r and tc, and periods td_r and td may be similar in setting. During these periods, as described above referring to FIGS. 28A and 28B, electric charges are charged to the capacitor connected to the input terminal vi, electric charges to be discharged are integrated, and then an electrode offset voltage is canceled based on an adjustment signal ADJ and an adjustment capacitor Ca.

As illustrated in FIG. 29A, the electrode offset voltage is canceled during each charging/discharging period, and hence an output voltage vo becomes 0 V when there is no input capacitance even when charging/discharging is performed twice. On the other hand, when an input capacitance Cf is generated by touching, as illustrated in FIG. 29B, an integration voltage VDD·Cf/Ci dependent on the input capacitance Cf is added to the integration circuit according to the number of times charging/discharging is performed, and hence an output voltage vo becomes 2·VDD·Cf/Ci. In FIGS. 29A and 29B, there is one charging/discharging period Tdec_r and there is one charging/discharging period Tdec, to thereby carry out two charging/discharging detection operations in total. However, the number of the charging/discharging period Tdec_r may be set to one, and the number of the charging/discharging periods Tdec may be set to n−1, to thereby allow charging/discharging detection to be performed n times (n is an integer of 2 or more) in total. This way, an output voltage may be set to n·VDD·Cf/Ci, which is larger by n times than that in the case where charging/discharging is executed once.

Thus, signal addition at the analog circuit portion enables averaging and a reduction in noise generated during the charging/discharging periods. Further, even when the input capacitance Cf is very small, the output signal may be increased without amplifying an analog signal, and hence a high signal to noise ratio may be obtained.

As described above, in the capacitance detection circuit according to the ninth embodiment of the present invention, the output voltage when there is no input by touching may be canceled based on the adjustment signal ADJ and the adjustment capacitor Ca, enabling detection of a very small input capacitance Cf. In the coordinate input device which uses the capacitance detection circuit DCKT, input coordinates may be detected with high accuracy. An output voltage when there is no input by touching may be determined by an electrode offset voltage, or determined by reflecting various characteristics of the operational amplifier or each switch. In both cases, however, the output voltage may be canceled based on setting of the adjustment signal ADJ and the adjustment capacitor Ca.

This embodiment has been described on the assumption that the output voltage when there is no input by touching is at a negative potential. However, when the output voltage when there is no input by touching is at a positive potential, the adjustment signal ADJ may be changed to a voltage in a positive direction, to thereby cancel the output voltage.

Figure 30:
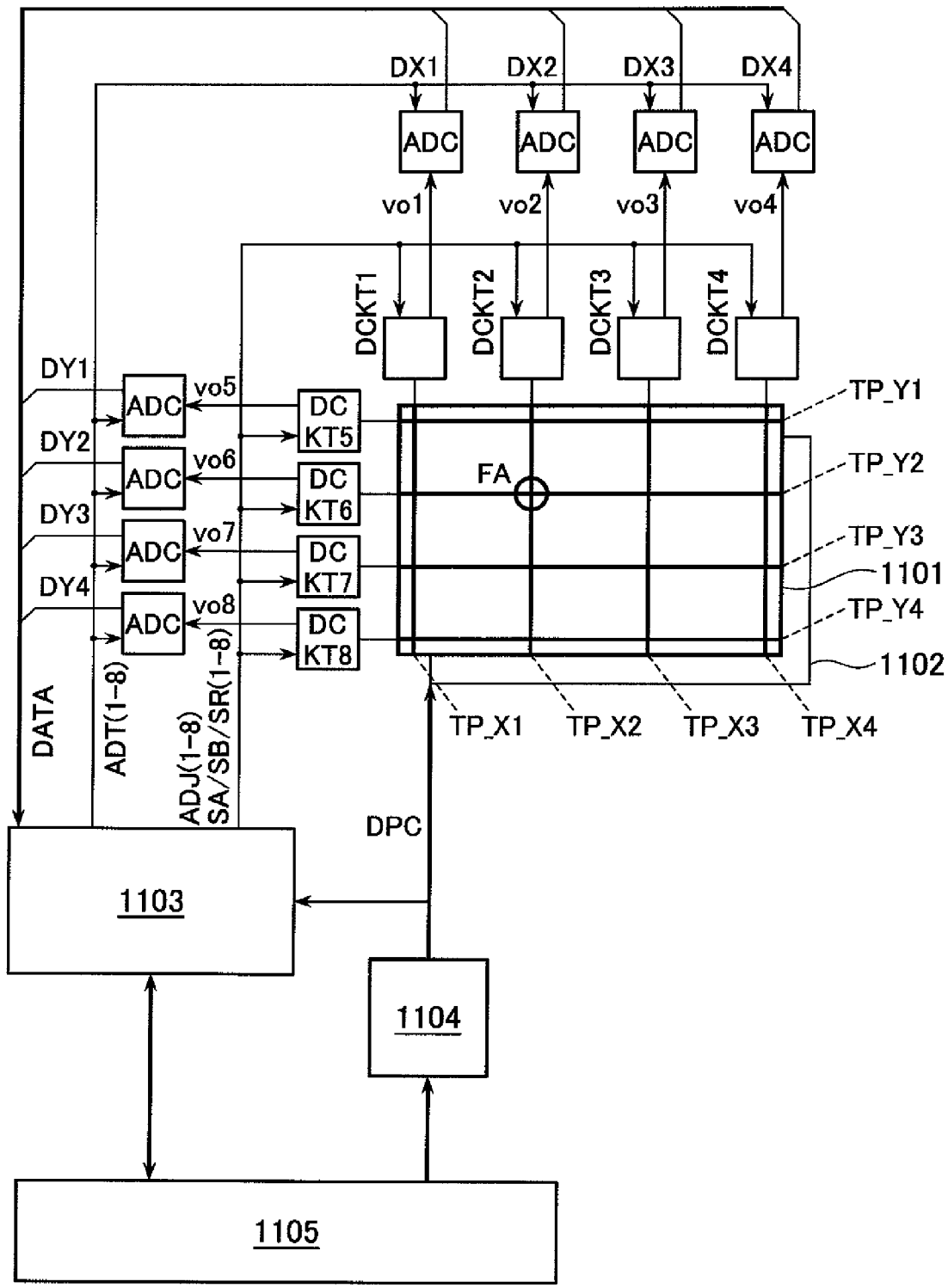
FIG. 30 is a system block diagram illustrating a coordinate input device of the ninth embodiment and a display device using the same.
Figure 31:
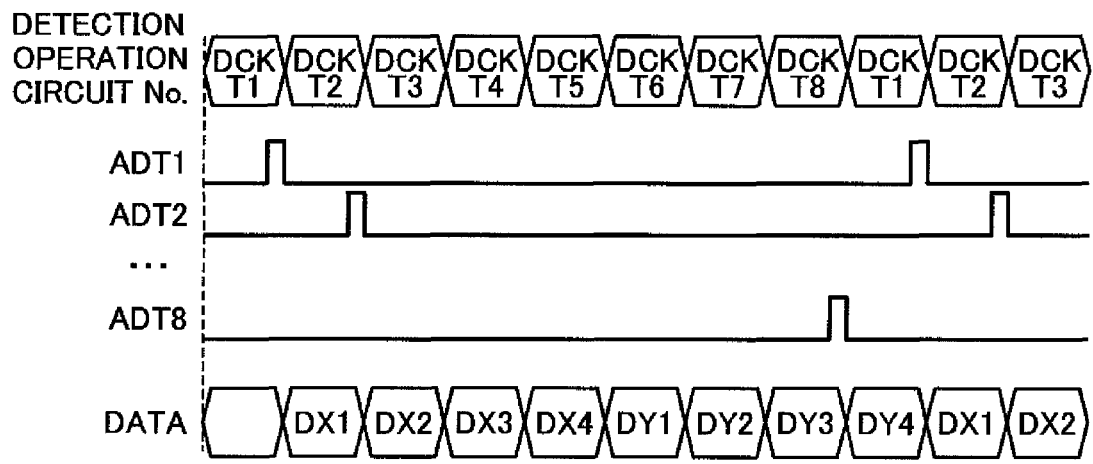
FIG. 31 illustrates a capacitance detection sequence of the coordinate input device of the ninth embodiment.
Figure 32:
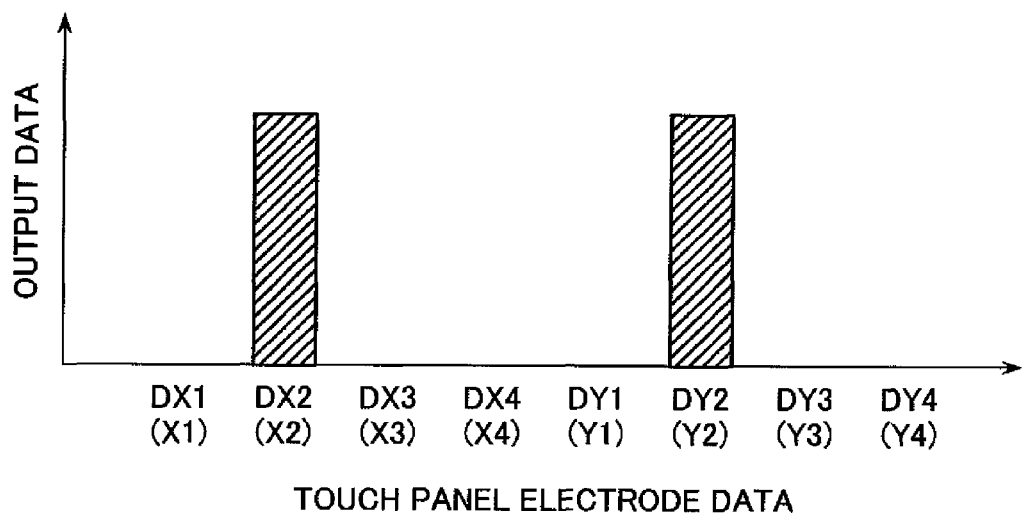
FIG. 32 illustrates a digital output signal of the coordinate input device of the ninth embodiment.

Next, referring to FIGS. 30 to 32, the coordinate input device according to the ninth embodiment of the present invention and a display device provided with the coordinate input device are described. FIG. 30 is a system block diagram illustrating the coordinate input device according to the ninth embodiment of the present invention and the display device provided with the coordinate input device. A coordinate input unit 1101 includes sensor electrodes TP constituted of transparent electrodes formed on a transparent substrate. In this case, the sensor electrodes are arranged in a matrix, in which four electrodes TP_X for X coordinate detection are arrayed in a lateral direction, and four electrodes TP_Y for Y coordinate detection are arrayed in a longitudinal direction. However, the number of electrodes and the electrode arranging method are not limited thereto. The capacitance detection circuit DCKT illustrated in FIG. 27 for detecting each sensor electrode capacitance is connected to each sensor electrode. Each capacitance detection circuit DCKT operates based on various control signals (SA, SB, SR, and ADJ) output from an input coordinate detection control unit 1103, and outputs output signals vo which are detection results of the sensor electrodes and capacitances input to the sensor electrodes, to an AD conversion unit ADC. The AD conversion unit ADC performs AD conversion for the output signal vo of each capacitance detection circuit according to an AD conversion timing signal ADT output from the input coordinate detection control unit 1103, and outputs a resultant digital signal DATA to the input coordinate detection control unit 1103. The input coordinate detection control unit 1103 judges presence or absence of an input and input coordinates, based on the digital signal DATA, and outputs a result of the judgment to a system 1105. The system 1105 executes processing according to the input coordinates or an input action, and outputs an image based on the processing to a display device control unit 1104. The display device control unit 1104 outputs signal data for displaying the image and a display control signal DPC for driving the display device, to a display unit 1102. In this case, the display control signal DPC is also output to the input coordinate detection control unit 1103. This configuration enables execution of an application of the system according to an input (touching) and displaying of a video on the display device, based on a result of the execution.

Next, referring to FIG. 31, an operation sequence of the coordinate input device according to the ninth embodiment of the present invention is described. In the coordinate input device according to the ninth embodiment of the present invention, capacitances of the sensor electrodes are sequentially detected. In FIG. 31, the capacitances are detected sequentially from the TP_X1 electrode to the TP_X4 electrode and from the TP_Y1 electrode to the TP_Y4 electrode. However, this detection order is not limited thereto. In the detection method of each detection operation circuit, the electrodes may be detected by carrying out charging/discharging operation one time as illustrated in FIGS. 28A and 28B, or by carrying out charging/discharging n times as illustrated in FIGS. 29A and 29B. These items may be designed depending on an input detection speed of the coordinate input device. An output signal of each capacitance detection circuit outputs a digital signal DATA according to the AD conversion timing signal ADT. Thus, for the DATA, capacitance detection results of the sensor electrodes are output in series.

FIG. 32 illustrates a capacitance detection result of each sensor electrode when a capacitance increase by touching occurs at a point of FA in the coordinate input unit 1101 illustrated in FIG. 30. When touching occurs at the point of FA, input capacitances increase in the sensor electrodes TP_X2 and TP_Y2, which increases levels of corresponding digital signals DX2 and DY2. Thus, it may be judged that an input has been made to the corresponding coordinates of the sensor electrodes.

Figure 33:
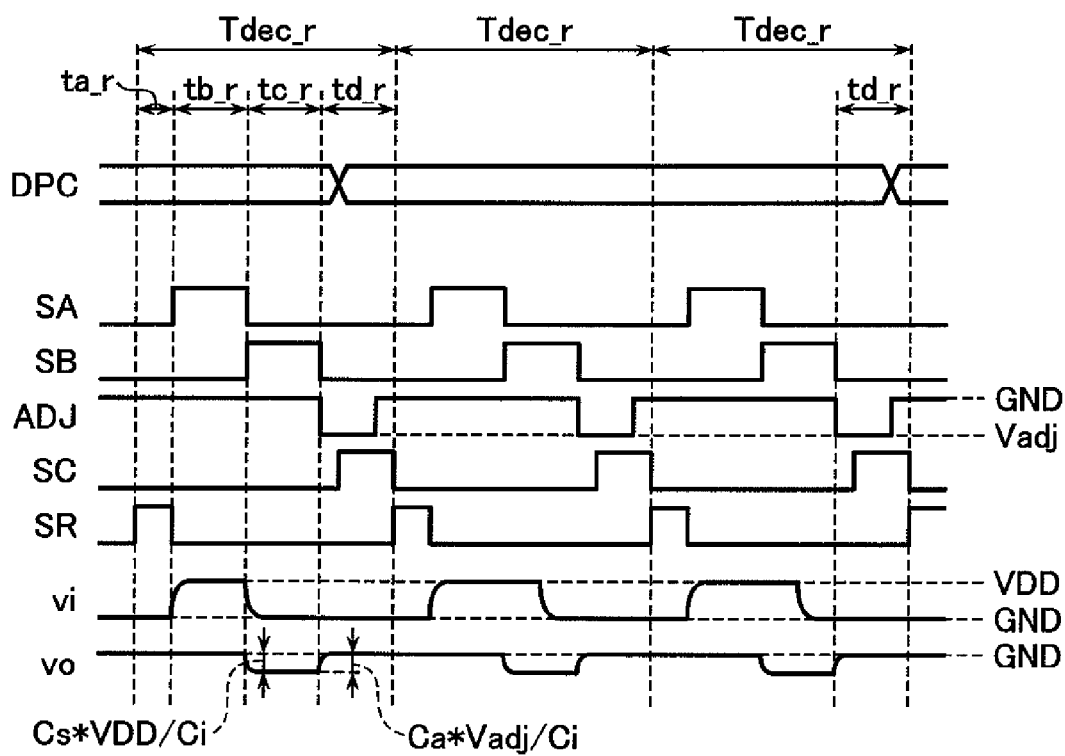
FIG. 33 is a timing chart illustrating capacitance detection of the coordinate input device of the ninth embodiment.

Next, referring to FIG. 33, a detection method for reducing noise from the display device in the capacitance detection circuit of the ninth embodiment of the present invention is described. In FIG. 30, the coordinate input unit 1101 and the display unit 1102 are disposed in a manner of being overlapped in a vertical direction. Thus, a parasitic capacitance is generated between the image displaying driving electrode included in the display unit 1102 and the sensor electrode TP of the coordinate input unit 1101. Potential fluctuation in the image displaying driving electrode included in the display unit 1102 propagates to the sensor electrode TP of the coordinate input unit 1101 via the parasitic capacitance, which causes noise to be generated in an output of the capacitance detection circuit. Thus, as illustrated in FIG. 33, the input coordinate detection control unit 1103 controls various control signals of the capacitance detection circuit based on a display control signal DPC so that timing of potential fluctuation in the image displaying driving electrode (in FIG. 33, timing of changing of the display control signal DPC) may always be within one of the periods td_r and td. This way, the display unit 1102 generates no noise in the periods ta_r, ta, tb_r, tb, tc_r, and tc in which charges are applied for detecting capacitances. In the periods td_r and td, because of the ON state of the switch SB, even when noise is generated in the detection sensor electrode TP due to fluctuation in the display control signal DPC in the display unit 1102, there is no influence on the output voltage vo. Thus, controlling performed by the input coordinate detection control unit 1103 based on the display control signal DPC so that the changing timing of the video displaying driving electrode signal of the display unit 1102 may be within one of the periods td_r and td enables a reduction in noise from the display unit 1102. As a result, input coordinates by touching may be detected with high accuracy.

The driving electrode for video displaying is, for example, in the case of a liquid crystal display device, a signal voltage line or a common electrode for supplying a signal voltage to the liquid crystal.

Tenth Embodiment

Figure 34:
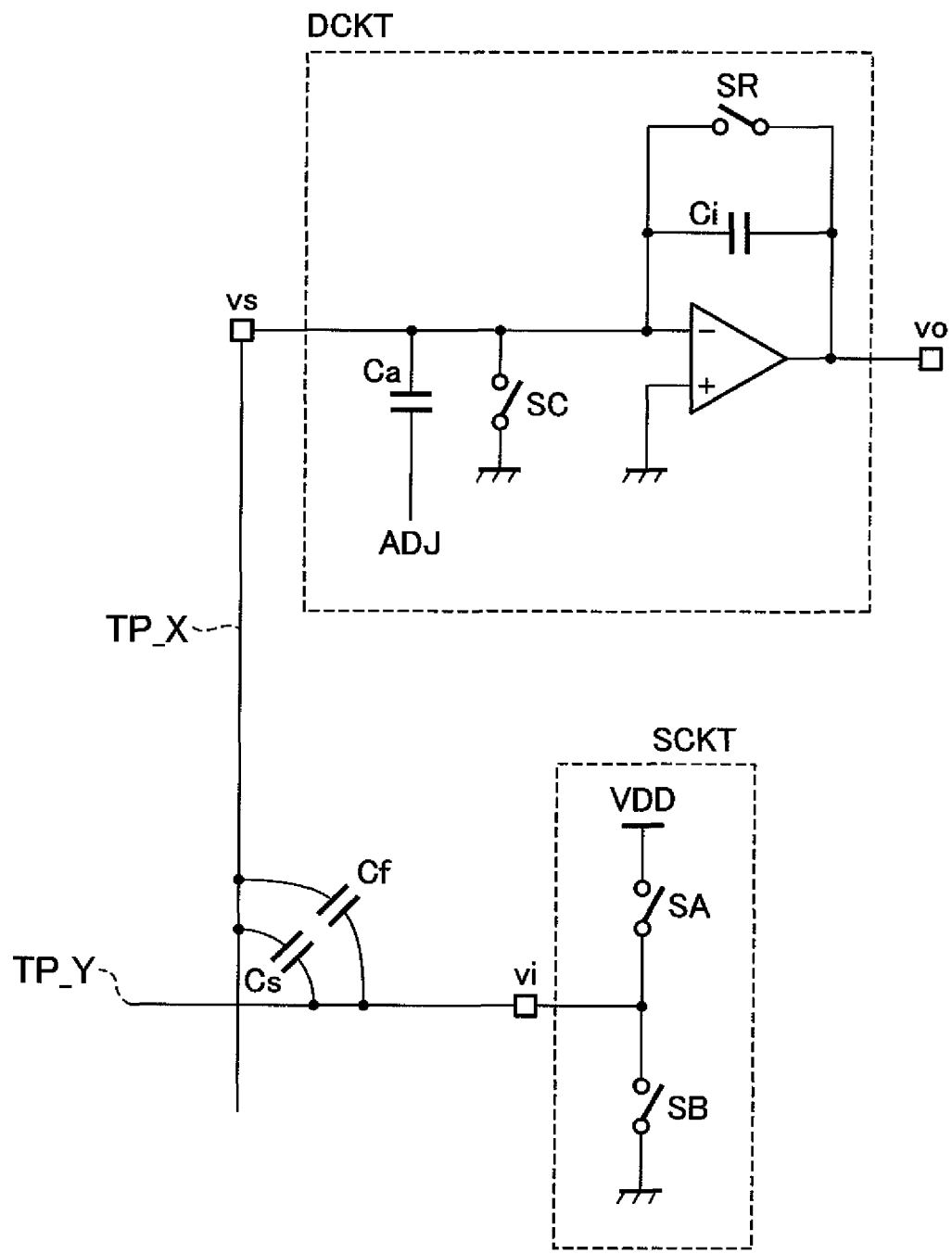
FIG. 34 is a circuit diagram illustrating a capacitance detection circuit according to a tenth embodiment.

Referring to FIGS. 34, 35A, 35B, 36A and 36B, a capacitance detection circuit used in a coordinate input device according to a tenth embodiment of the present invention is described. FIG. 34 is a circuit diagram illustrating the capacitance detection circuit according to the tenth embodiment of the present invention. The capacitance detection circuit includes a pair of a scanning circuit SCKT and a detection circuit DCKT. A scanning sensor electrode TP_Y for capacitance detection is connected to an output terminal vi of the scanning circuit SCKT. A detection sensor electrode TP_X for capacitance detection is connected to an input terminal vs of the detection circuit DCKT. A terminal vo outputs an output voltage of the detection circuit DCKT. The capacitance detection circuit according to the tenth embodiment of the present invention detects a capacitance generated in the vicinity of an intersection between the scanning sensor electrode TP_Y and the detection sensor electrode TP_X. A capacitance Cs is a capacitance obtained in a state where there is no input such as an intersection capacitance between the scanning sensor electrode TP_Y and the detection sensor electrode TP_X. A capacitance Cf is an input capacitance generated when there is an input by touching in the vicinity of the intersection between the scanning sensor electrode TP_Y and the detection sensor electrode TP_X.

The scanning circuit SCKT includes a switch SA for charging the scanning sensor electrode TP_Y with a fixed voltage VDD, and a switch SB for discharging the fixed voltage VDD charged in the scanning sensor electrode TP_Y to a GND. The detection circuit DCKT includes a switch SR for resetting an integration voltage of an integration capacitor Ci, an integration circuit constituted of the integration capacitor Ci and an operational amplifier, an adjustment capacitor Ca for adjusting an output voltage of the integration circuit, and a switch SC. The adjustment capacitor Ca and an adjustment signal ADJ for driving one terminal of the adjustment capacitor Ca are used for adjusting an integration voltage (referred to as electrode offset voltage, hereinafter) obtained as a result of detecting a capacitance Cs in a state where there is no input capacitance Cf by touching, so as to eliminate the electrode offset voltage from an output signal vo. The switch SC is used for resetting the scanning sensor electrode or the adjustment capacitor Ca or suppressing noise.

Figure 35A:
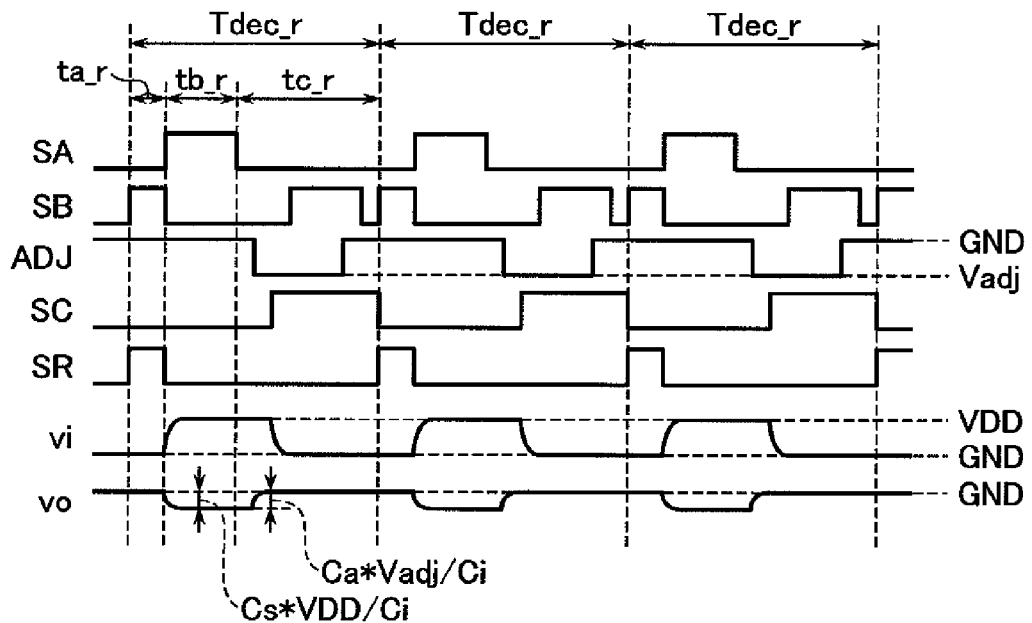
FIGS. 35A and 35B are voltage waveform diagrams when a charging/discharging operation is performed once in the capacitance detection circuit of the tenth embodiment.
Figure 35B:
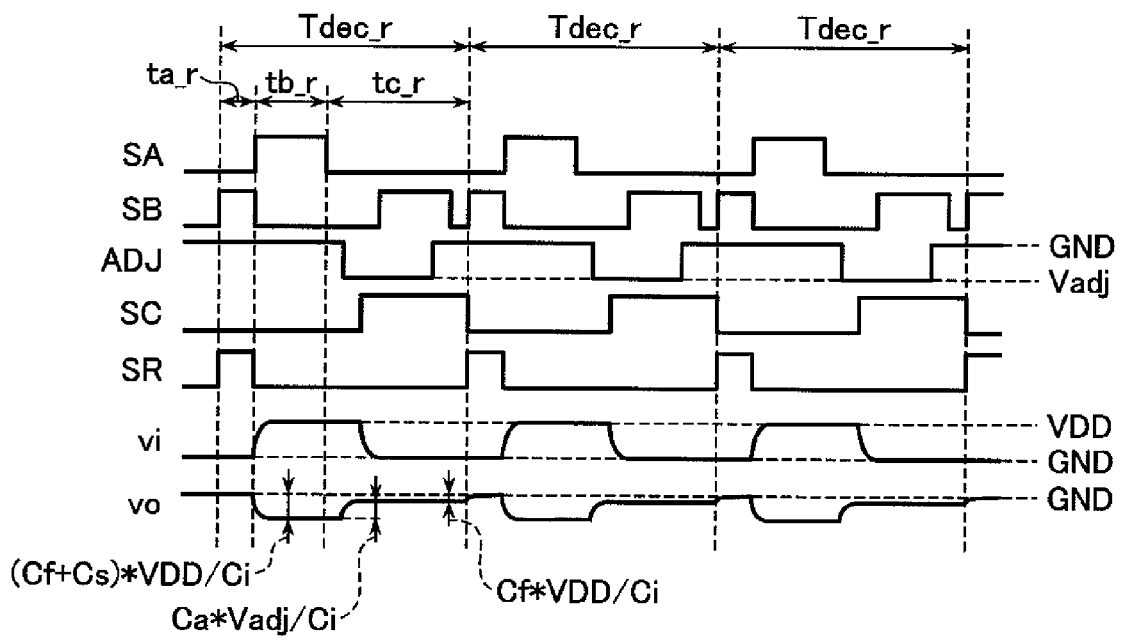

FIGS. 35A and 35B are voltage waveform diagrams illustrating an operation of the scanning circuit and the detection circuit DCKT constituting the capacitance detection circuit according to the tenth embodiment of the present invention. FIG. 35A illustrates a case where an input is only the sensor electrode capacitance Cs, and FIG. 35B illustrates a case where the input capacitance Cf is generated by touching. FIGS. 35A and 35B are timing charts when a capacitance is detected by performing charging or discharging for a capacitor generated in the vicinity of the intersection between the scanning sensor electrode TP_Y and the detection sensor electrode. In this case, the capacitance may be detected at high speed, and hence a number of digital filters in a subsequent stage may be increased, or reaction time (coordinate detection time) of the input device may be reduced.

In Tdec_r which is one charging/discharging cycle, in a period ta_r, the reset switch SR is turned ON to reset an integration voltage of the integration capacitor Ci. In order to reset a potential of the scanning sensor electrode to the GND, the switch SB is turned ON. Next, in a period tb_r, the switch SA is tuned ON to apply the fixed voltage VDD to the scanning sensor electrode TP_Y connected to the output terminal vi. In this case, the detection sensor electrode TP_X is connected to a negative terminal of the operational amplifier via the input terminal vs of the detection circuit DCKT, and hence its potential is set to a ground GND. Thus, charges according to the fixed voltage VDD are charged in a capacitor in the vicinity of the intersection between the scanning sensor electrode TP_Y and the detection sensor electrode TP_X. Charges necessary for this storage are integrated by the integration circuit. Thus, when there is no input by touching as illustrated in FIG. 35A, a potential of an output voltage vo becomes −VDD·Cs/Ci. On the other hand, when there is an input by touching as illustrated in FIG. 35B, a potential of an output voltage vo becomes −VDD·(Cs+Cf)/Ci. In a following period tc_r, adjustment of an electrode offset voltage and resetting of the scanning sensor electrode are carried out. First, an adjustment signal ADJ is changed from GND to −Vadj to charge electric charges in the adjustment capacitor Ca. In this case, charges Ca*Vadj are charged in the adjustment capacitor Ca, and hence an output of the integration circuit is increased by Vadj·Ca/Ci. In this case, when the adjustment voltages Vadj and Ca are set so that the electrode offset voltage VDD·Cs/Ci of FIG. 35A and the adjustment amount Vadj·Ca/Ci by charging electric charges in the adjustment capacitor Ca may be equal to each other, the electrode offset voltage may be eliminated from the output voltage vo. Then, after the change of the adjustment signal ADJ, the switch SC is turned ON. Even when the switch SC is turned ON to be conductive with the ground (GND), the negative terminal of the operational amplifier is a virtual ground, and hence no current flows, to thereby cause no change in the integration voltage. It is assumed that ON resistance of the switch SC is sufficiently low. In this state, the switch SB is turned ON to reset the potential of the scanning sensor electrode TP_Y to the GND. In this case, charges are discharged from the capacitor in the vicinity of the intersection between the scanning sensor electrode TP_Y and the detection sensor electrode TP_X. However, the current due to the discharge flows into the GND via the switch SC, and hence there is no influence on the output voltage vo of the integration circuit. Similarly, in the ON state of the switch SC, the adjustment signal ADJ is returned to the GND to discharge charges from the adjustment capacitor Ca. A discharge current generated from the adjustment capacitor Ca in this case does not flow into the integration circuit because of the sufficiently low ON resistance of the switch SC. The current is discharged to the GND via the switch SC.

Through the aforementioned operation, as illustrated in FIG. 35A, when there is no input by touching, the electrode offset voltage is adjusted to set the output signal vo to 0 V. On the other hand, when touching increases the input capacitance Cf, as illustrated in FIG. 35B, the output signal vo becomes an integration voltage −VDD·Cf/Ci which is proportional to the input capacitance Cf. This way, the electrode offset voltage may be eliminated from the output voltage. Thus, even when the output voltage signal is amplified before AD conversion, a range of the AD conversion may be fully used, and a dynamic range of a detectable input capacitance may be widened.

Figure 36A:
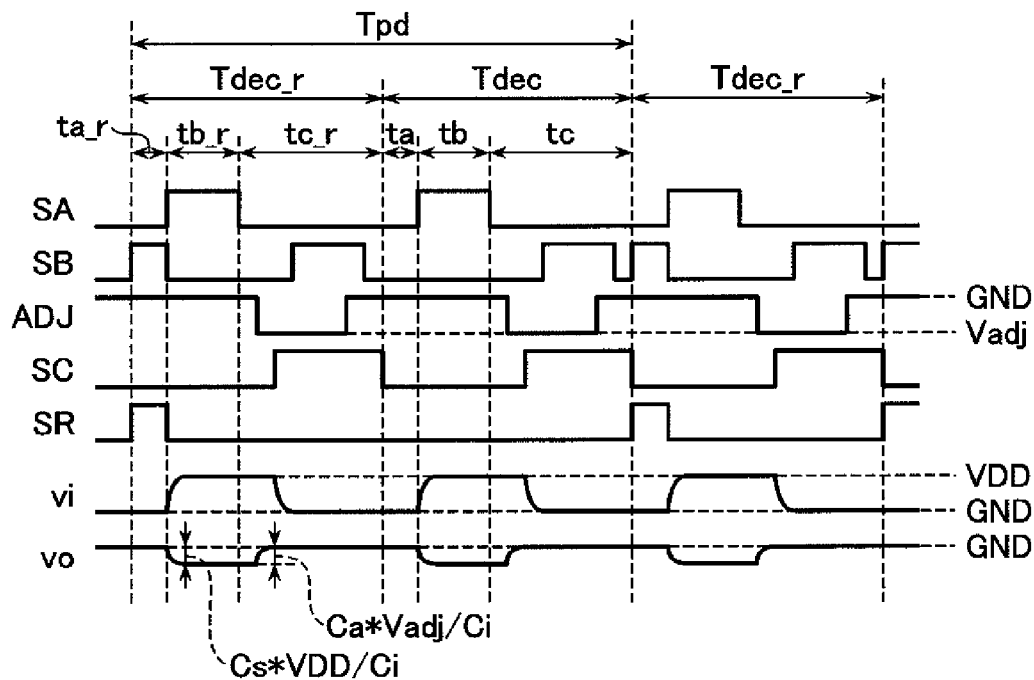
FIGS. 36A and 36B are voltage waveform diagrams when the charging/discharging operation is performed twice in the capacitance detection circuit of the tenth embodiment.
Figure 36B:
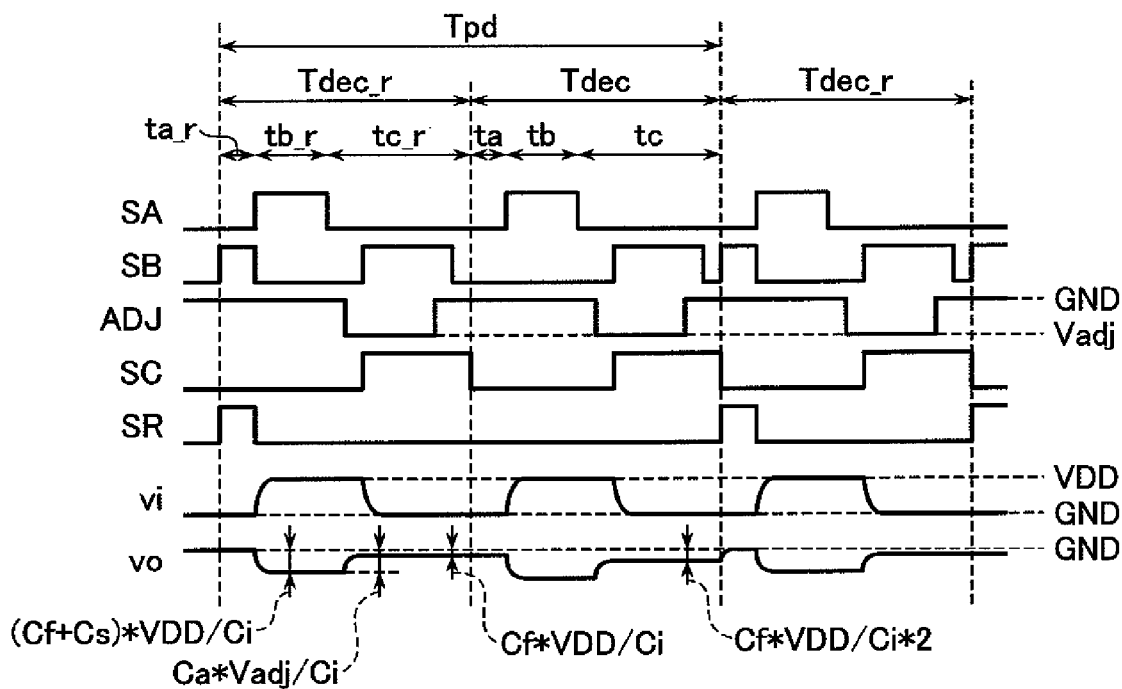

FIGS. 36A and 36B are voltage waveform diagrams illustrating another capacitance detection method which uses the scanning circuit SCKT and the detection circuit DCKT constituting the capacitance detection circuit according to the tenth embodiment of the present invention. In FIGS. 36A and 36B, charging/discharging are performed twice for the capacitor in the vicinity of the intersection between the scanning sensor electrode TP_Y and the detection sensor electrode TP_X. A period Tpd is a detection cycle of an input capacitance. A first charging/discharging period is a charging/discharging period Tdec_r in which a resetting operation of an integration capacitor Ci and the scanning sensor electrode is carried out, and the following discharging period is a charging/discharging period Tdec in which no resetting operation is carried out. A difference between the charging/discharging periods Tdec_r and Tdec is that the resetting operation of the integration capacitor Ci and the scanning sensor electrode is carried out in the period ta_r while no resetting operation is carried out in the period ta. Other periods tb_r and tb, and periods tc_r and tc may be similar in setting. During these periods, as described above referring to FIGS. 35A and 35B, charges are charged in the capacitor in the vicinity of the intersection between the scanning sensor electrode TP_Y and the detection sensor electrode TP_X, currents that flow in this case are integrated, and then an electrode offset voltage is canceled based on an adjustment signal ADJ and an adjustment capacitor Ca. As illustrated in FIG. 36A, the electrode offset voltage is canceled during each of the charging/discharging periods Tdec_r and Tdec, and hence an output voltage vo becomes 0 V when there is no input capacitance even if the charging/discharging is performed twice. On the other hand, when an input capacitance Cf is generated by touching, as illustrated in FIG. 36B, an integration voltage VDD·Cf/Ci dependent on the input capacitance Cf is added to the integration circuit according to the number of times charging/discharging is performed, and hence an output voltage vo becomes 2·VDD·Cf/Ci. In FIGS. 36A and 36B, there is one charging/discharging period Tdec_r and there is one charging/discharging period Tdec, to thereby carry out two charging/discharging detection operations in total. However, the number of charging/discharging period Tdec_r may be set to one, and the number of charging/discharging periods Tdec may be set to n−1, to thereby allow charging/discharging detection to be performed n times in total. This way, an output voltage may be set to n·VDD·Cf/Ci, which is larger by n times than that in the case where charging/discharging is executed once.

Thus, signal addition at the analog circuit portion enables averaging and a reduction in noise generated during the charging/discharging periods. Further, even when the input capacitance Cf is very small, the output signal may be increased without amplifying an analog signal, and hence a high signal to noise ratio may be obtained.

As described above, in the capacitance detection circuit according to the tenth embodiment of the present invention, the output voltage when there is no input by touching may be canceled based on the adjustment signal ADJ and the adjustment capacitor Ca, enabling detection of a very small input capacitance Cf. In the coordinate input device which uses the capacitance detection circuit DCKT, input coordinates may be detected with high accuracy. An output voltage when there is no input by touching may be determined by an electrode offset voltage, or determined by reflecting various characteristics of the operational amplifier or each switch. In both cases, however, the output voltage may be canceled based on setting of the adjustment signal ADJ and the adjustment capacitor Ca.

Figure 37:
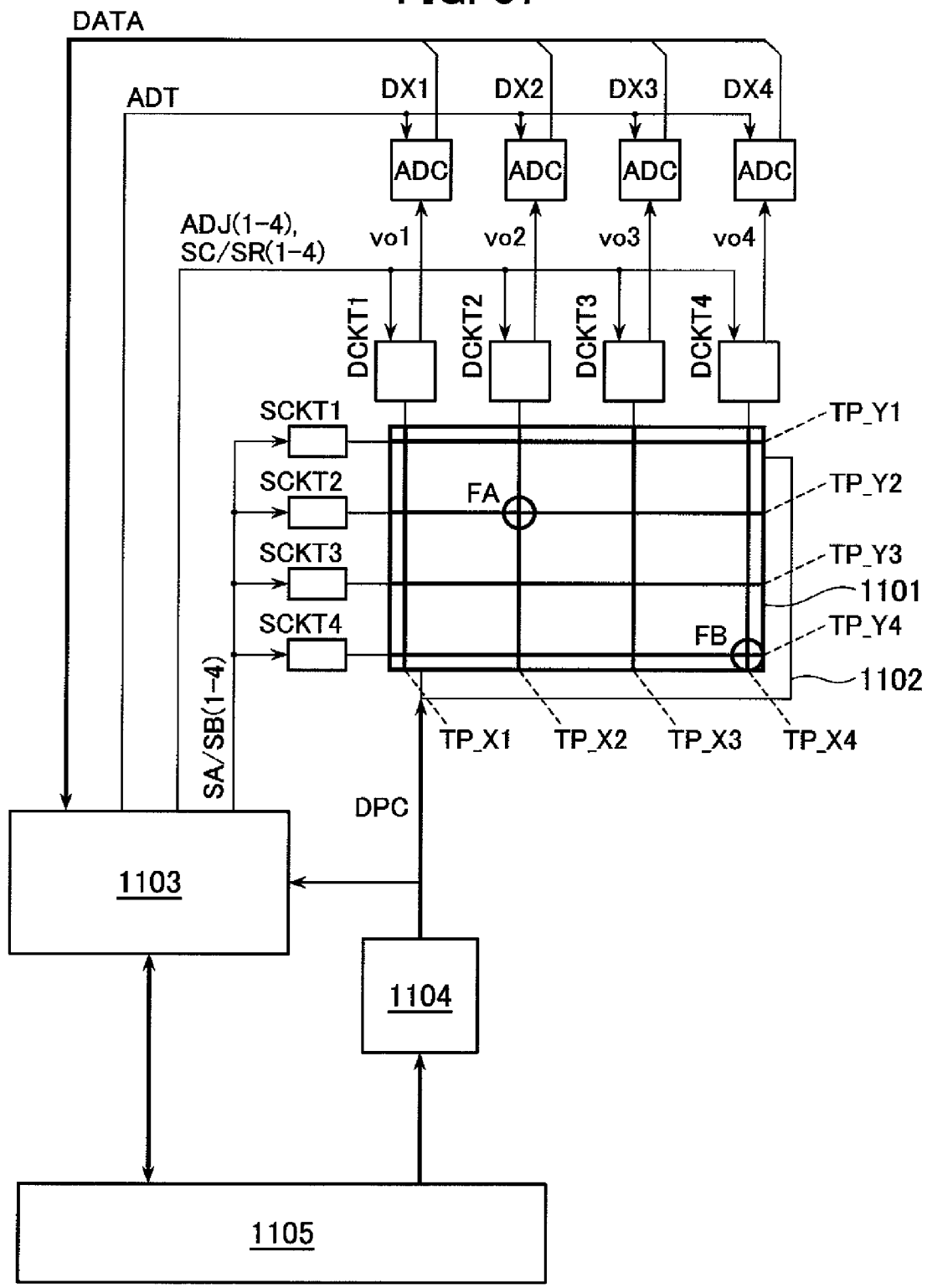
FIG. 37 is a system block diagram illustrating a coordinate input device of the tenth embodiment and a display device using the same.
Figure 38:
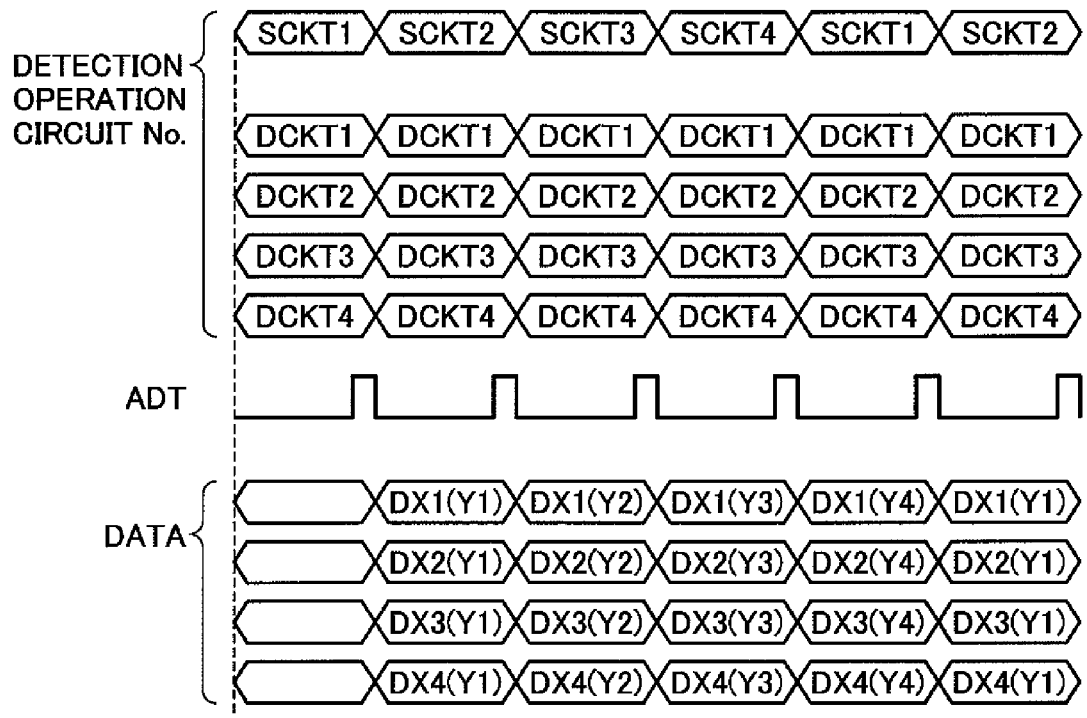
FIG. 38 illustrates a capacitance detection sequence of the coordinate input device of the tenth embodiment.
Figure 39:
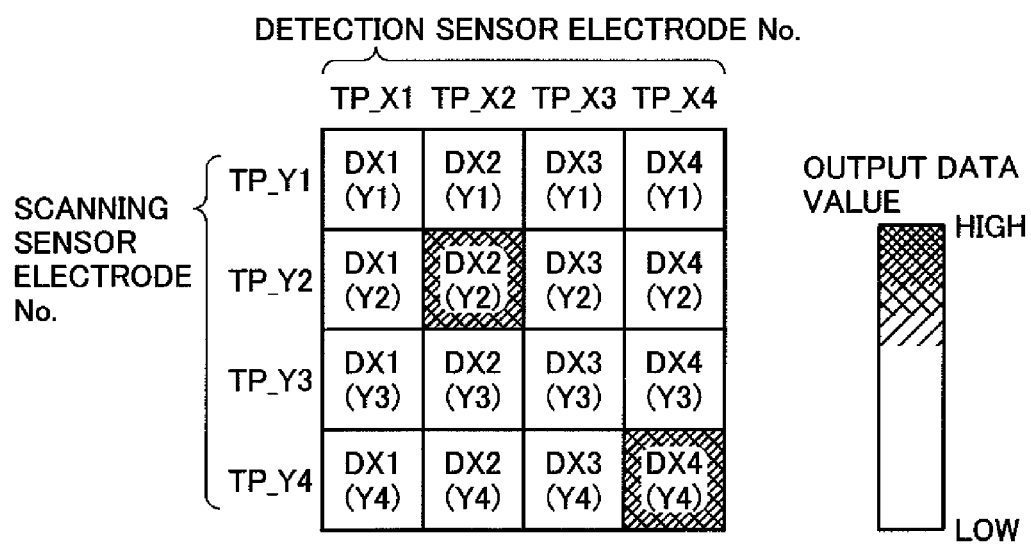
FIG. 39 illustrates a digital output signal of the coordinate input device of the tenth embodiment.

Next, referring to FIGS. 37 to 39, the coordinate input device according to the tenth embodiment of the present invention and a display device provided with the coordinate input device are described.

FIG. 37 is a system block diagram illustrating the coordinate input device according to the tenth embodiment of the present invention and the display device provided with the coordinate input device. A coordinate input unit 1101 includes sensor electrodes TP constituted of transparent electrodes formed on a transparent substrate. In this case, the sensor electrodes are arranged in a matrix, in which four electrodes TP_X for X coordinate detection are arrayed in a lateral direction, and four electrodes TP_Y for Y coordinate detection are arrayed in a longitudinal direction. However, the number of electrodes and the electrode arranging method are not limited to these. In this case, the electrodes TP_Y for Y coordinate detection are each connected as a scanning sensor electrode to the scanning circuit SCKT, and the electrodes TP_X for X coordinate detection are each connected as a detection sensor electrode to the detection circuit DCKT.

Each scanning circuit SCKT operates based on control signals (SA and SB) output from an input coordinate detection control unit 1103. In this case, scanning sensor electrodes TP_Y1 to TP_Y4 are sequentially selected, and a capacitor in the vicinity of an intersection between the selected scanning sensor electrode TP_Y and each detection sensor electrode TP_X is charged with a fixed voltage. Each detection circuit DCKT operates based on control signals (SC, SR, and ADJ) output from the input coordinate detection control unit 1103, detects a current charged in the capacitor in the vicinity of the intersection between the scanning sensor electrode TP_Y selected by the scanning circuit SCKT and each detection sensor electrode TP_X, and outputs an output signal vo which is a detection result of an input capacitance generated by touching to an AD conversion unit ADC. The AD conversion unit ADC performs AD conversion for the output signal vo of each detection circuit DCKT according to an AD conversion timing signal ADT output from the input coordinate detection control unit 1103, and outputs a resultant digital signal DATA to the input coordinate detection control unit 1103. The input coordinate detection control unit 1103 judges presence of an input and input coordinates based on the digital signal DATA, and outputs a result of the judgment to a system 1105. The system 1105 executes processing according to the input coordinates or an input action, and outputs an image based on the processing to a display device control unit 1104. The display device control unit 1104 outputs signal data for displaying the image and a display control signal DPC for driving the display device to a display unit 1102. In this case, the display control signal DPC is also output to the input coordinate detection control unit 1103. This configuration enables execution of an application of the system according to an input (touching) and displaying of a video based on a result of the execution on the display device.

Next, referring to FIG. 38, an operation sequence of the coordinate input device of the tenth embodiment of the present invention is described. In the coordinate input device of the tenth embodiment of the present invention, the scanning sensor electrodes TP_Y are sequentially selected by the scanning circuit SCKT, and an input capacitance in the vicinity of an intersection between the selected scanning sensor electrode TP_Y and each detection sensor electrode TP_X is detected. Thus, when the scanning sensor electrode TP_Y1 is selected by the scanning circuit SCKT 1, results detected by the detection circuits DCKT 1 to 4 are results of detecting input capacitances in the vicinities of the intersections with the detection sensor electrodes TP_X1 to TP_X4. As a result, sequentially selecting the scanning circuits to perform detection with the scanning sensor electrodes TP_Y1 to TP_Y4 enables detection of all the input capacitances in the vicinities of the intersections. In the detection method of each detection operation, the input capacitances may be detected by one charging/discharging operation as illustrated in FIGS. 35A and 35B, or by charging/discharging carried out n times as illustrated in FIGS. 36A and 36B. As an output signal of each detection circuit, the digital signal DATA is output according to the AD conversion timing signal ADT. Thus, for the digital signal DATA, input capacitance detection results in the vicinities of the intersections between the selected scanning sensor electrodes and the detection sensor electrodes are output in parallel. In this case, input capacitance detection results in the vicinity of the intersection between the scanning sensor electrode TP_Y1 and each detection sensor electrode are represented by DX1 (Y1) to DX4 (Y1).

FIG. 39 illustrates results of detecting input capacitances in the vicinities of intersections of each sensor electrode when capacitance increases by touching occur in two points FA and FB of FIG. 37 in the coordinate input unit 1101 illustrated in FIG. 37. When touching occurs at the point FA, two data pieces, i.e., data DX2 (Y2) in the vicinity of an intersection between the scanning sensor electrode TP_Y2 and the detection sensor electrode TP_X2 and data DX4 (Y4) in the vicinity of an intersection between the scanning sensor electrode TP_Y4 and the detection sensor electrode TP_X4, increase according to an input capacitance Cf, and inputs may be judged to have been made at coordinates corresponding to these two points.

Figure 40:
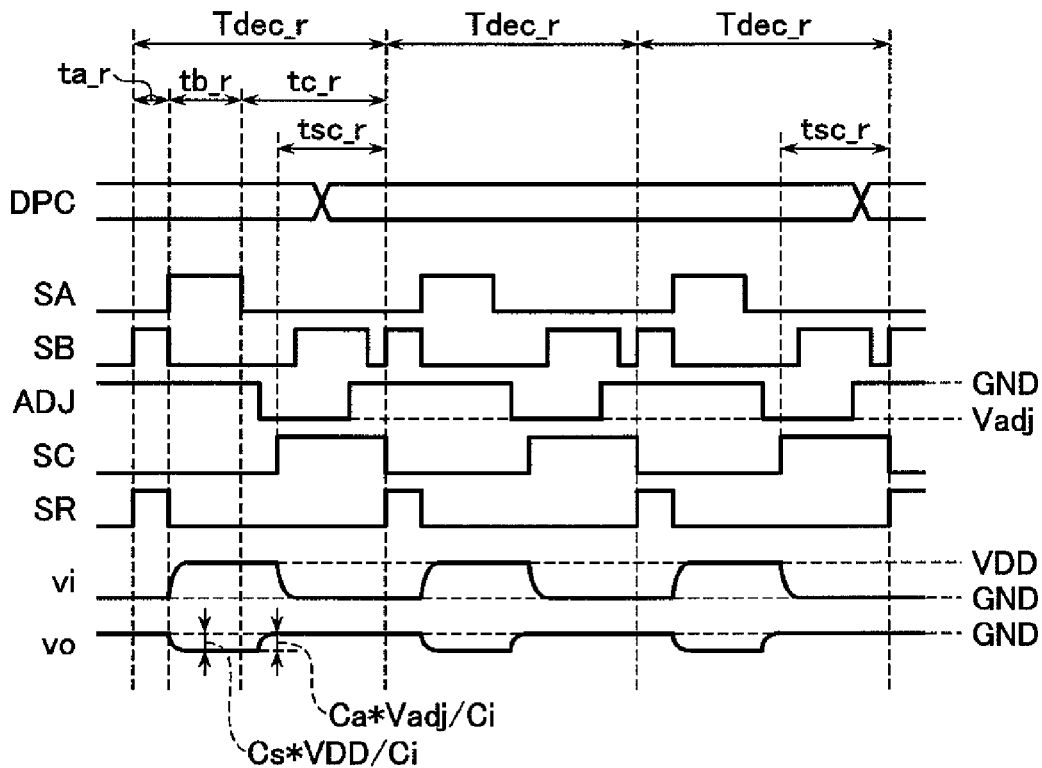
FIG. 40 is a timing chart illustrating capacitance detection of the coordinate input device of the tenth embodiment.

Next, referring to FIG. 40, a detection method for reducing noise from the display device in the capacitance detection circuit of the tenth embodiment of the present invention is described. In FIG. 37, the coordinate input unit 1101 and the display unit 1102 are disposed so as to overlap each other in a vertical direction. Thus, as described above in the ninth embodiment, a parasitic capacitance is generated between the image displaying driving electrode included in the display unit 1102 and the sensor electrode TP of the coordinate input unit 1101. Potential fluctuation in the image displaying driving electrode included in the display unit 1102 propagates to the sensor electrode TP of the coordinate input unit 1101 via the parasitic capacitance, causing generation of noise in an output of the capacitance detection circuit.

Thus, as illustrated in FIG. 40, the input coordinate detection control unit 1103 controls various control signals for the capacitance detection circuit based on the display control signal DPC so that timing of potential fluctuation in the image displaying driving electrode (in FIG. 40, timing of changing of the display control signal DPC) may always be within one of the periods tc_r and tc in which the switch SC is turned ON (tsc_r in FIG. 40). This way, the display unit 1102 generates no noise in the periods ta_r, ta, tb_r, and tb in which charges are charged for detecting capacitances. In the periods tc_r and tc, because of the ON state of the switch SC, even when noise generates a current in the detection sensor electrode TP_X due to fluctuation in display control signal DPC in the display unit 1102, the current flows into the GND via the switch SC, and hence there is no influence on the output voltage vo of the integration circuit. Thus, as described above, controlling performed by the input coordinate detection control unit 1103 based on the display control signal DPC so that the changing timing of the video displaying driving electrode signal of the display unit 1102 may be within one of the periods tc_r and tc of each detection cycle in which the switch SC is ON enables a reduction in noise from the display unit 1102. As a result, input coordinates by touching may be detected with high accuracy.

Eleventh Embodiment

Figure 41:
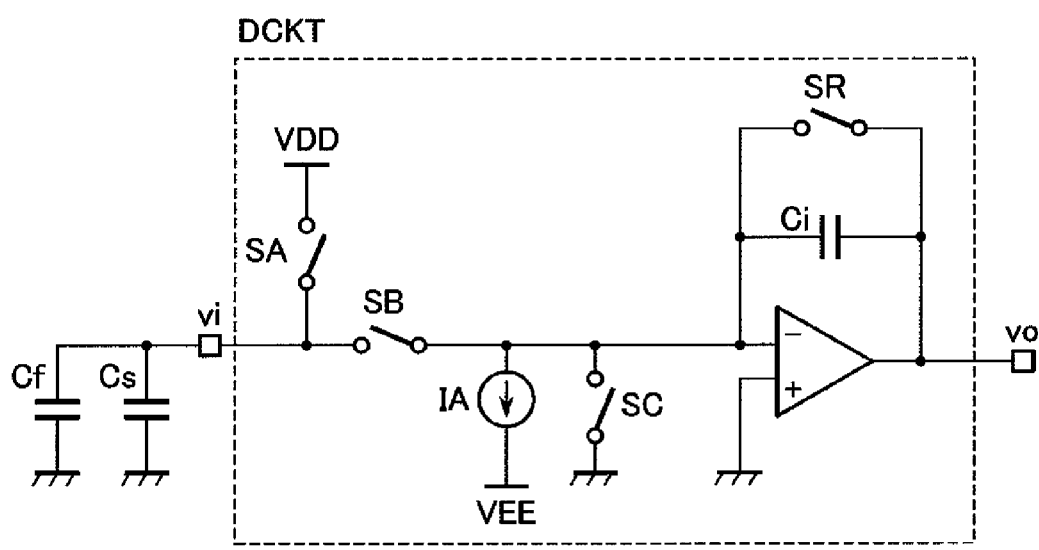
FIG. 41 is a circuit diagram illustrating a capacitance detection circuit according to an eleventh embodiment.
Figure 42A:
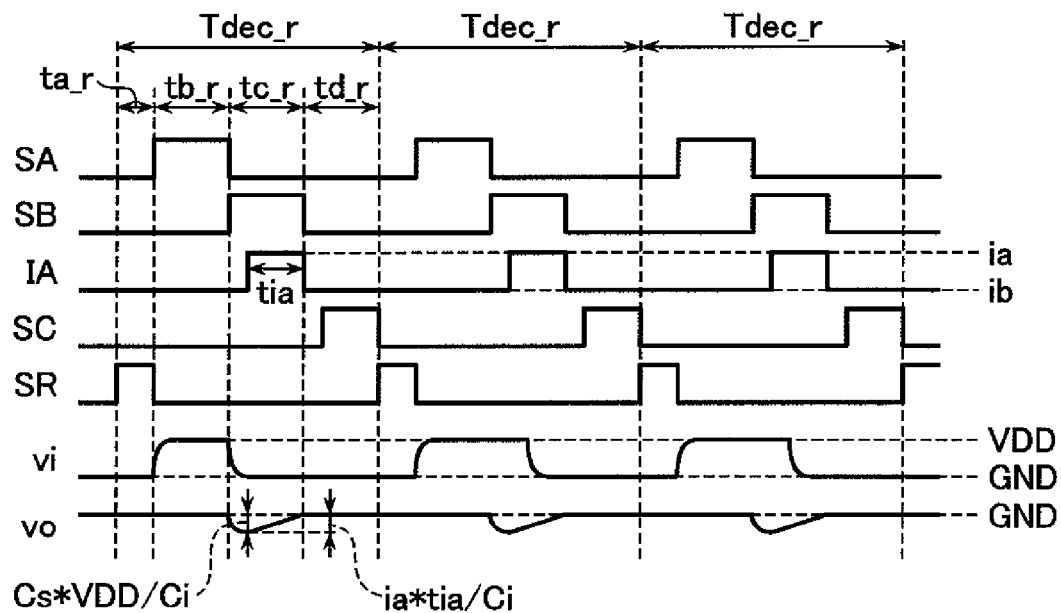
FIGS. 42A and 42B are voltage waveform diagrams when a charging/discharging operation is performed once in the capacitance detection circuit of the eleventh embodiment.
Figure 42B:
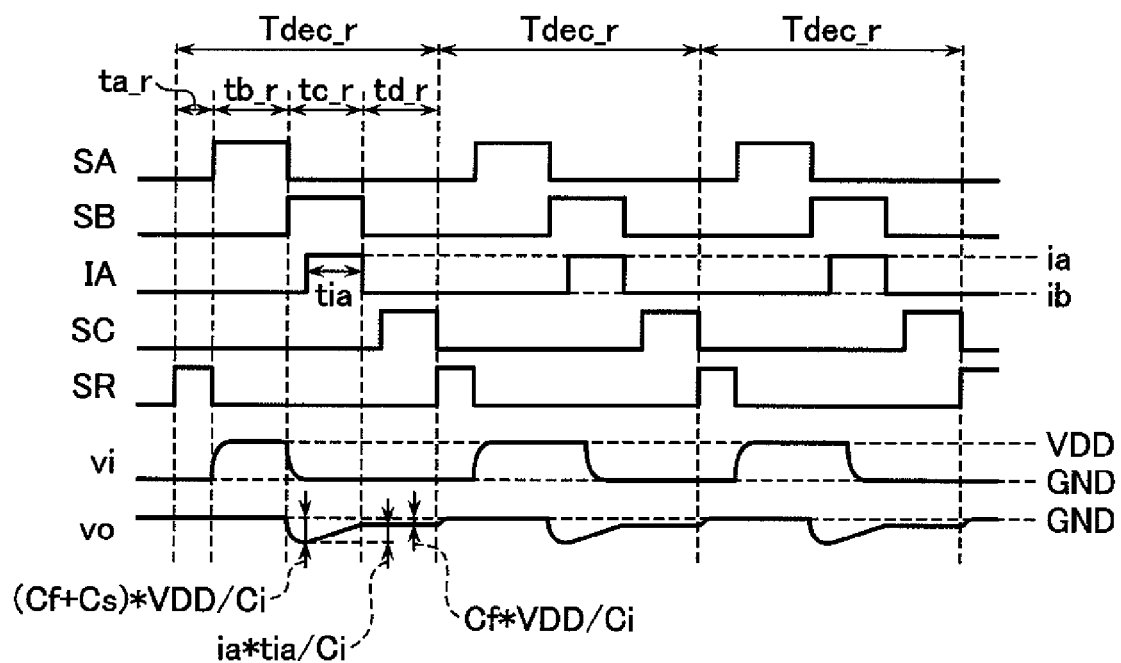
Figure 43:
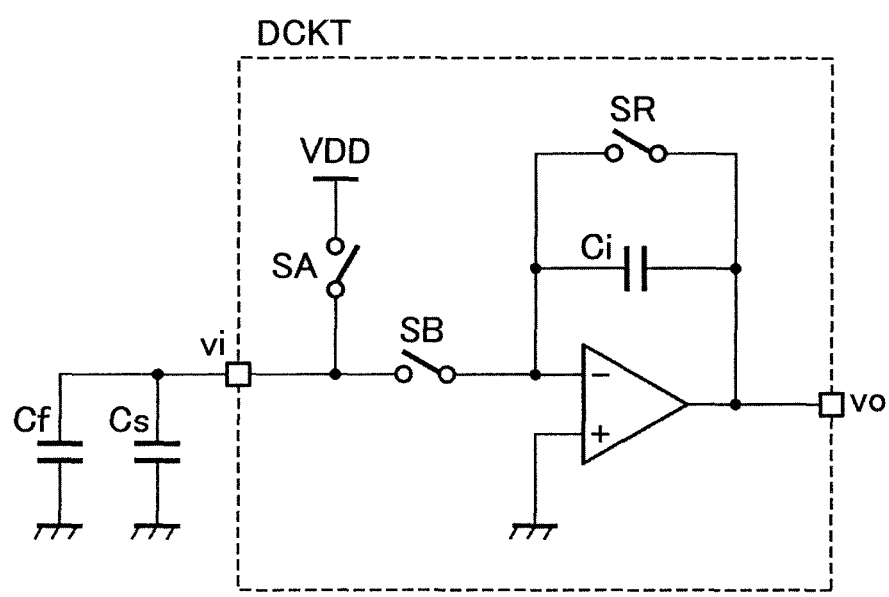
FIG. 43 is a circuit diagram illustrating a conventional capacitance detection circuit.
Figure 44A:
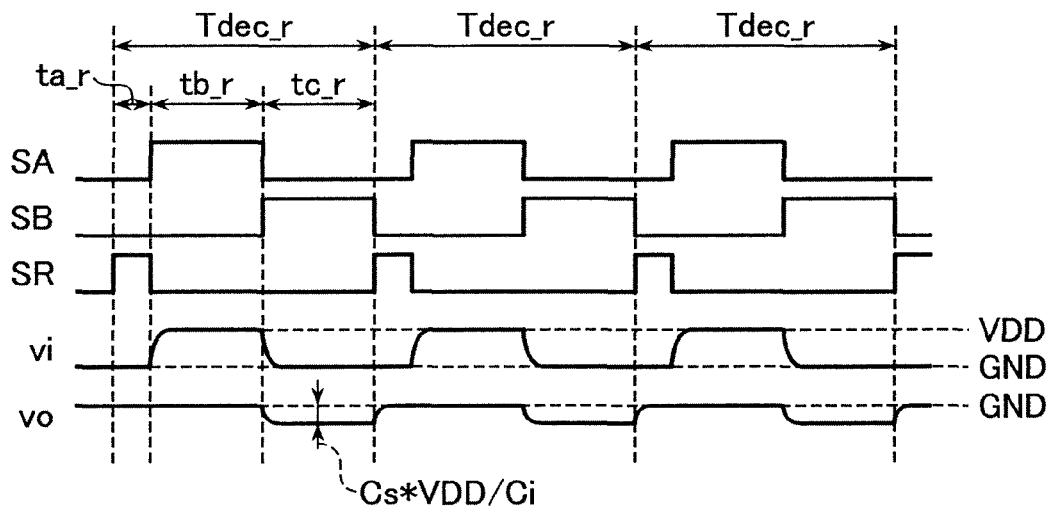
FIGS. 44A and 44B are voltage waveform diagrams when a charging/discharging operation is performed once in the conventional capacitance detection circuit.
Figure 44B:
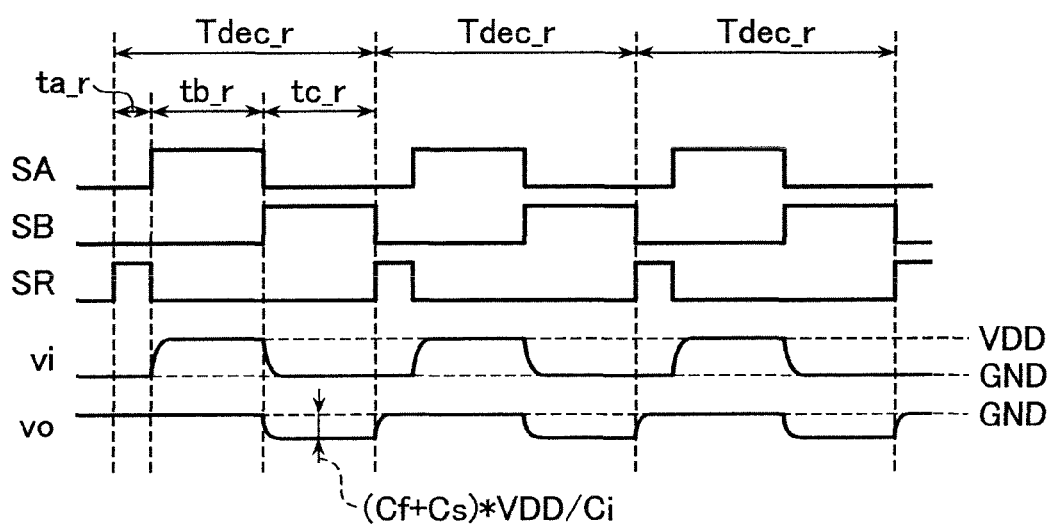

Next, referring to FIGS. 41, 42A and 42B, a capacitance detection circuit used in a coordinate input device of an eleventh embodiment of the present invention is described. Unlike cancellation of the electrode offset voltage or the integration voltage in the capacitance detection circuit when there is no input by touching by the adjustment capacitor Ca and the adjustment signal ADJ in the ninth and tenth embodiments described above, the capacitance detection circuit of the eleventh embodiment of the present invention performs control by a current source IA. A capacitance detection circuit DCKT is a circuit for detecting a sensor electrode capacitance Cs connected to an input terminal vi and an input capacitance Cf increased by touching on the sensor electrode.

FIG. 41 is a circuit diagram illustrating the capacitance detection circuit of the eleventh embodiment of the present invention. The capacitance detection circuit DCKT includes a switch SA for charging the sensor electrode capacitance Cs with a fixed voltage VDD, a switch SB for transferring charged charges, an integration circuit provided with a reset switch SR, and an adjustment current source IA for adjusting an integration voltage value (referred to as an electrode offset voltage, hereinafter) of the sensor electrode capacitance Cs to eliminate the integration voltage value from an output signal vo. The integration circuit includes an integration capacitor Ci and an operational amplifier. The current source IA controls a current amount according to timing.

FIGS. 42A and 42B are voltage waveform diagrams illustrating an operation of the capacitance detection circuit DCKT of the eleventh embodiment of the present invention. FIG. 42A illustrates a case where an input is only a sensor electrode capacitance Cs, and FIG. 42B illustrates a case where an input capacitance Cf is generated by touching. FIGS. 42A and 42B are timing charts when a capacitance is detected by performing charging or discharging for a capacitor connected to the input terminal vi once. In Tdec_r which is one charging/discharging cycle, in a period ta_r, the reset switch SR is turned ON to reset an integration voltage of the integration capacitor Ci. Next, in a period tb_r, the switch SA is tuned ON to charge the capacitor connected to the input terminal vi with a fixed voltage VDD. In a subsequent period tc_r, the switch SB is turned ON while the switch SA is OFF to transfer electric charges charged in the capacitor connected to the input terminal vi to the integration circuit. Thus, in the period tc_r, in the case of only the sensor electrode capacitance Cs, as illustrated in FIG. 42A, the integration voltage becomes $-VDD \cdot Cs/Ci$. In the case of FIG. 42B where the input capacitance Cf is increased by touching, an integration voltage becomes $-VDD \cdot (Cs+Cf)/Ci$. In those periods, the output current from the adjustment current source IA is made sufficiently small so that no influence is made on the integration voltage of the integration circuit.

In the period tc_r, an electrode offset voltage by the sensor electrode capacitance Cs is adjusted. In this case, the current source IA generates a constant current is only for a given period tia. In FIG. 41, the current is flows from the integration circuit into the current source, and hence an integration voltage increases by $ia \cdot tia/Ci$. When the adjustment current ia and the period tia are set so that an electrode offset voltage $VDD \cdot Cs/Ci$ of the sensor electrode capacitance Cs and an adjustment amount $ia \cdot tia/Ci$ by the current source IA in FIG. 42A may be equal to each other, the electrode offset voltage by the sensor electrode capacitance may be eliminated from the output voltage vo. Then, in the period td_r, the switch SC is turned ON. Even when the switch SC is turned ON to be conductive with the ground (GND), no current flows because the negative terminal of the operational amplifier is a virtual ground, and hence no change occurs in integration voltage. It is assumed that ON resistance of the switch SC is sufficiently low.

Through the aforementioned operation, as illustrated in FIG. 42A, when the capacitance connected to the input terminal vi is the sensor electrode capacitance Cs, the electrode offset voltage is adjusted to set the output signal vo to 0 V. On the other hand, when touching increases the input capacitance Cf, as illustrated in FIG. 42B, the output signal vo becomes an integration voltage $-VDD \cdot Cf/Ci$ which is proportional to the input capacitance Cf. This way, the electrode offset voltage may be eliminated from the output voltage. Thus, even when the output voltage signal is amplified before AD conversion, a range of the AD conversion may be fully used, and a dynamic range of a detectable input capacitance may be widened.

In the capacitance detection circuit of the eleventh embodiment of the present invention, as in the ninth embodiment, capacitance detection may be carried out by performing charging/discharging a plurality of times (not shown). The current source IA used for electrode offset voltage adjustment in the capacitance detection circuit of the eleventh embodiment of the present invention may be applied to the capacitance detection circuit of the tenth embodiment of the present invention. In this case, the current source IA is used in place of the adjustment capacitor Ca of FIG. 34. In this case, the adjustment of an electrode offset voltage by the current source IA is performed in the period tc_r or tc in the voltage waveform diagrams of FIGS. 35A and 35B. Specifically, in the period tc_r, a period in which the switch SC is OFF is set as a period tia in which the current source IA generates the current ia. Accordingly, after the adjustment of the electrode offset voltage, the switch SC is turned ON to execute a resetting operation of the scanning sensor electrode. This control enables application of the adjustment of the output voltage vo using the current source IA of the eleventh embodiment of the present invention to the capacitance detection circuit of the tenth embodiment.

A coordinate input device using the capacitance detection circuit of the eleventh embodiment of the present invention and a display device including the same are similar to those of the ninth and tenth embodiments described above, and thus description thereof is omitted.

As described above, in the capacitance detection circuit of the eleventh embodiment of the present invention, the output voltage when there is no input by touching may be canceled by the current source IA. Thus, a very small input capacitance Cf may be detected. As a result, in the coordinate input device using the capacitance detection circuit DCKT, input coordinates may be detected with high accuracy.

The output voltage when there is no input by touching may be determined by an electrode offset voltage or by reflecting various characteristics of the operational amplifier or the switches. In both cases, the output voltage may be canceled based on setting of the adjustment current ia and the period tia. This embodiment has been described on the assumption that the output voltage when there is no input by touching is at the negative potential. Even if the output voltage when there is no input by touching is at a positive potential, the output voltage may be canceled by reversing a current direction of the current source IA.

In the capacitance detection circuit of each of the ninth to eleventh embodiments of the present invention, in order to adjust an output current amount from the operational amplifier illustrated in FIG. 27, 34 or 41, an adjustment resistor may be inserted between a terminal of the switching element SC and a negative side input terminal of the operational amplifier.

According to the ninth to eleventh embodiments of the present invention, only the input capacitance increased by touching may be detected as an output signal, and thus a dynamic range of detectable input capacitances may be widened to improve detection accuracy. Only an analog signal regarding an input capacitance may be added by repeating charging/discharging a plurality of times, and thus noises generated during charging/discharging are averaged to reduce noise components, enabling acquisition of detection results of a high signal to noise ratio. Signals may be increased only by increasing the number of times charging/discharging is performed even with a very small input capacitance. Thus, a higher signal to noise ratio may be obtained as compared with a case where the analog signal is simply amplified by the operational amplifier. As a result, highly accurate coordinate detection results may be obtained.

Further, a noise component from the display device may be eliminated during the period of a normal charging/discharging cycle. As a result, a detection period of time may be shortened as compared with a case where the noise component is simply masked, and the coordinate input device may realize high-speed coordinate detection.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A capacitance detection device of a capacitance system, comprising:
   a first capacitor including a coordinate electrode for detecting a capacitance;
   a power source for supplying electric charges to be charged in the first capacitor;
   an electric charge storage capacitor in which charges to be charged therein changes according to the electric charges charged in the first capacitor;
   the electric charge storage capacitor includes a first electrode which connects with the coordinate electrode and a second electrode which is opposed to the first electrode;
   a first switch and a second switch for changing a reference potential of the second electrode of the electric charge storage capacitor; and
   a second capacitor including the coordinate electrode and a conductor which touches the capacitance detection device;
   wherein the first switch electrically connects between the second electrode of the electric charge storage capacitor and a first reference voltage;
   wherein the second switch electrically connects between the second electrode of the electric charge storage capacitor and a second reference voltage;
   further comprising an amplifier for detecting electric charges which are transferred from the coordinate electrode via a third switch,
   wherein the third switch directly connects between the coordinate electrode and the amplifier in order to transfer the electric charges,
   wherein the capacitance detection device is configured so that when the second reference voltage is applied to the second electrode of the electric charge storage capacitor a noise voltage of the coordinate electrode is reduced,
   wherein the reference potential of the electric charge storage capacitor is changed in a period of measuring the capacitance due to turning on of the first and second switch alternately,
   wherein the second switch is turned ON corresponding to a term comprising a start time and an end time in which the electric charges are transferred via the third switch, and
   wherein the third switch is configured to be turned ON at the same start time as the second switch during the term.

2. A capacitance detection device according to claim 1, wherein at least one of the first switch and the second switch sets the reference potential of the electric charge storage capacitor as a potential of a portion which causes noise to be generated in a charging potential at which the charges are charged in the electric charge storage capacitor.

3. A capacitance detection device according to claim 2, wherein a period in which the at least one of the first switch and the second switch sets the reference potential of the electric charge storage capacitor as the potential of the portion which causes the noise to be generated in the charging potential at which the charges are charged in the electric charge storage capacitor overlaps with at least one of a period in which the electric charges charged in the coordinate electrode of a measuring target are moved to the electric charge storage capacitor and a period in which the charges are charged in the coordinate electrode of the measuring target.

4. A capacitance detection device according to claim 1, further comprising a filter in a portion for connecting a terminal to which the reference potential of the electric charge storage capacitor is input with a portion which causes noise to be generated in a charging potential at which the charges are charged in the electric charge storage capacitor.

5. An input coordinate detecting device of a capacitance system, comprising:
   a first capacitor including a coordinate electrode for detecting a capacitance;
   a power source for supplying electric charges to be charged in the first capacitor;
   an electric charge storage capacitor in which charges to be charged therein changes according to the electric charges charged in the first capacitor;
   the electric charge storage capacitor including a first electrode which connects with the coordinate electrode and a second electrode which is opposed to the first electrode; and
   a first and second switch for changing a reference potential of the second electrode of the electric charge storage capacitor, wherein the first switch electrically connects between the second electrode and a first reference voltage, wherein the second switch electrically connects between the second electrode and a second reference voltage, further comprising an amplifier for detecting electric charges which are transferred from the coordinate electrode via a third switch, wherein the third switch directly connects between the coordinate electrode and the amplifier in order to transfer the electric charges, wherein the coordinate detecting device is configured so that when the second reference voltage is applied to the second electrode of the electric charge storage capacitor a noise voltage of the coordinate electrode is reduced, wherein the reference potential of the electric charge storage capacitor is changed in a period of measuring the capacitance due to turning on of the first and second switch alternately, wherein the second switch is turned ON corresponding to a term comprising a start time and an end time in which the electric charges are transferred via the third switch, and wherein the third switch is configured to be turned ON at the same start time as the second switch during the term.

6. An input coordinate detection device according to claim 5, wherein at least one of the first switch and the second switch sets the reference potential of the electric charge storage capacitor as a potential which causes noise to be generated in a charging potential at which the charges are charged in the first capacitor.

7. A capacitance detection device according to claim 5, wherein a period in which the at least one of the first switch and the second switch sets the reference potential of the electric charge storage capacitor as the potential of the portion which causes the noise to be generated in the charging potential at which the charges are charged in the electric charge storage capacitor overlaps with at least one of a period in which the electric charges charged in the coordinate electrode of a measuring target are moved to the electric charge storage capacitor and a period in which the charges are charged in the coordinate electrode of the measuring target.

8. A capacitance detection device according to claim 5, further comprising a filter in a portion for connecting a terminal to which the reference potential of the electric charge storage capacitor is input with a portion which causes noise to be generated in a charging potential at which the charges are charged in the electric charge storage capacitor.

9. A display device comprising:
an LCD panel and a touch sensor panel, wherein the touch sensor panel includes a first transparent electrode facing the LCD panel, wherein the LCD panel includes a second transparent electrode facing the touch sensor panel, and wherein a capacitance is formed between the first and second transparent electrodes, wherein the touch panel sensor includes a capacitance detection device for detecting an input coordinate comprising:
a first capacitor including a coordinate electrode for detecting a capacitance;
a power source for supplying electric charges to be charged in the first capacitor;
an electric charge storage capacitor in which charges to be charged therein changes according to the electric charges charged in the first capacitor;
the electric charge storage capacitor including a first electrode which connects with the coordinate electrode and a second electrode which is opposed to the first electrode; and
a first and second switch for changing a reference potential of the second electrode of the electric charge storage capacitor, wherein the first switch electrically connects between the second electrode and a first reference voltage, wherein the second switch electrically connects between the second electrode and a second reference voltage, further comprising an amplifier for detecting electric charges which are transferred from the coordinate electrode via a third switch, wherein the third switch directly connects between the coordinate electrode and the amplifier in order to transfer the electric charges, wherein the display device is configured so that when the second reference voltage is applied to the second electrode of the electric charge storage capacitor a noise voltage of the coordinate electrode is reduced, wherein the reference potential of the electric charge storage capacitor is changed in a period of measuring the capacitance due to turning on the first and second switch alternately, wherein the second switch is turned ON corresponding to a term comprising a start time and an end time in which the electric charges are transferred via the third switch, and wherein the third switch is configured to be turned ON at the same start time as the second switch during the term.

10. A display device according to claim 9, wherein the capacitance detection device further includes a second capacitor including the coordinate electrode and a conductor which touches the capacitance detection device.

11. A display device according to claim 10, wherein a period in which the at least one of the first switch and the second switch sets the reference potential of the electric charge storage capacitor as a potential of a portion which causes the noise to be generated in the charging potential at which the charges are charged in the electric charge storage capacitor overlaps with at least one of a period in which the electric charges charged in the coordinate electrode of a measuring target are moved to the electric charge storage capacitor and a period in which the charges are charged in the coordinate electrode of the measuring target.

12. A display device according to claim 10, further comprising a filter in a portion for connecting a terminal to which the reference potential of the electric charge storage capacitor is input with a portion which causes noise to be generated in a charging potential at which the charges are charged in the electric charge storage capacitor.

* * * * *